(12) United States Patent
Vejnar

(10) Patent No.: US 6,742,822 B2
(45) Date of Patent: Jun. 1, 2004

(54) AUXILIARY TAILGATE AND RETRACTABLE STOP

(76) Inventor: Mark Willard Vejnar, 6684 Lookout Ter., Riverside, CA (US) 92505

(*) Notice: Subject to any disclaimer, the term of this patent is extended or adjusted under 35 U.S.C. 154(b) by 0 days.

(21) Appl. No.: 09/795,170

(22) Filed: Feb. 27, 2001

(65) Prior Publication Data
US 2002/0121794 A1 Sep. 5, 2002

(51) Int. Cl.[7] .............................................. B62D 33/03
(52) U.S. Cl. .................... 296/26.11; 296/57.1
(58) Field of Search .................. 296/26.08–26.11, 296/57.1

(56) References Cited

U.S. PATENT DOCUMENTS

| 4,472,639 | A | * | 9/1984 | Bianchi | 296/26.11 |
| 5,478,130 | A | * | 12/1995 | Matulin et al. | 296/57.1 |
| 5,741,039 | A | * | 4/1998 | Habdas | 296/26.11 |
| 5,752,800 | A | * | 5/1998 | Brincks et al. | 296/57.1 |
| 5,868,449 | A | * | 2/1999 | Hitchcock | 296/57.1 |
| 5,918,925 | A | * | 7/1999 | Perrin | 296/26.11 |
| 6,082,801 | A | * | 7/2000 | Owen et al. | 296/26.11 |
| 6,279,980 | B1 | * | 8/2001 | Straschewski | 296/26.11 X |
| 6,378,926 | B1 | * | 4/2002 | Renze et al. | 296/26.11 |
| 6,422,630 | B1 | * | 7/2002 | Heaviside | 296/26.11 X |

* cited by examiner

*Primary Examiner*—Dennis H. Pedder
(74) *Attorney, Agent, or Firm*—Robert N. Schlesinger

(57) ABSTRACT

This Auxiliary Tailgate and its related Retractable Stop relate to a new and useful tailgate design for trucks and the like. The Auxiliary Tailgate and Retractable Stop may be used to effectively extend the length of a truck bed, and to act as an auxiliary tailgate or the like, for trucks utilizing this invention. There are several embodiments of the Auxiliary Tailgate and Retractable Stop, including solid frame, open frame, and enclosed clam shell embodiments.

3 Claims, 58 Drawing Sheets

AUXILIARY TAILGATE AND RETRACTABLE STOP

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

This invention, entitled "Auxiliary Tailgate", was devised and invented by Mark Willard Vejnar, and relates to a new and useful type of tailgate that may be used to effectively extend the payload area or truck bed for a pickup truck, mini-truck, or the like.

This "Auxiliary Tailgate" invention will be referred to throughout this specification and its appended claims, as a proper noun with the first letter of each word capitalized. The back panel (4) component of the Auxiliary Tailgate is the primary component, and the terms are therefore nearly synonymous. The "Retractable Stop" invention will also be referred to as a proper noun throughout this specification and its appended claims, and may be used in conjunction with the Auxiliary Tailgate, or without an Auxiliary Tailgate. The Retractable Stop is similar to a back panel (4) or an Auxiliary Tailgate, but is generally much shorter in height and is comprised of a simpler design with fewer components.

The term "truck" as used throughout this specification and its appended claims is intended to also refer to a pickup truck, mini-truck, or a small or medium-sized truck with either an open payload or a covered payload bed. The term "truck" is also intended to be broadly construed to include sport utility vehicles, multipurpose vehicles, minivans, station wagons, and trailers, where the tailgate may be opened to a position that is generally parallel to the ground, as shown in the Drawing Figures.

FIELD OF THE INVENTION

The field of this invention relates to a new and useful tailgate design for trucks and the like, and most particularly for pickup trucks. The Auxiliary Tailgate and the Retractable Stop disclosed herein, may be effectively used as a tailgate in a variety of trucks and closely related vehicles that may be used for hauling objects or loads that may shift or move during transport in a truck bed (1) or the like.

DESCRIPTION OF THE RELATED ART INCLUDING INFORMATION DISCLOSED UNDER 37 CFR 1.97 AND 1.98

Heretofore, the safe transport of an object was limited to the size of the payload area or truck bed (1) or the like, and many mini-truck designs, particularly in recent years, have a short truck bed (1) or payload area. It is not uncommon for an object or load, such as a standard piece of four foot by eight foot plywood, drywall, lumber material, ladders, refrigerators, sofas, and other large objects, to be a matter of inches to several feet too long to fit safely into a truck bed (1). One solution to this problem may be to drop the primary tailgate (3) down and allow the long object to extend out of the truck bed (1) for a short distance. This means of transporting a large object, however, many cause safety problems and may be a violation of the law in some jurisdictions. It is not uncommon for large objects and loads to fall out of a truck bed (1), particularly when the tailgate is in the down position, and for these large objects and loads to fall onto a freeway or highway, thereby damaging the objects and causing hazard to the truck driver and to other drivers.

The inventor, Mark Willard Vejnar, has devised and invented a new and useful type of Auxiliary Tailgate and a Related Retractable Stop, for a truck or the like, that may easily be used to effectively extend the length of the truck bed (1), and additionally would effectively secure a payload within the truck bed (1). The means for securing a payload within the truck bed (1) with an Auxiliary Tailgate being opened to the vertical up position, as shown in FIG. 1, or alternatively, with the Retractable Stop in the up position, as shown in FIGS. 3 and 12.

BRIEF SUMMARY OF THE INVENTION

In trying to solve the above-described truck and automobile industry problems and disadvantages, and within the scope of this invention, the inventor, Mark Willard Vejnar, conceived, devised, invented, and engineered the new and useful means of effectively extending the effective truck bed (1) of at truck or the like, through the use of an Auxiliary Tailgate and a Retractable Stop. During the inventorship process in developing the Retractable Stop and the Auxiliary Tailgate, the inventor, Mark Willard Vejner, did also conceive, devise, invent, and engineer a set of hinges that may be used with the present Retractable Stop and Auxiliary Tailgate inventions, and which are intended to rest, set, hold, lock, or fix the hinge at a desired angle, such as a 90-degree angle, through the use of a hinge rib (50)/hinge rib restraint (51) means, as shown in FIGS. 38 and 39, or through the use of an additional hinge dimple (65)/hinge dimple port (68) means, as shown in FIGS. 57 and 58.

The objectives and advantages of the present Auxiliary Tailgate and Retractable Stop invention include their hideaway feature which allows the user to optionally use the Auxiliary Tailgate and Retractable Stop by pulling the Auxiliary Tailgate or the Retractable Stop, or both, out of their hideaway position. The Auxiliary Tailgate may be tucked away into the front section of the primary tailgate (3) of a truck or the like, until the user elects to use the Auxiliary Tailgate. The Retractable Stop may be tucked away into the top portion of the front section of the primary tailgate (3) or back panel (4), until the user elects to use the Retractable Stop. For some applications, the user may elect to utilize the Auxiliary Tailgate by placing it in the horizontal open position, and also utilize and open a Retractable Stop located at the terminal end of said horizontal open Auxiliary Tailgate, as shown in FIG. 3.

Another objective and advantage of the Auxiliary Tailgate and the Retractable Stop invention is that they may be composed of a polymeric or composite material, rather than the metal or alloy generally comprising the primary tailgate. The use of a polymeric or composite composition for the Auxiliary Tailgate and the Retractable Stop reduces the cost of materials and allows one to mold the parts, thereby further reducing the costs. Other advantages of utilizing polymeric or composite materials, rather than a metal or alloy, includes a lighter weight and lower hardness. The lower hardness may afford the user greater protection for the painted surface of the truck, when the Auxiliary Tailgate or the Retractable Stop is resting on the painted surface of the truck.

The Auxiliary Tailgate and the Retractable Stop invention is a valuable means of effectively and safely extending the payload area or truck bed (1) for some mini-trucks or short-bed trucks that would otherwise have limited utility in transporting furniture, such as sofas, refrigerators and bookshelves, and transporting construction materials, such as plywood, drywall, and lumber, from site-to-site, or from lumber yard to construction site.

BRIEF DESCRIPTION OF THE DRAWING FIGURES

The drawing figures reflect selected embodiments of the Auxiliary Tailgate and the Retractable Stop, and as intended for use with a pickup truck, but the Auxiliary Tailgate and the Retractable Stop are not limited to use with a pickup truck, and may be effectively used with other vehicles, as disclosed above, and may have applications on other types of vehicles, trailers, and the like, as well as in other industries where large objects or payloads may be transported, or where an Auxiliary Tailgate or a Retractable Stop, or both, are desired or are a practical addition to a design feature.

Referring again to the drawing figures, like reference numerals are used to refer to like specific parts of the various drawing figures. The tailgate nomenclature is defined as the primary tailgate (3), which is essentially the traditional tailgate with a hideaway back panel (4), which is generally attached to the primary tailgate (3) near the top edge of said primary tailgate (3). The hideaway back panel (4) is the major element or component of the Auxiliary Tailgate, and is therefore nearly equivalent to or synonymous to the Auxiliary Tailgate. Technically, the Auxiliary Tailgate includes the back panel (4), but also includes the less noticeable components, such as the horizontal back panel hinge (7) the back panel handle (6) and the various components used in the back panel locking means, to complete the Auxiliary Tailgate. The nomenclature for the position of the primary tailgate (3) and back panel (4) is defined as being in a horizontal or vertical position, and being further defined as being in the horizontal open or closed position, or in the vertical up or down position, as shown in Drawing Figures.

Figure 19:
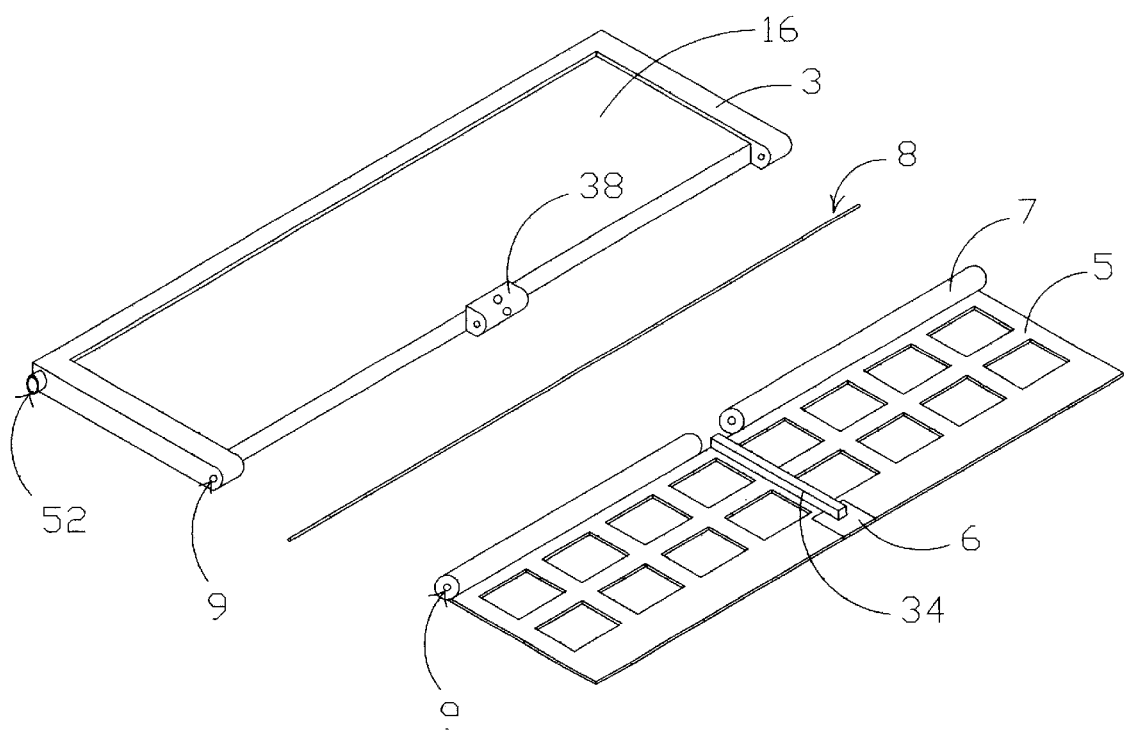

FIG. 19 shows an exploded isometric rear view of an Open Frame Auxiliary Tailgate, and showing the primary tailgate (3) in the horizontal open position, and showing the open frame back panel (5) in the horizontal open position; a hinge pin (8) is shown and would fit through a common hinge pin port (9), when the hinge pin port (9) on the open frame back panel (5) is matedly aligned to the hinge pin port (9) on the top edge of the primary tailgate (3).

Figure 20:
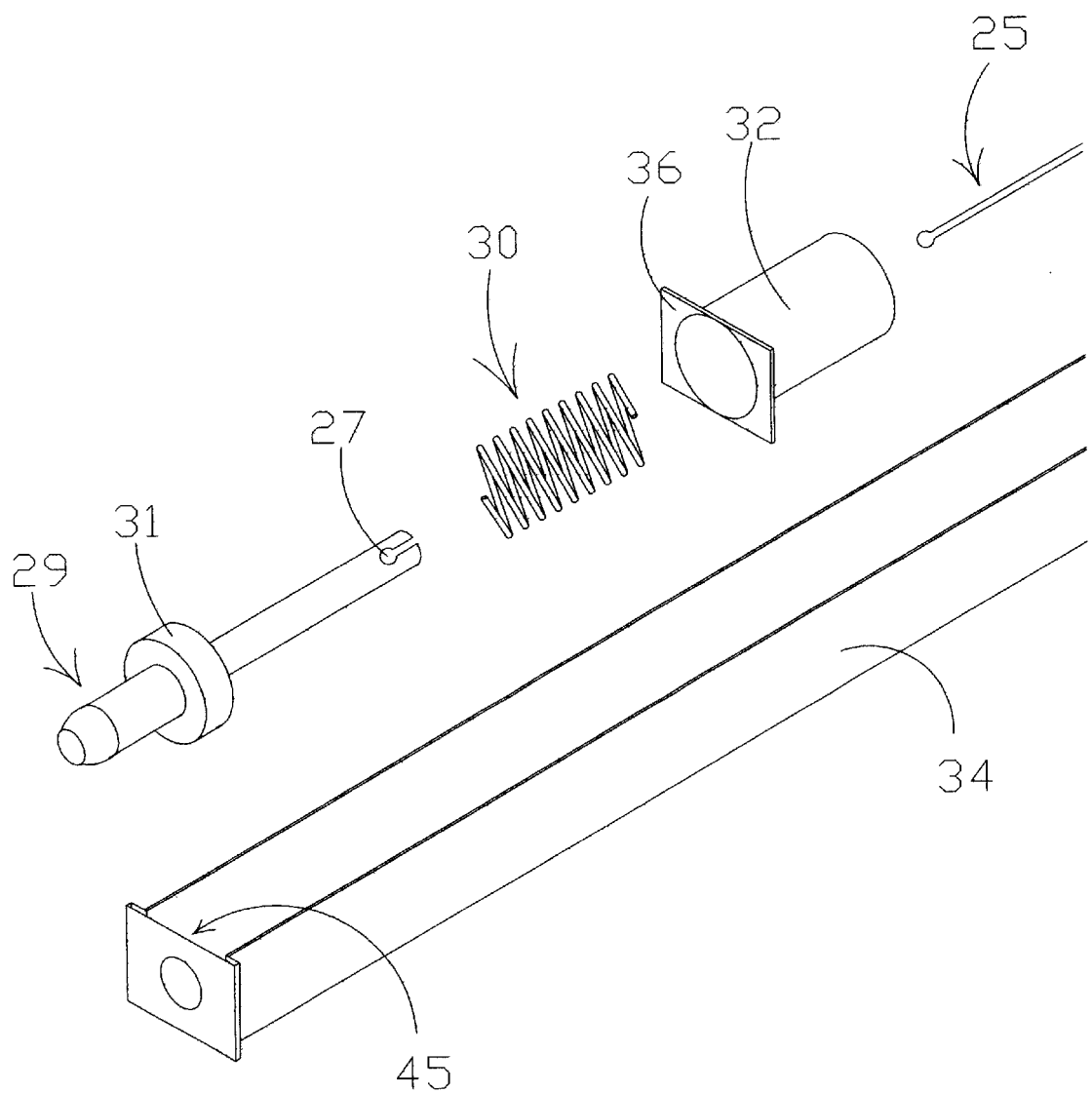

FIG. 20 shows an exploded bottom isometric view of the components comprising a preferred embodiment of the cable spring housing (34), which is a preferred locking means for affixing a back panel (4 or 5) of an Auxiliary Tailgate, into the desired position.

Figure 21:
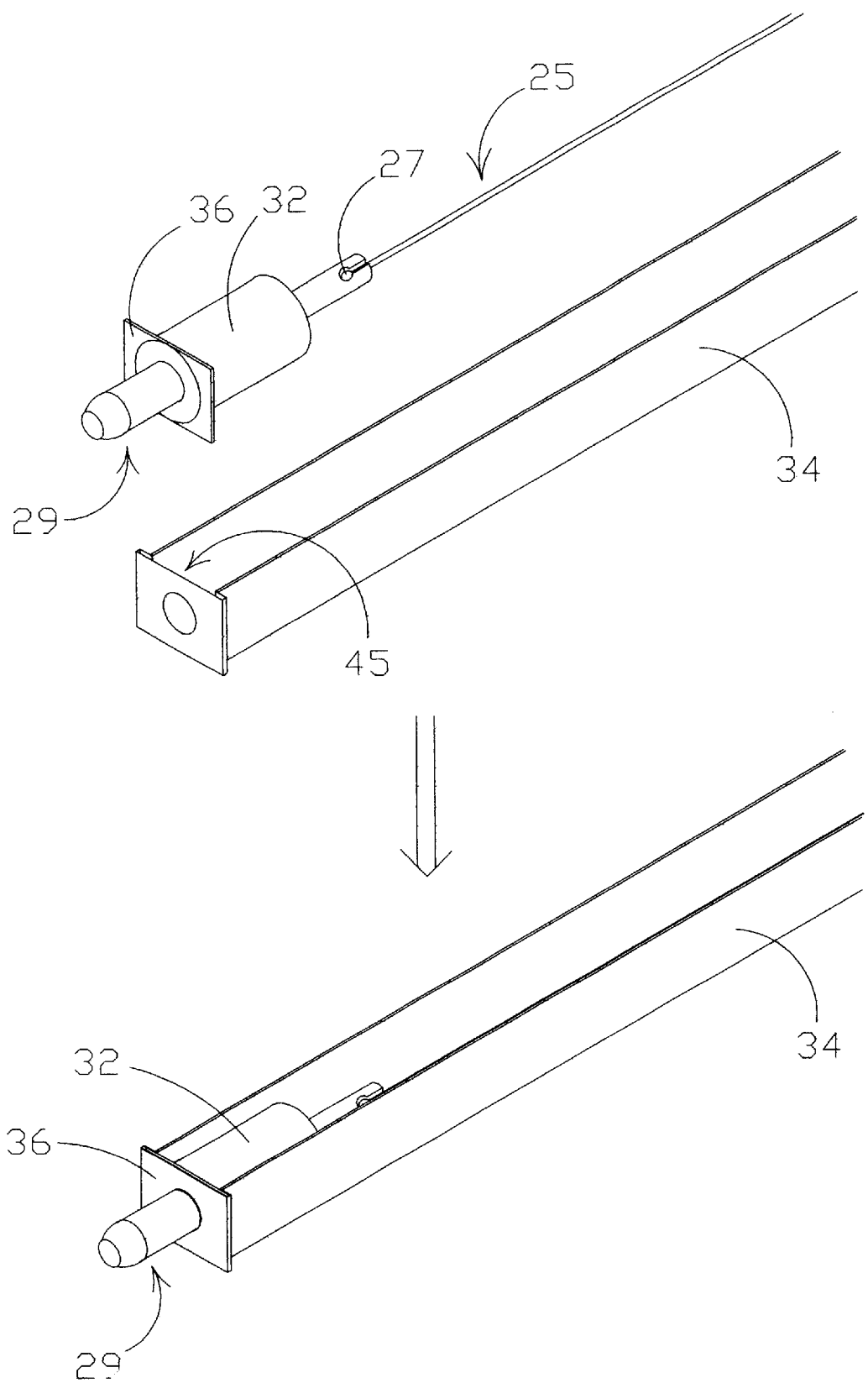

FIG. 21 shows an exploded isometric bottom view of the components and assembly of the cable spring housing (32) of an Auxiliary Tailgate, assembled and ready for insertion into the back panel cable housing (34), and showing how the cable spring housing (32) fits into the back panel cable housing (34).

Figure 22:
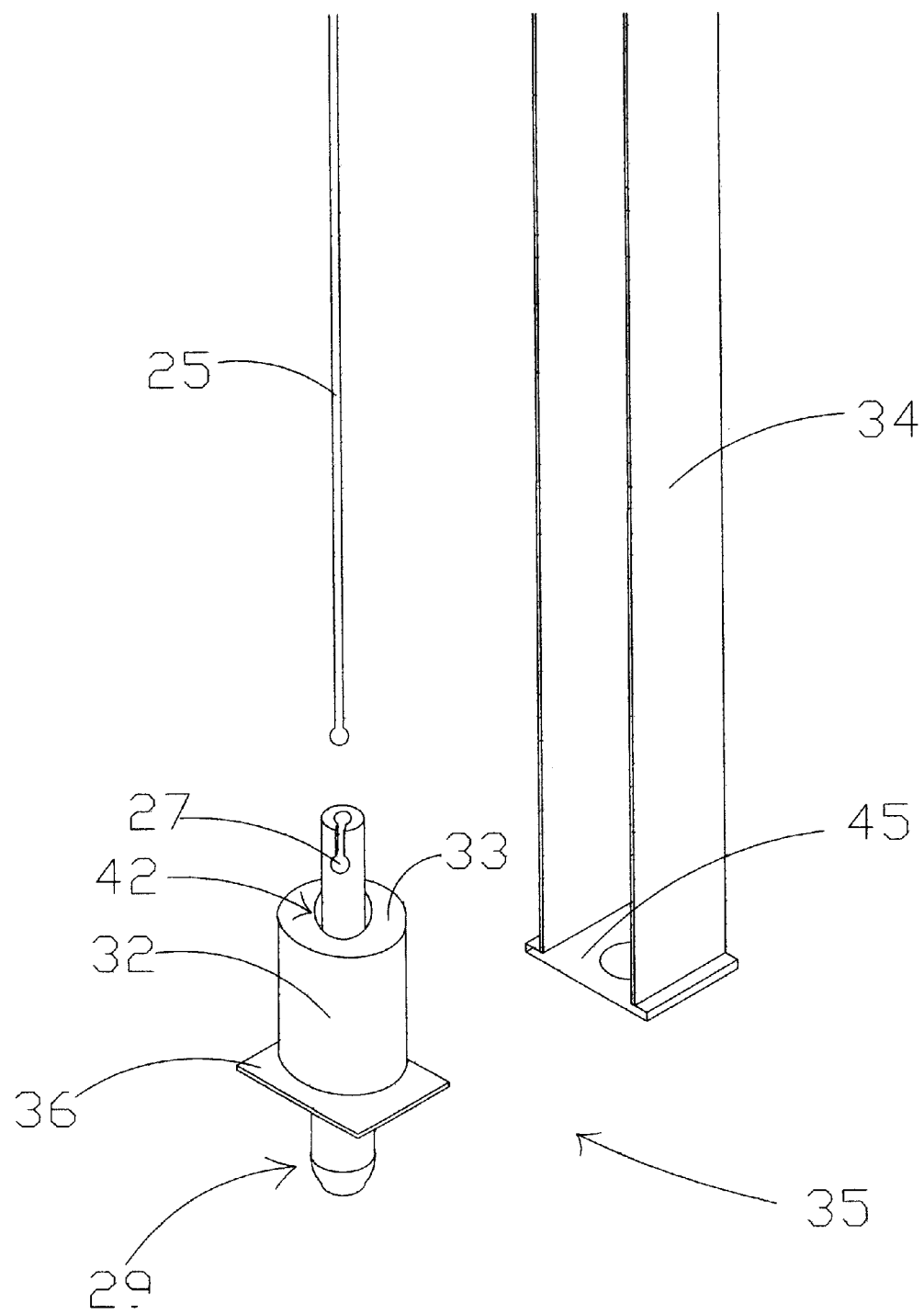

FIG. 22 shows an exploded isometric top view of the components and assembly of the back panel cable housing (34) of an Auxiliary Tailgate, with the components associated with the cable spring housing (32) assembled and ready for insertion into the back panel cable housing (34), and showing how the mount flange (36) on the cable spring housing (32) fits into the back panel cable housing (34).

Figure 23:
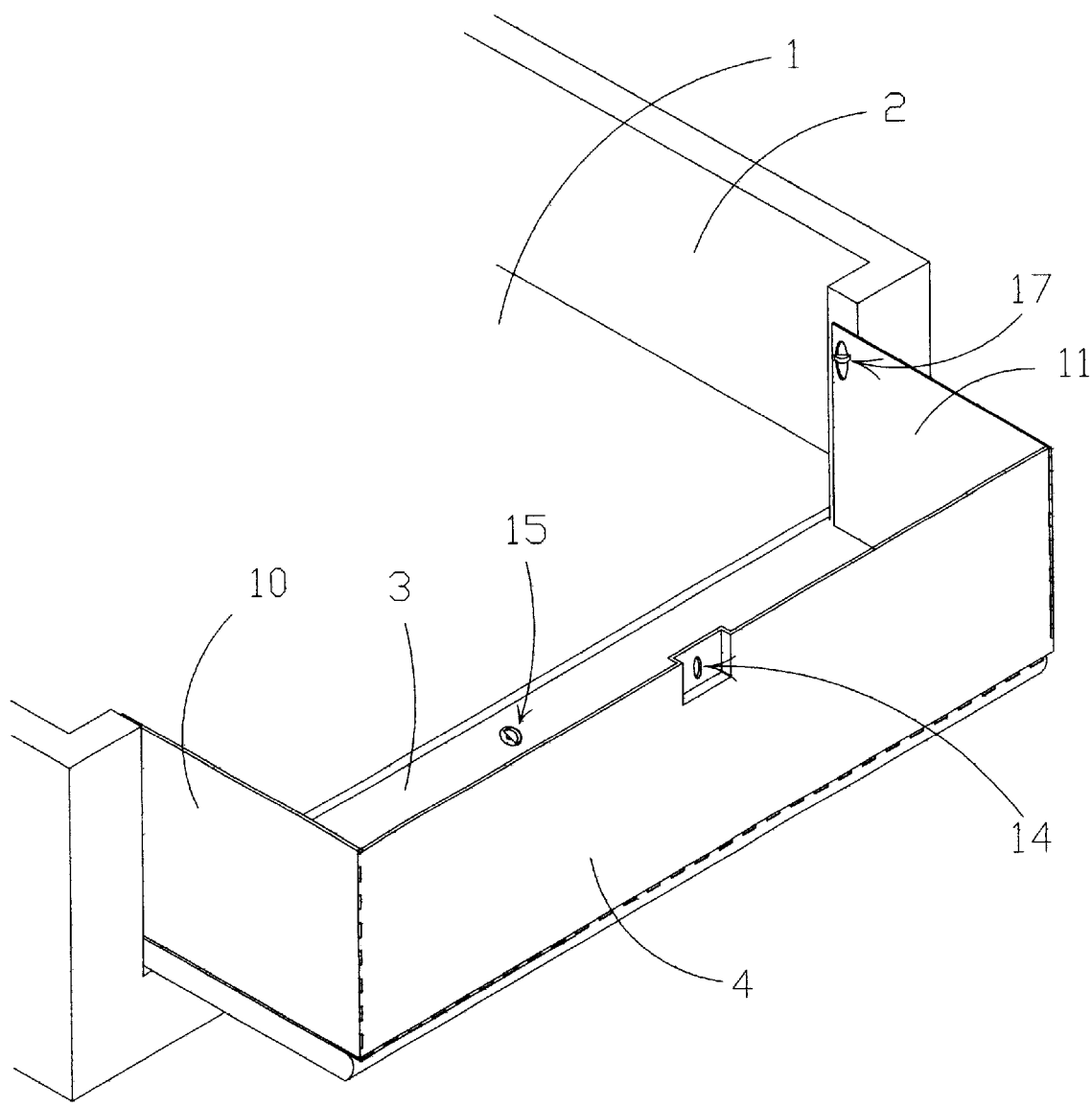

FIG. 23 shows an isometric rear view of a truck with a clam-shell embodiment of the Auxiliary Tailgate affixed thereto, and showing the primary tailgate (3) in horizontal open position, and the back panel (4) and the two vertical panels (10, 11) are in the vertical up position.

Figure 24:
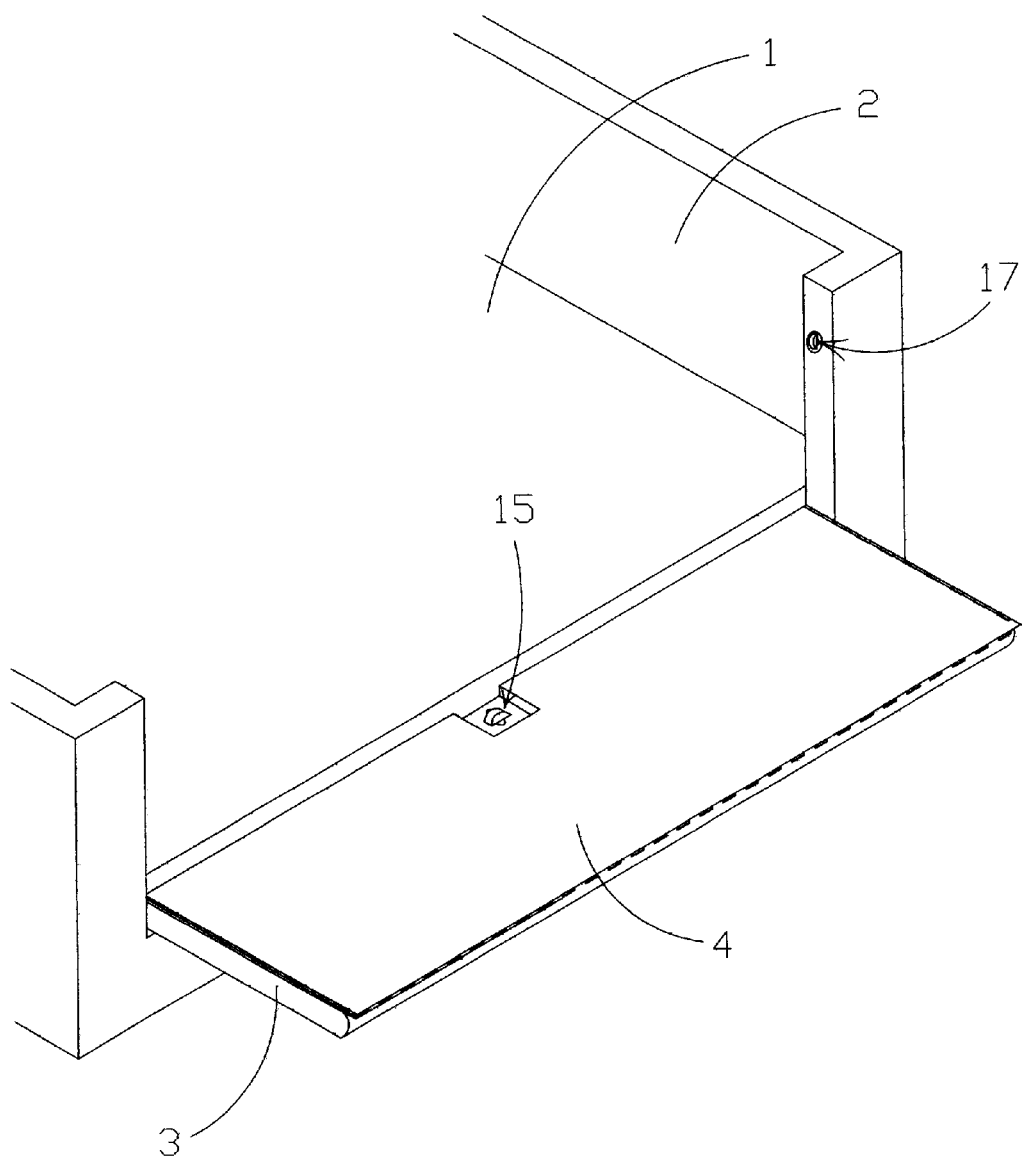

FIG. 24 shows an isometric rear view of a truck with a clam-shell embodiment of the Auxiliary Tailgate affixed thereto, and showing the primary tailgate (3) in the horizontal open position, and the back panel (4) with the attached vertical side panels (10, 11) are in the closed position, with said vertical side panels (10, 11) hidden from view.

Figure 25:
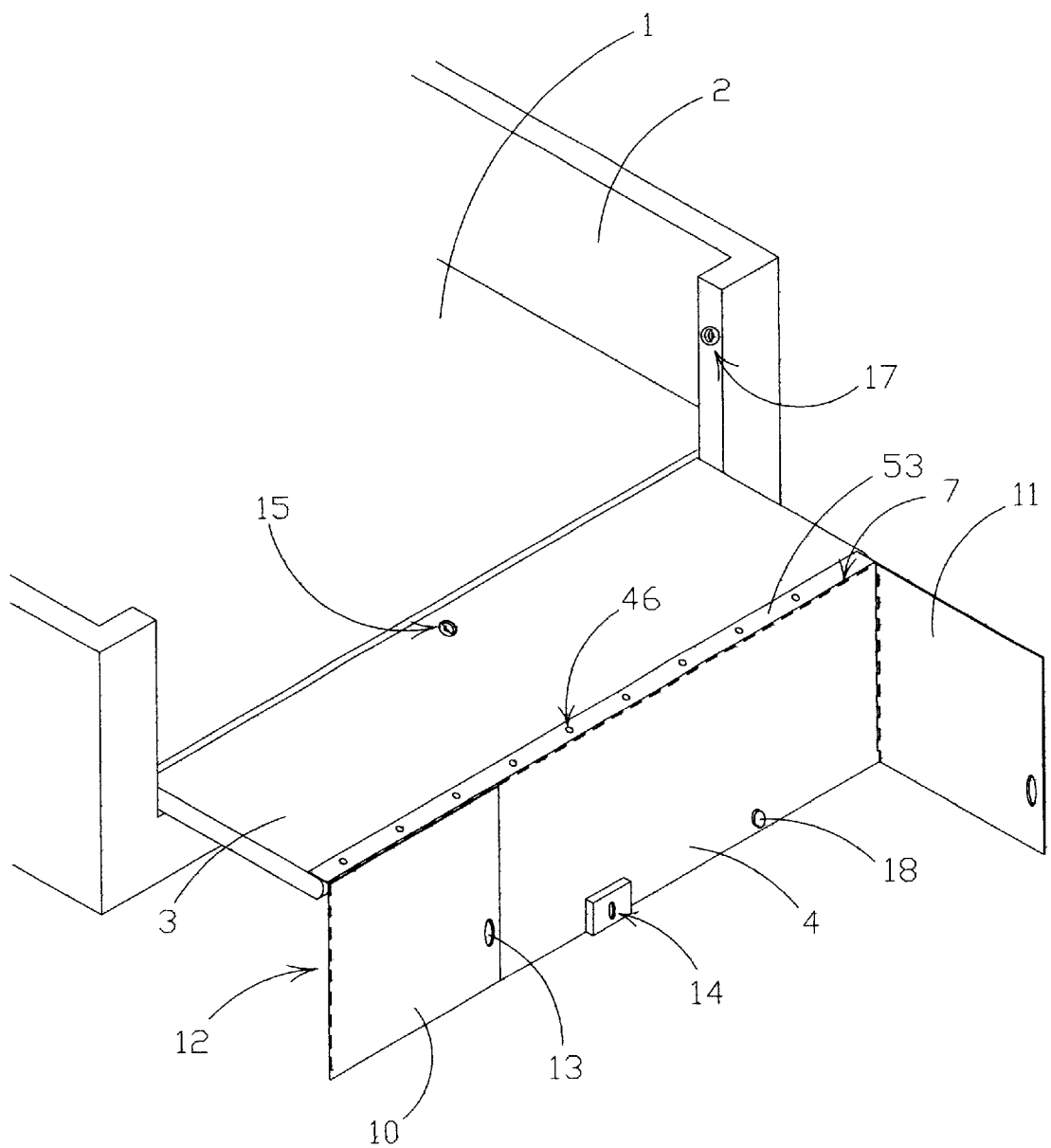

FIG. 25 shows an isometric rear view of a truck with a clam-shell embodiment of the Auxiliary Tailgate affixed thereto, and showing the primary tailgate (3) in the horizontal down position, with the affixed back panel (4) is in the vertical down position, and with the attached left vertical side panel (10) in the closed position, and the attached right vertical panel (11) in the partially closed position, on said back panel (4).

Figure 26:
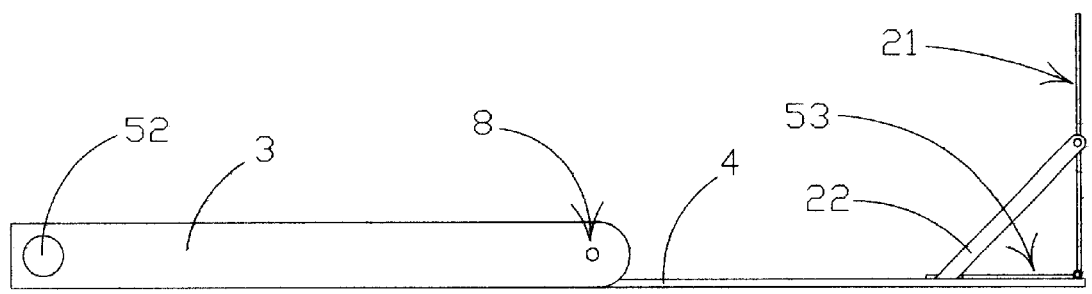

FIG. 26 shows a left side view of the first preferred embodiment of the Auxiliary Tailgate with a Retractable Stop, and showing the primary tailgate (3) in the horizontal open position, the solid body back panel (4) in the horizontal open position, and the Retractable Stop in the up position, and locked into place utilizing the first preferred hinged tongue (22) and hinged tongue port (23) locking means.

Figure 27:
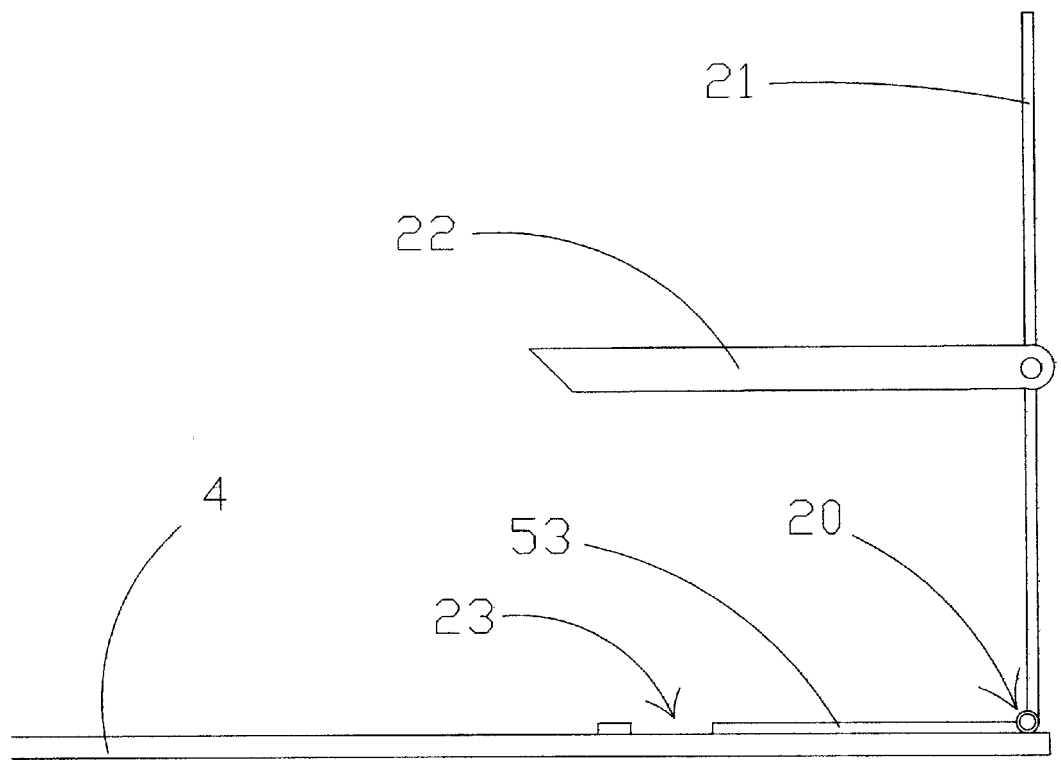

FIG. 27 shows a left side view of the means for locking the Retractable Stop shown in FIG. 26.

Figure 28:
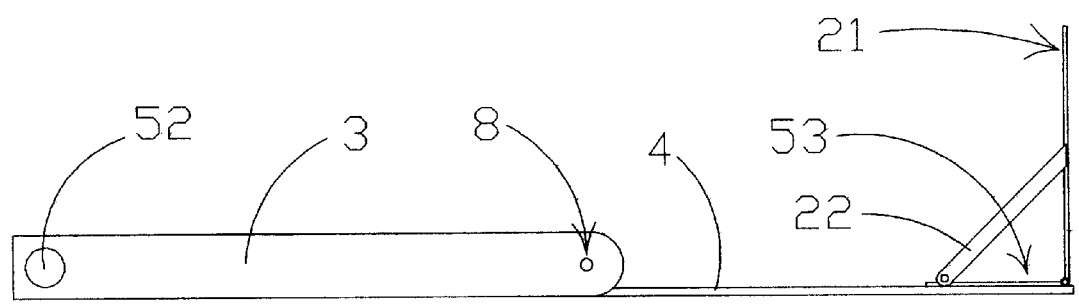

FIG. 28 shows a left side view of the second preferred embodiment of the Auxiliary Tailgate with a Retractable Stop, and showing the primary tailgate (3) in the horizontal open position, the solid body back panel (4) in the horizontal open position, and the Retractable Stop in the up position, and locked into place utilizing the second preferred hinged tongue (22) and hinged tongue port (23) locking means.

Figure 29:
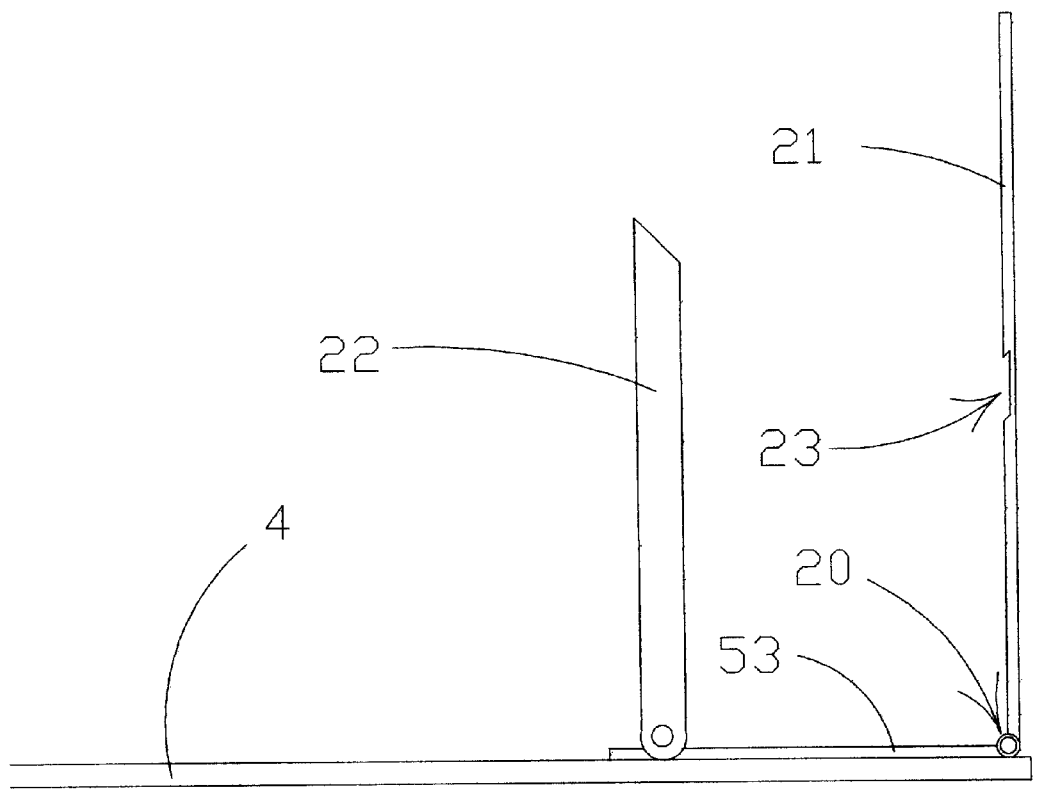

FIG. 29 shows a left side view of the means for locking the Retractable Stop shown in FIG. 28.

Figure 30:
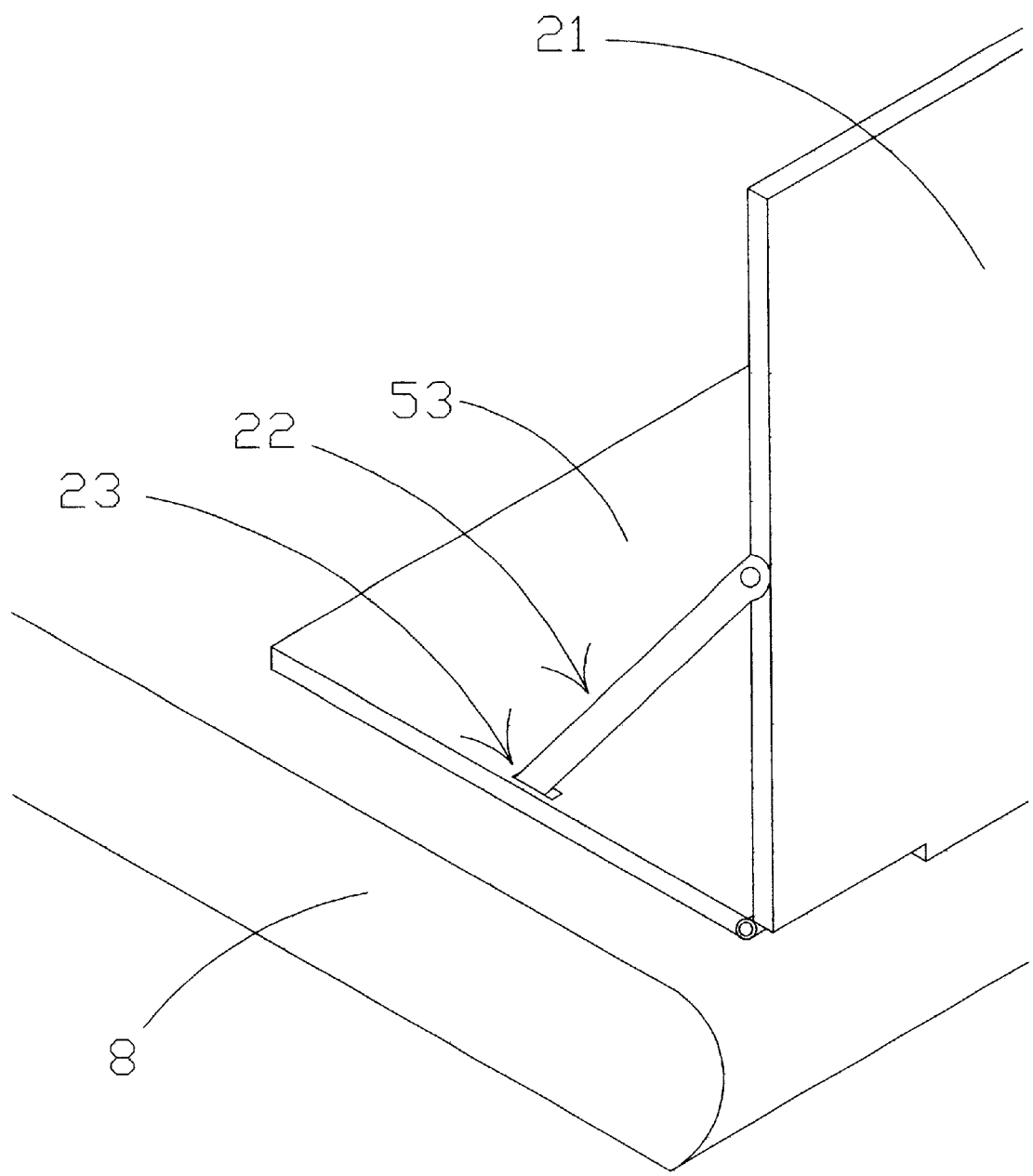

FIG. 30 shows a left isometric view of another embodiment of the locking means for the Retractable Stop, similar to that shown in FIGS. 26 and 27, but showing a modified hinged tongue port (23).

Figure 31:
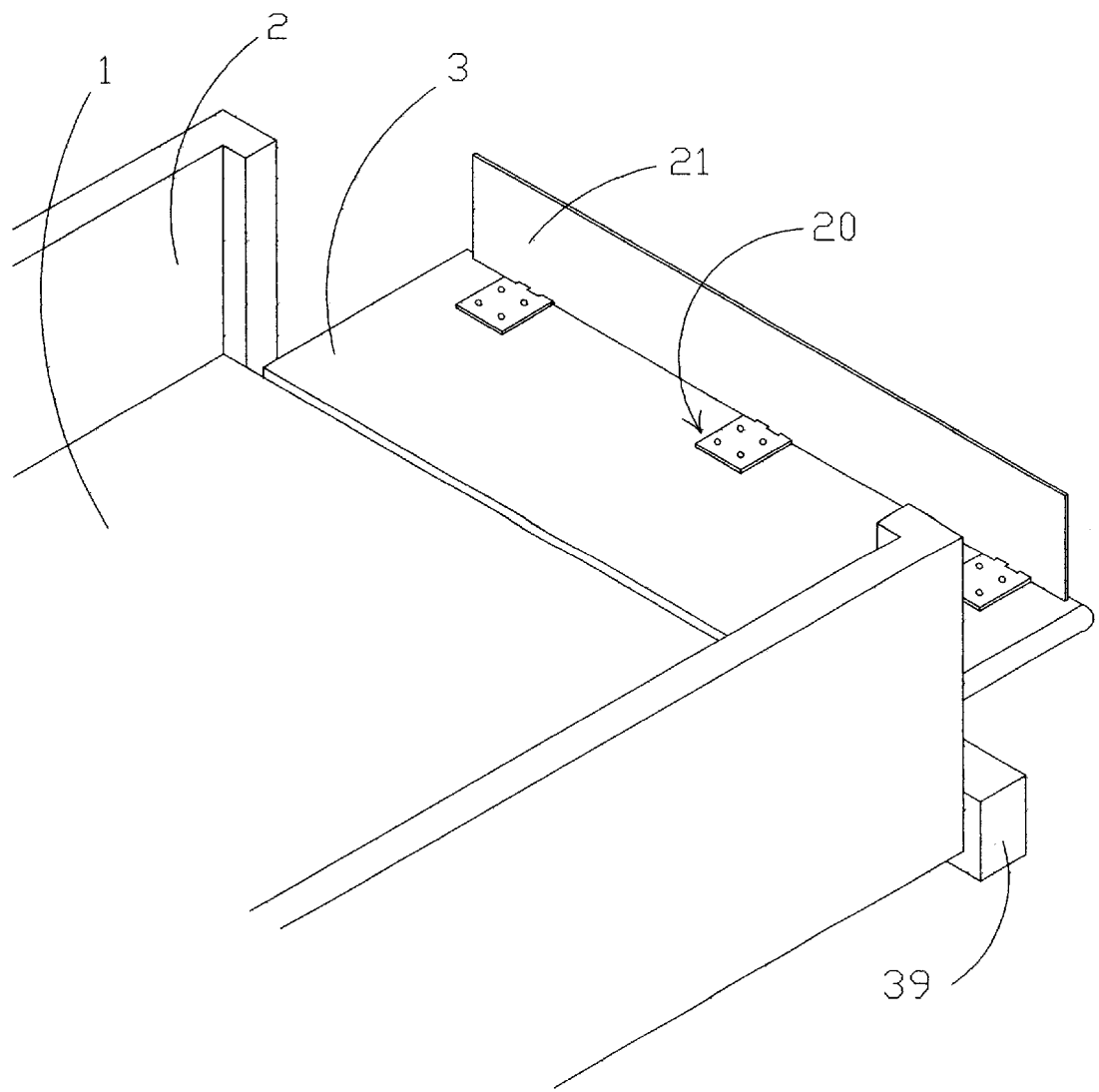

FIG. 31 shows an isometric rear view of a truck bed (1), and showing a first modified embodiment of the Retractable Stop in the up position, and the retractable stop hinge (20) is a hybrid hinge, where the hinge (20) on the extended arm (21) is mated to a plurality of hinges (20), that resemble a two piece hinge (40), and are attached to the primary tailgate (3).

Figure 32:
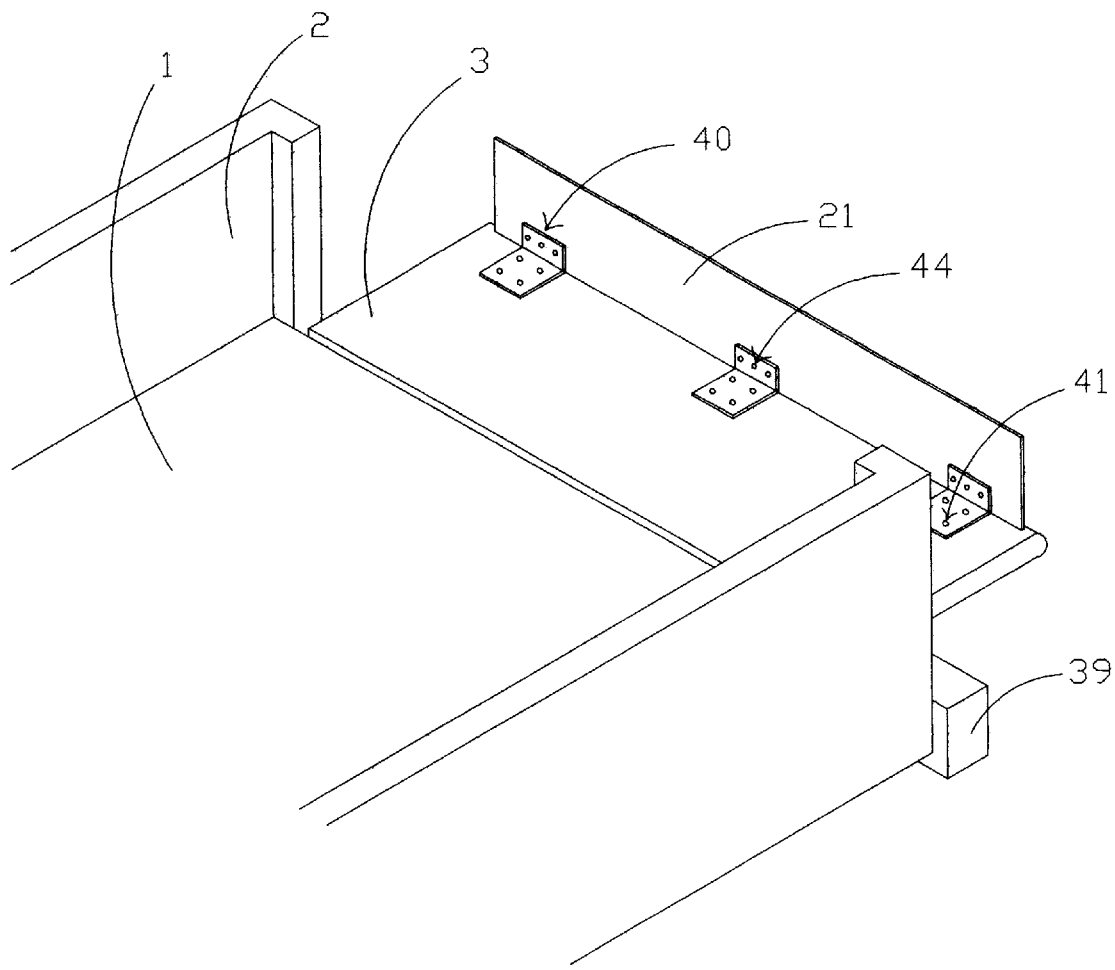

FIG. 32 shows an isometric rear view of a truck bed (1), and showing a second modified embodiment of the Retractable Stop in the up position, and said Retractable Stop has a plurality of tow piece hinges (40), with one of each two piece hinge (40) attached to the front side of the primary tailgate (3) with mounting screws (41), and showing the modified planar embodiment of the extended arm (21) attached or affixed to the second piece of said two piece hinge (40) with mounting rivets (44) or the like.

Figure 33:
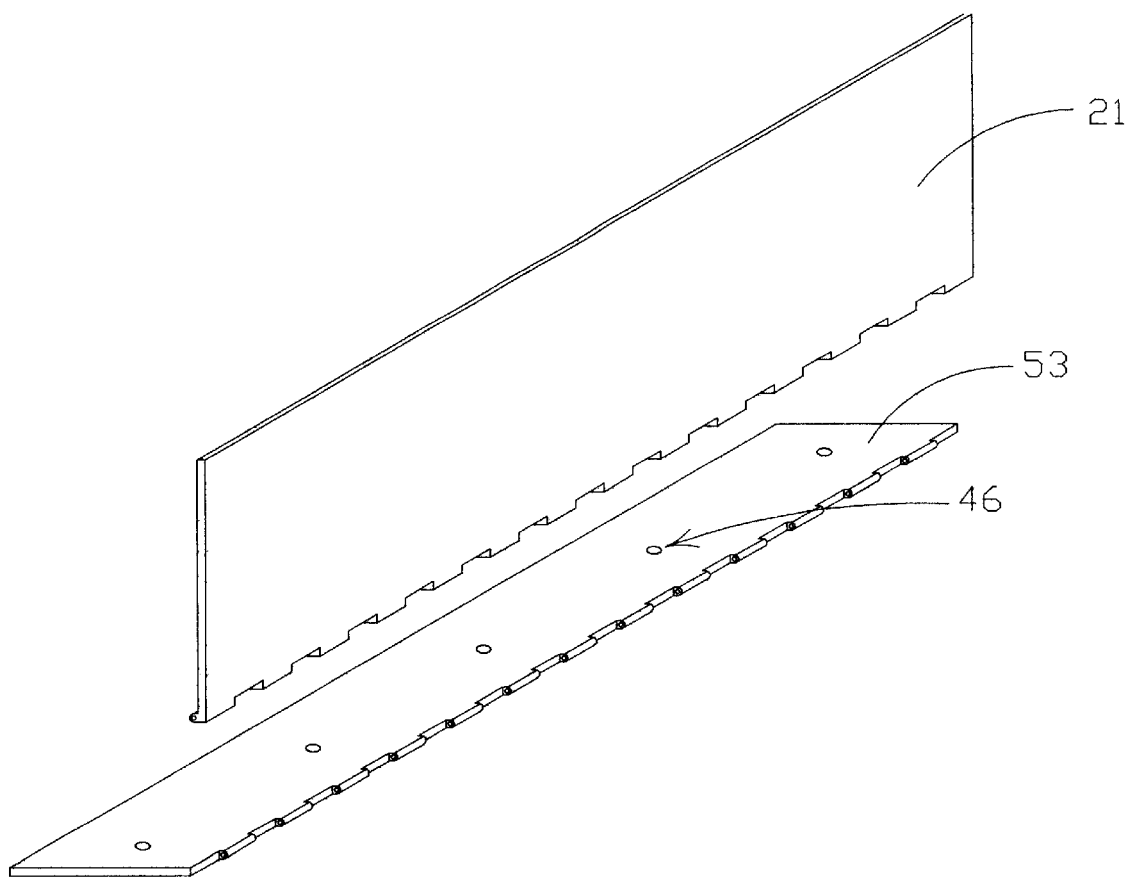

FIG. 33 shows an exploded isometric rear view of the two retractable stop hinge (20) pieces of a preferred embodiment of the Retractable Stop, and showing how the two retractable stop hinge (20) pieces would fit together. The hinge pin (8) and mounting screws (41) are not shown in this drawing figure.

Figure 34:
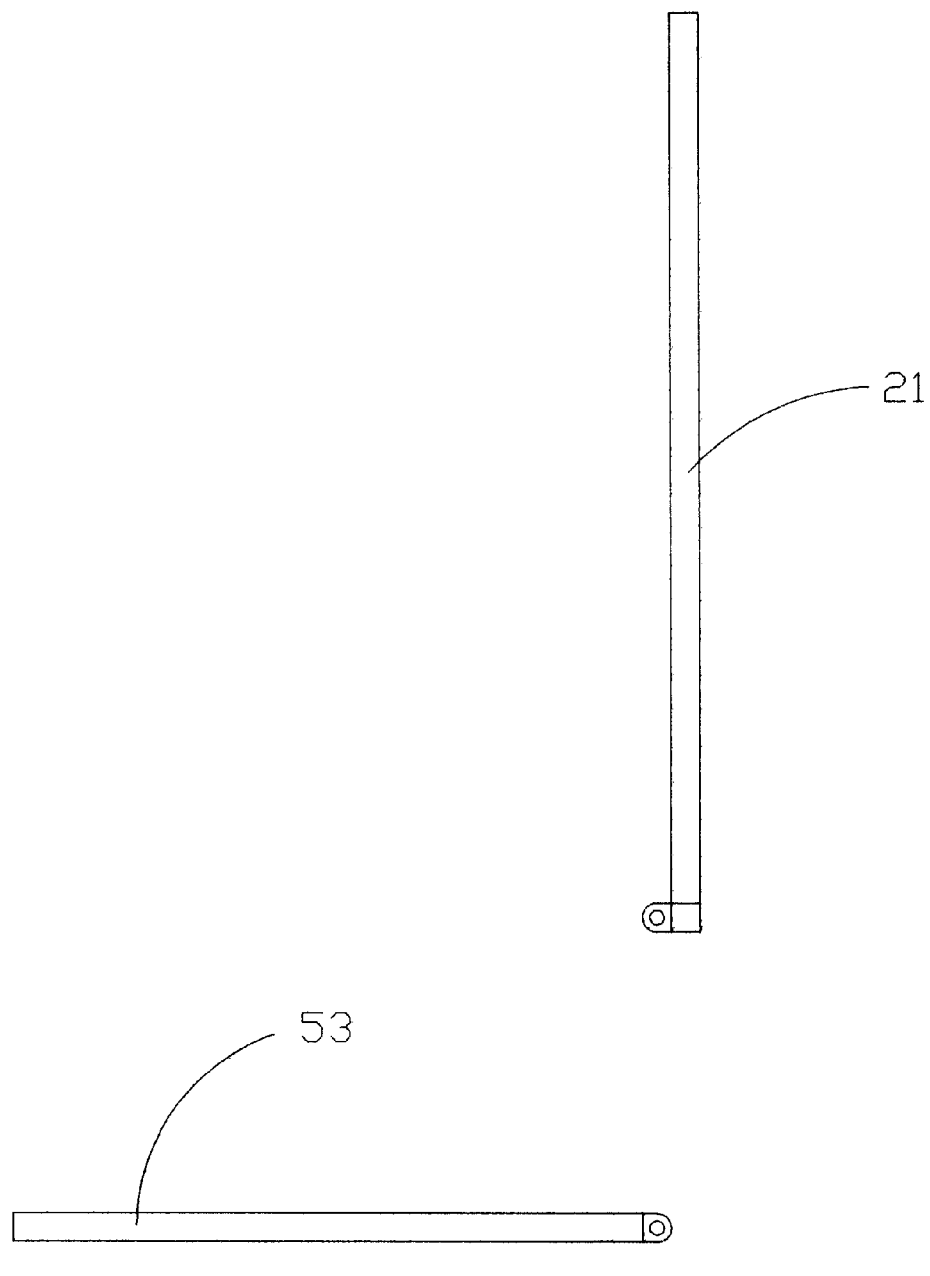

FIG. 34 shows an exploded left side view of the two retractable stop hinge (20) pieces of a preferred embodiment of the Retractable Stop, and showing how the two retractable stop hinge (20) pieces would fit together.

Figure 35:
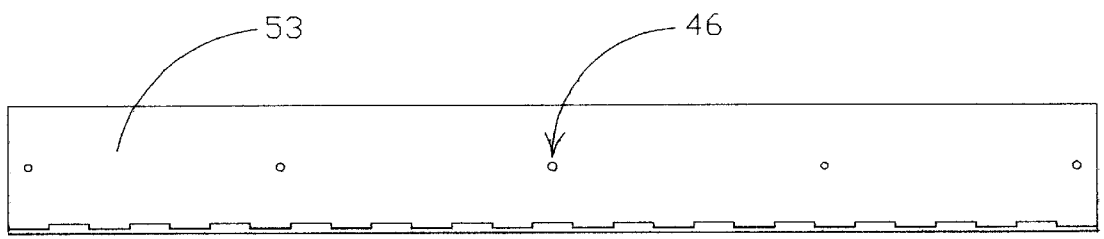

FIG. 35 shows a top view of the preferred embodiment of the Retractable Stop in the vertical up position, and showing most of the mounting plate (53).

Figure 36:
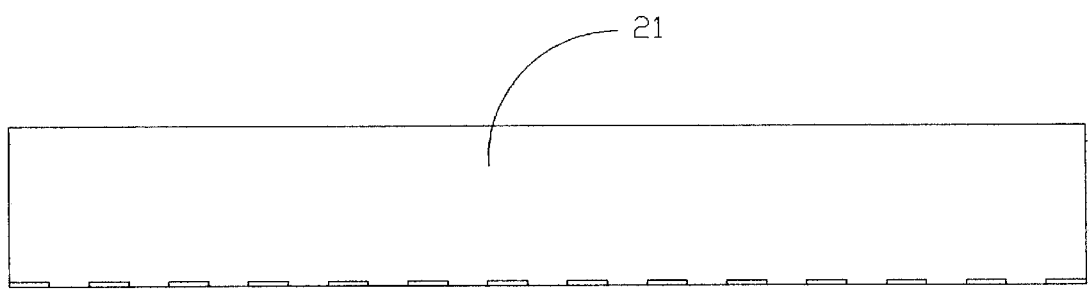

FIG. 36 shows a rear view of the preferred embodiment of the Retractable Stop in the vertical up position.

Figure 37:
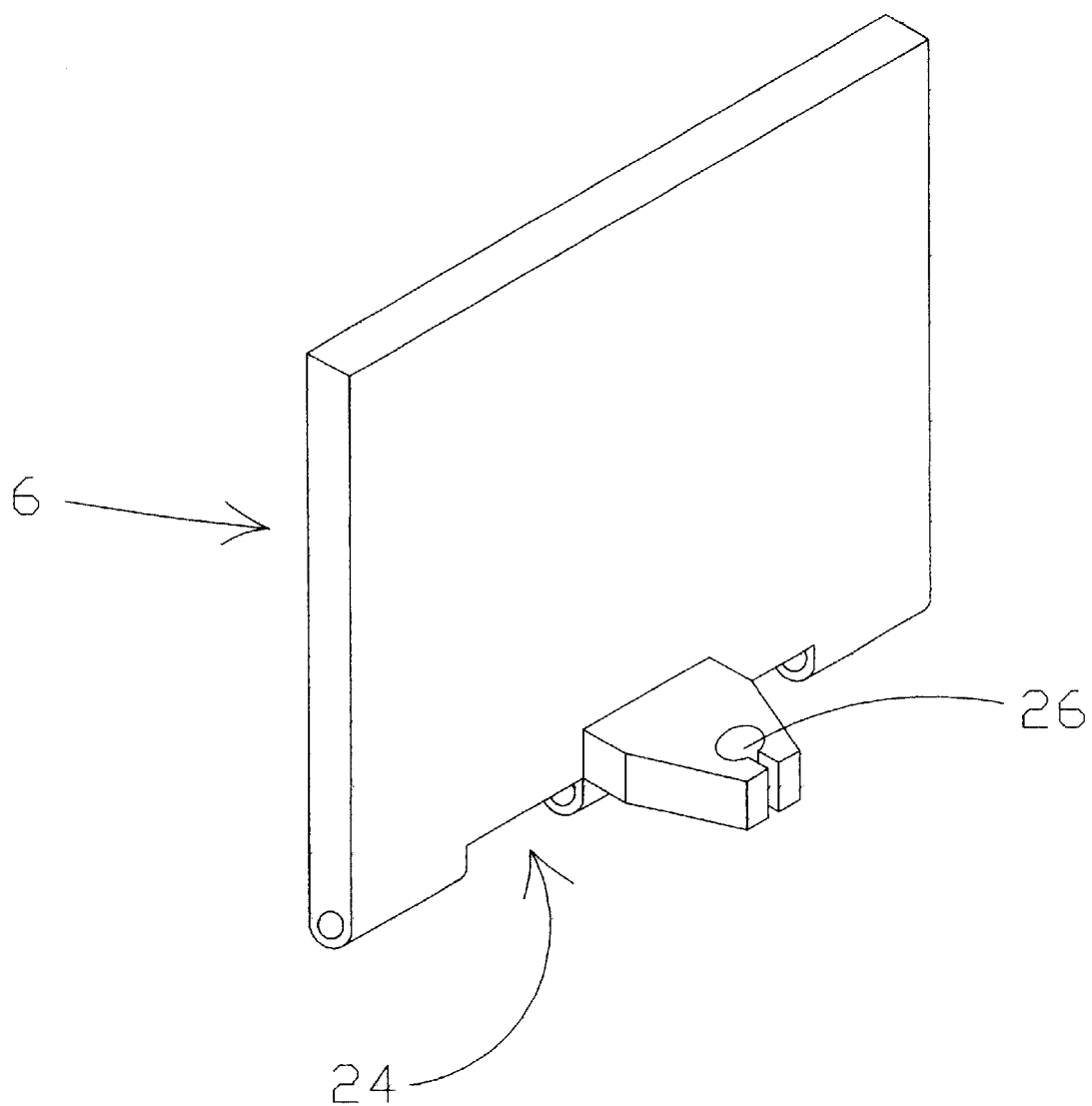

FIG. 37 shows an isometric rear view of a hinged embodiment of the back panel handle (6), and showing the first cable port (26).

Figure 38:
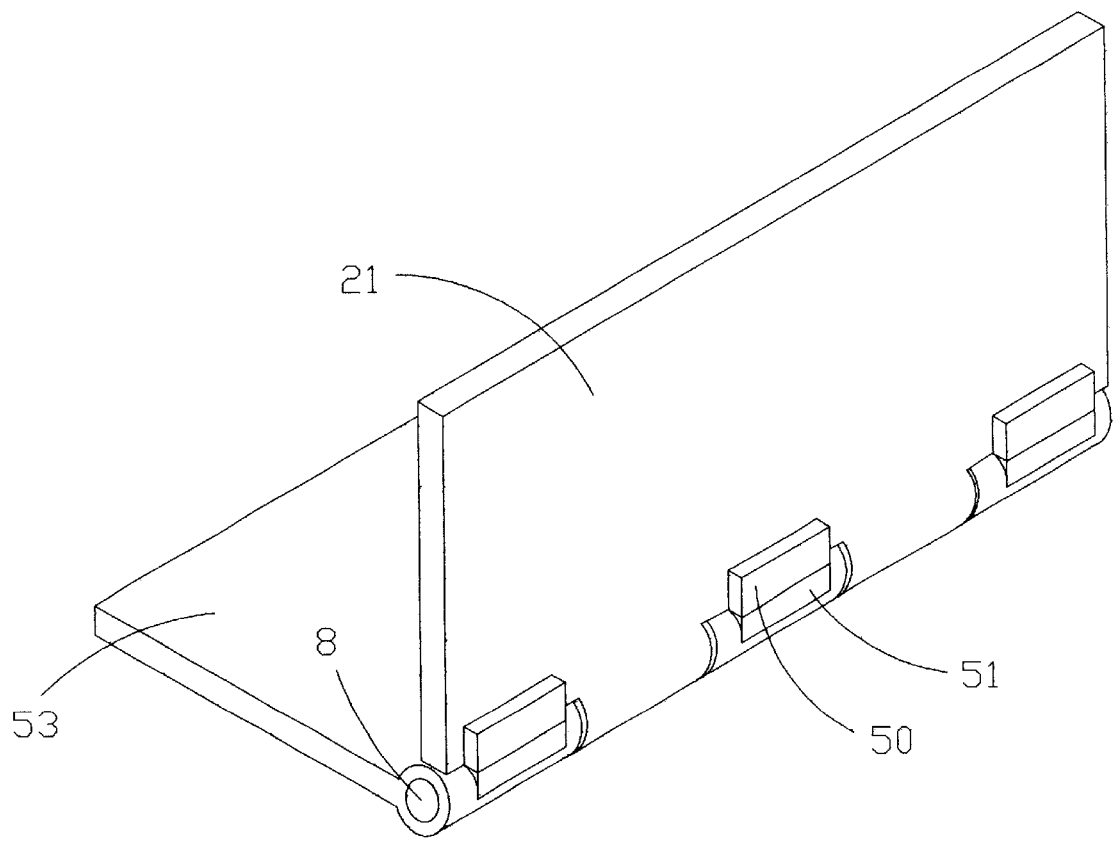

FIG. 38 shows an isometric rear view of a modified embodiment of the Retractable Stop in the vertical up position, and showing a new and useful embodiment of the retractable stop hinge (20) for locking the Retractable Stop at a desired angle, such as a 90-degree up position.

Figure 39:
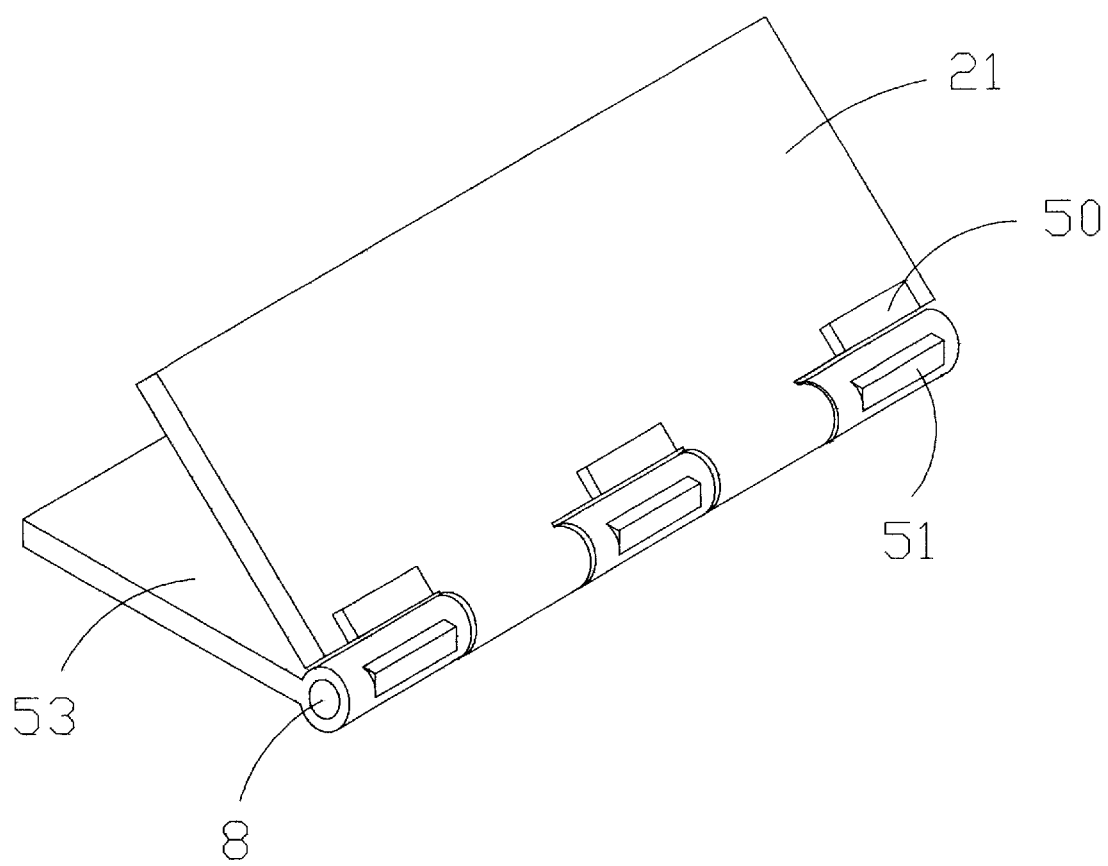

FIG. 39 shows an isometric rear view of a modified embodiment of the Retractable Stop in a position intermediate between the vertical up position and the horizontal closed position, and showing a new and useful embodiment of the retractable stop hinge (20) for locking the Retractable Stop at a desired angle, such as a 90-degree up position.

Figure 40:
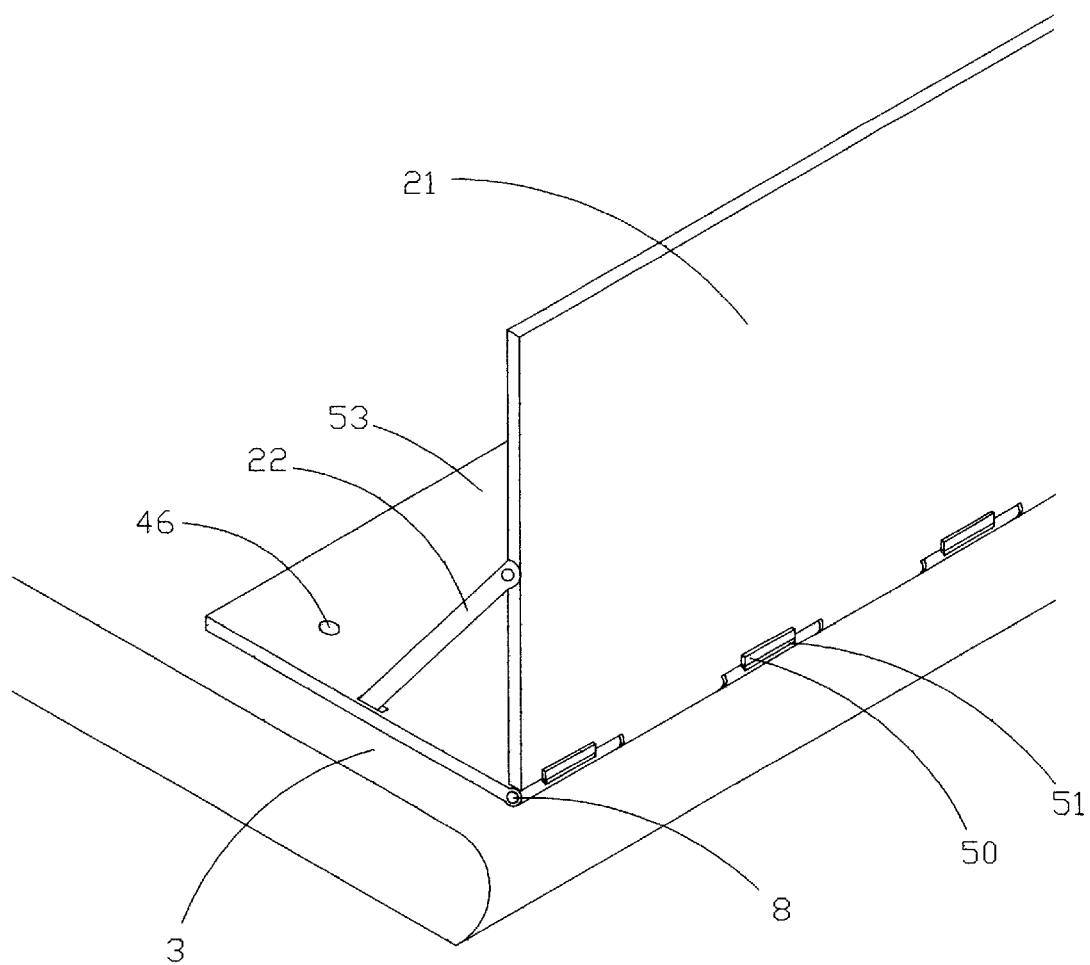

FIG. 40 shows an isometric rear view of a portion of a preferred embodiment of the Retractable Stop installed on a primary tailgate (3), with the Retractable Stop at a 90-degree up position.

Figure 41:
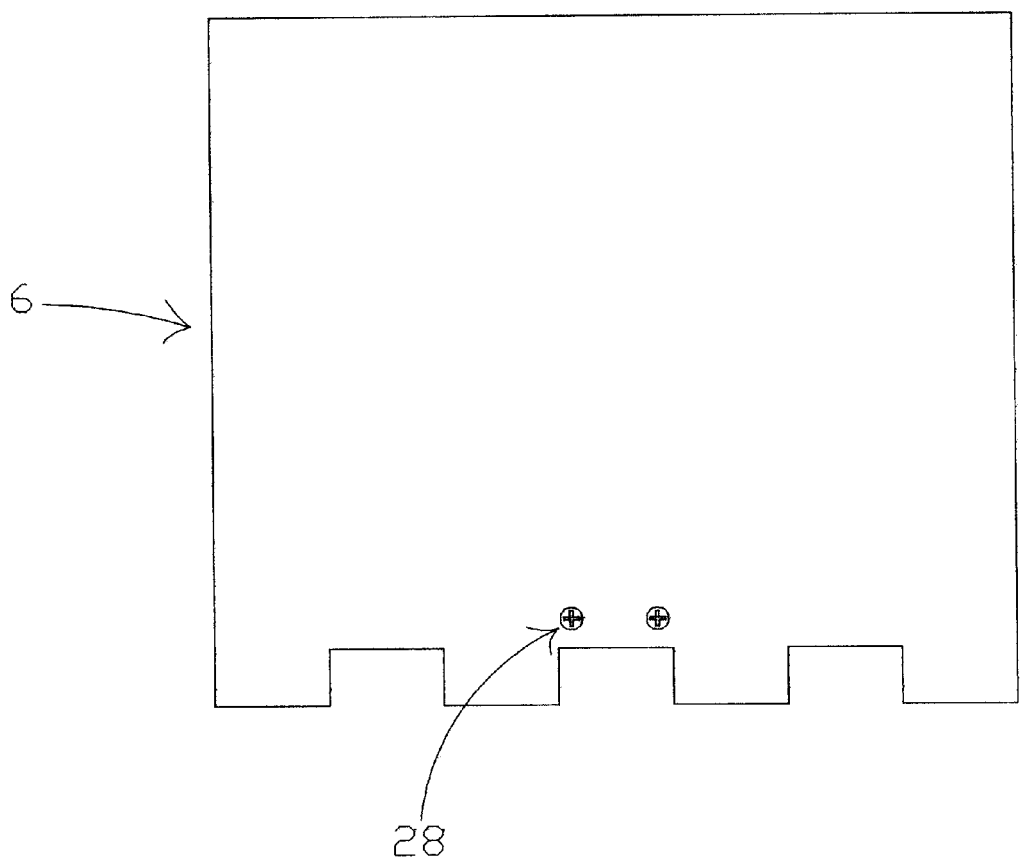

FIG. 41 shows a front view of a hinged embodiment of the back panel handle (6), and showing the two cable port rivets (28).

Figure 42:
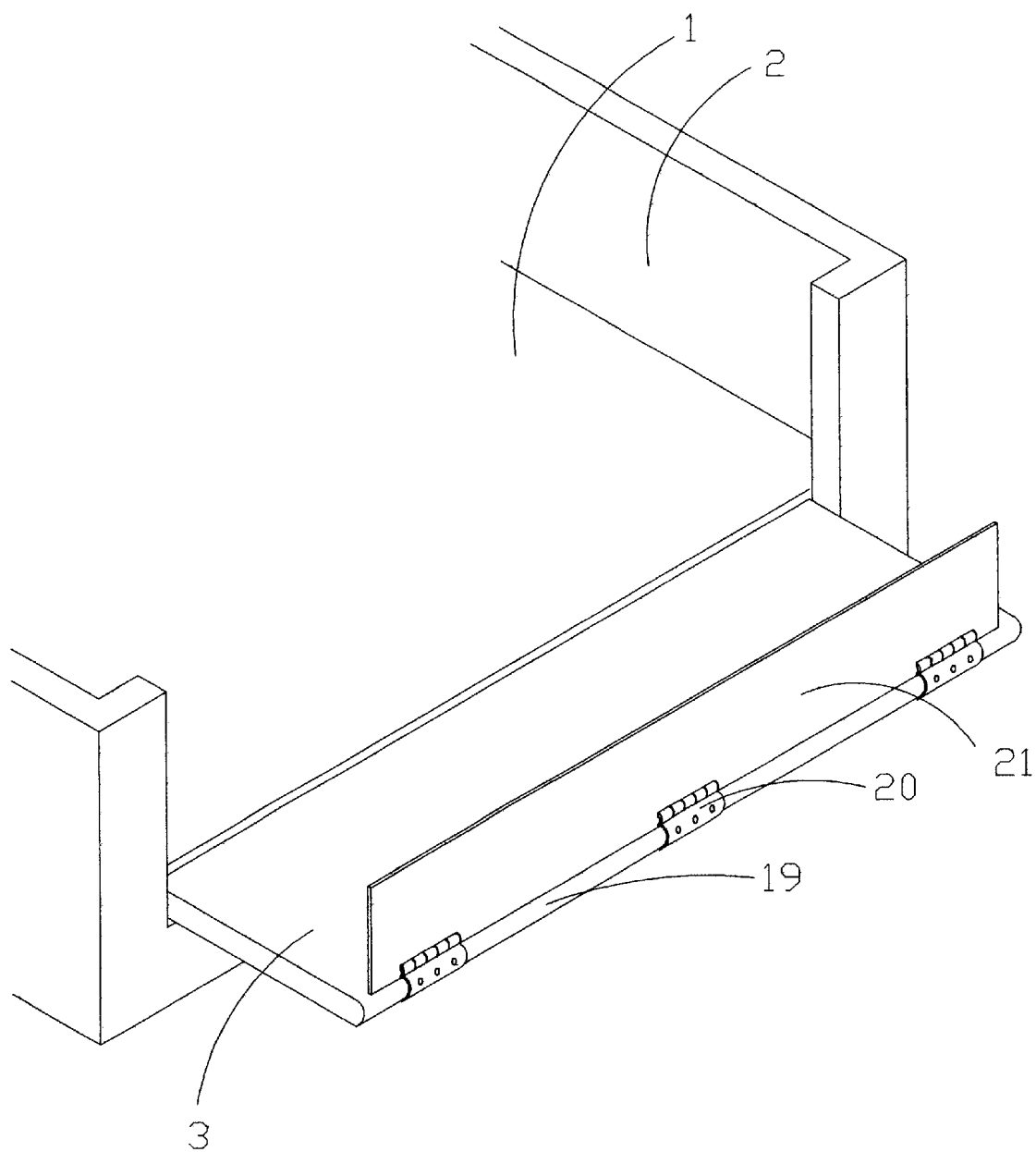

FIG. 42 shows an isometric rear view of a primary tailgate (3) with a Retractable Stop attached with a hinge (20) to the top back panel edge (19).

Figure 43:
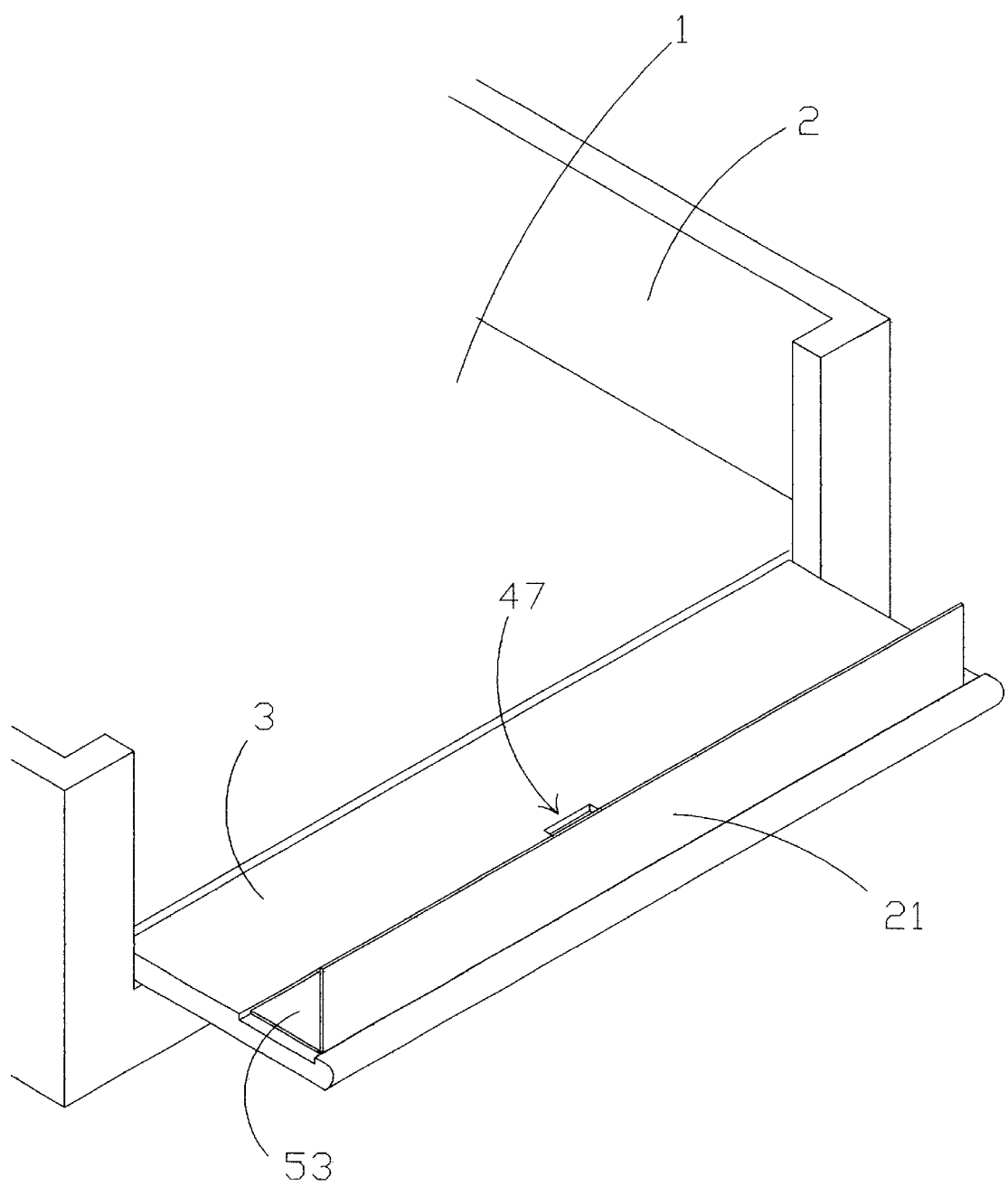

FIG. 43 shows an isometric rear view of a primary tailgate (3) with a Retractable Stop in the vertical open position, and the mounting plate (53) fit into a recessed area on the front side of the primary tailgate (3).

Figure 44:
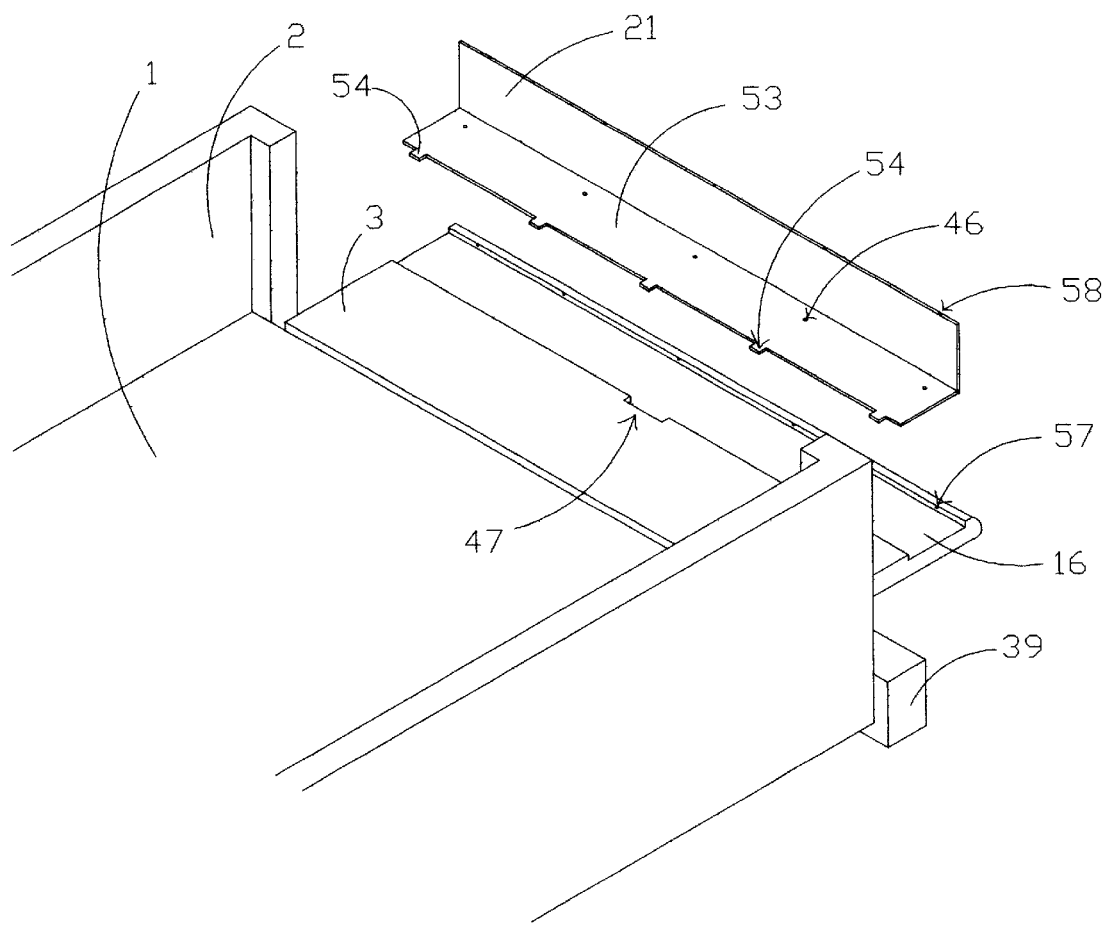

FIG. 44 shows an exploded isometric front view of a primary tailgate (3), and showing how a Retractable Stop may be affixed to the recessed area on the front side of the primary tailgate (3). The primary dimples (56) and the secondary dimples (58) are located on the extended arm (21).

Figure 45:
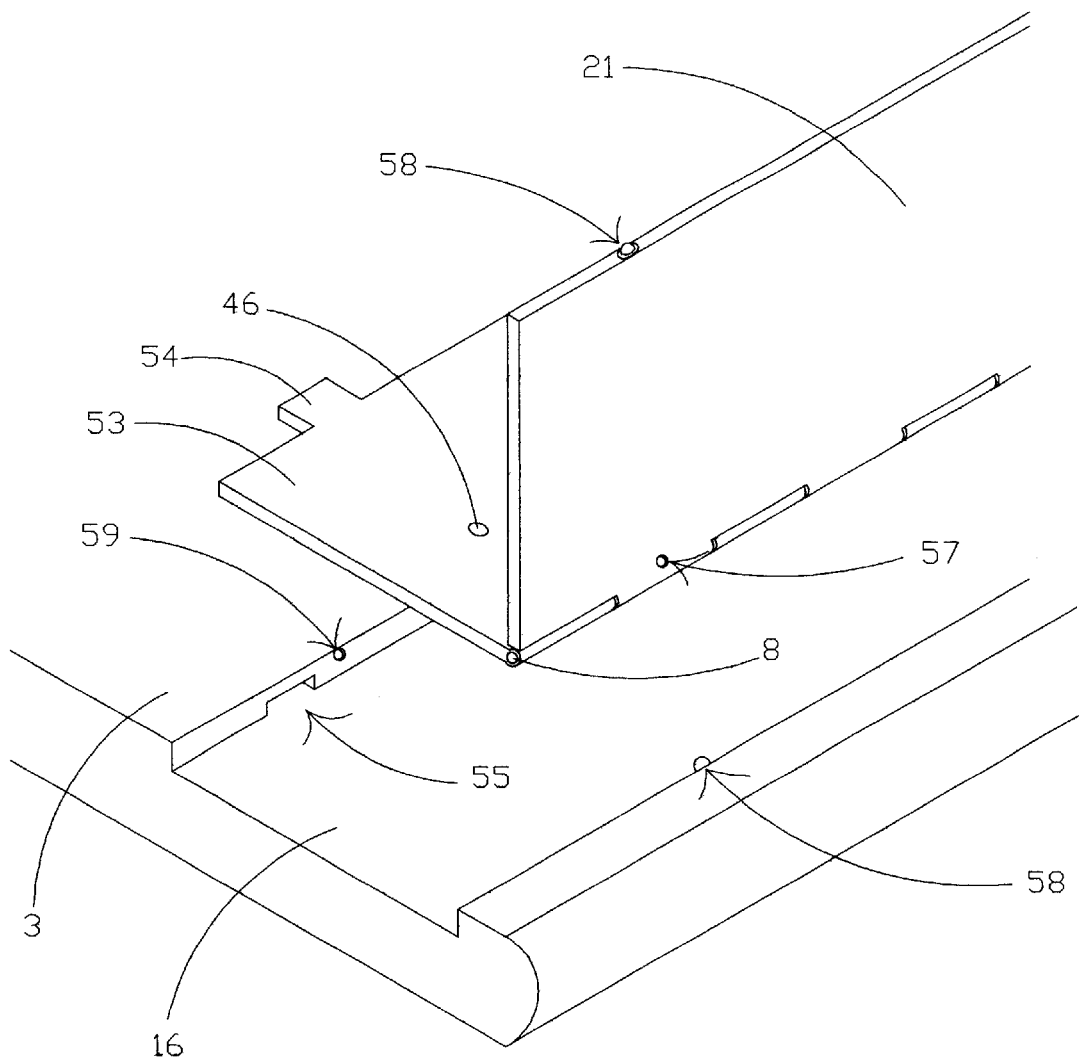

FIG. 45 shows an exploded isometric rear view of a portion of a primary tailgate (3) and Retractable Stop from FIG. 44, and showing how the Retractable Stop may be affixed to the recessed area on the front side of the primary tailgate (3).

Figure 46:
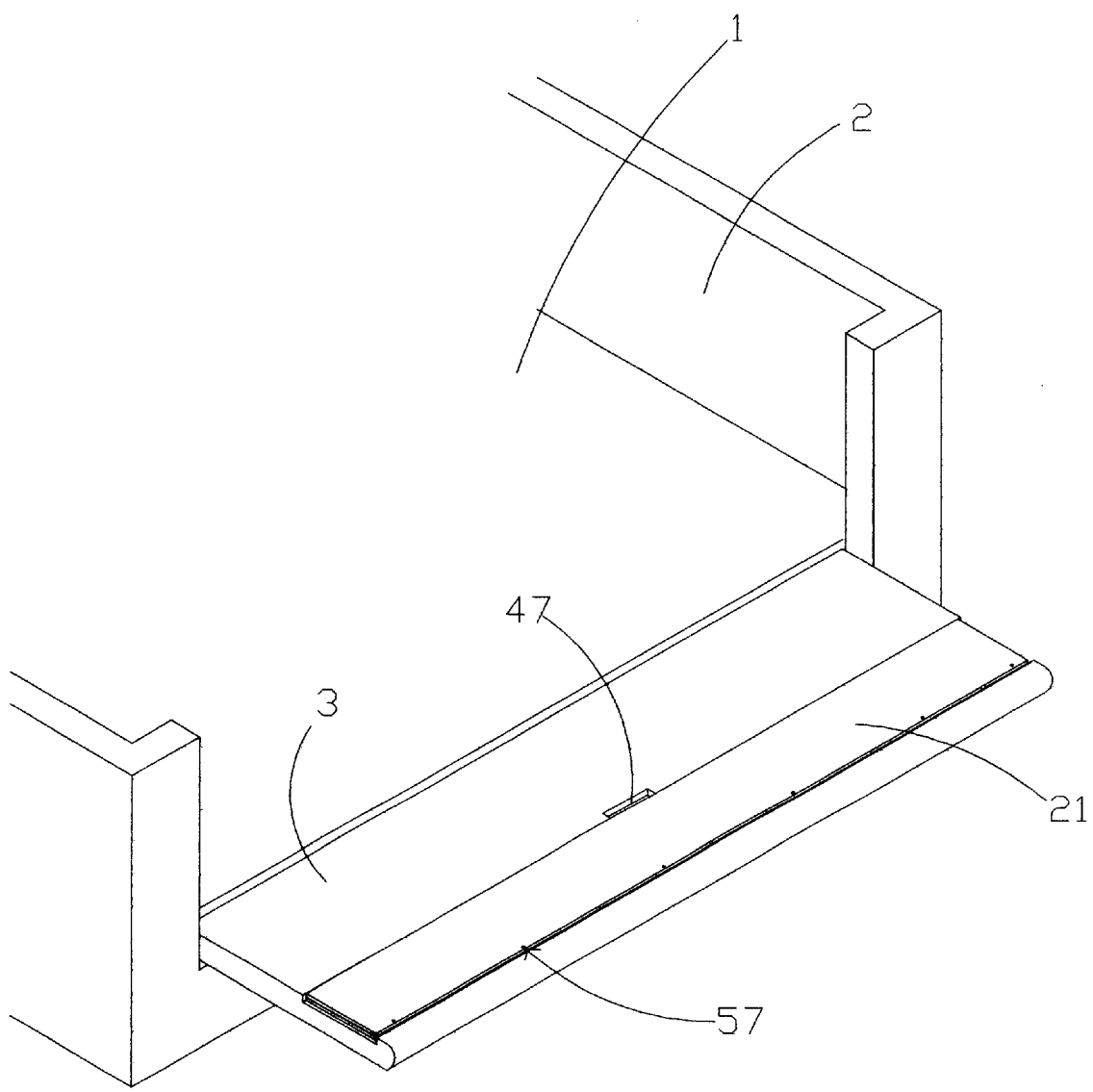

FIG. 46 shows an isometric view of a primary tailgate (3) with a Retractable Stop in the horizontal closed position, and the Retractable Stop fit into the recessed area on the front side of the primary tailgate (3).

Figure 47:
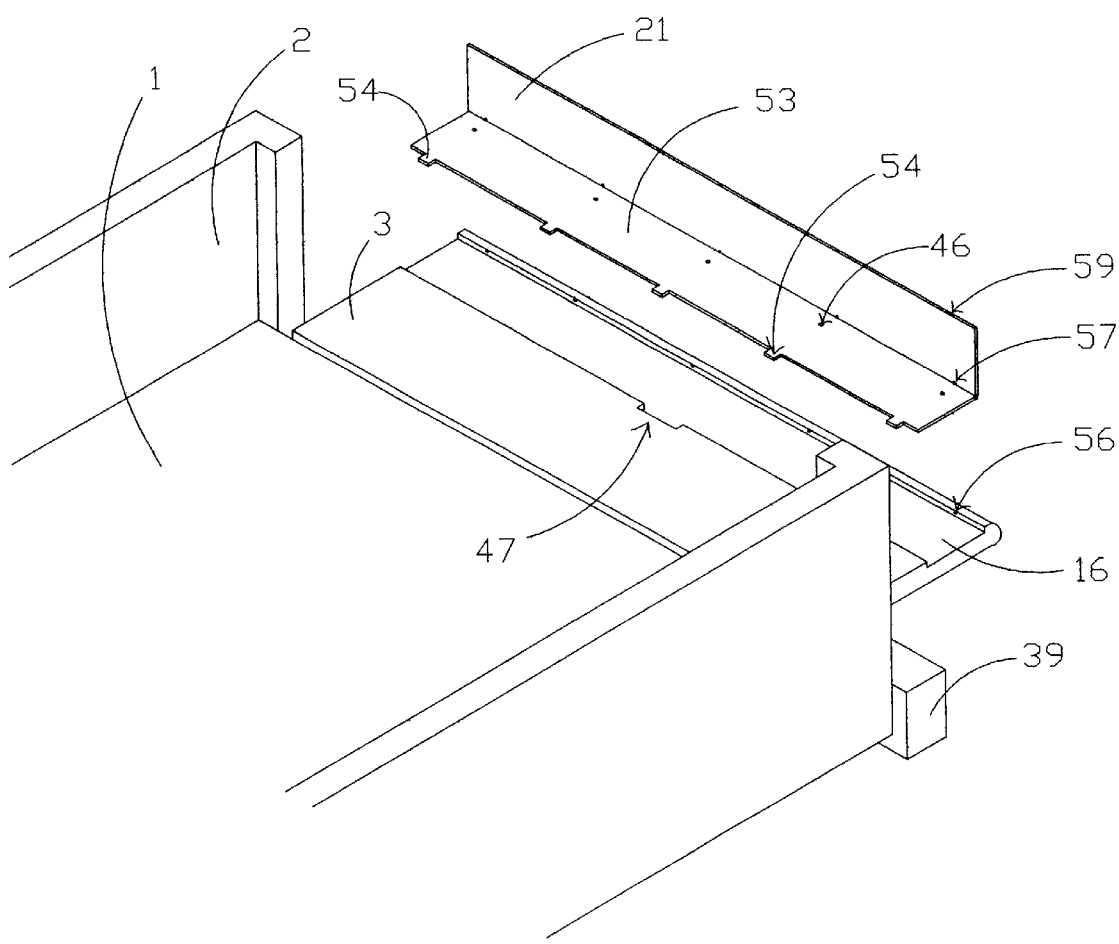

FIG. 47 shows an exploded isometric front view of a primary tailgate (3), and showing how a Retractable Stop may be affixed to the recessed area on the front side of the primary tailgate (3). The primary dimple ports (57) and the secondary dimple ports (59) are located on the extended arm (21).

Figure 48:
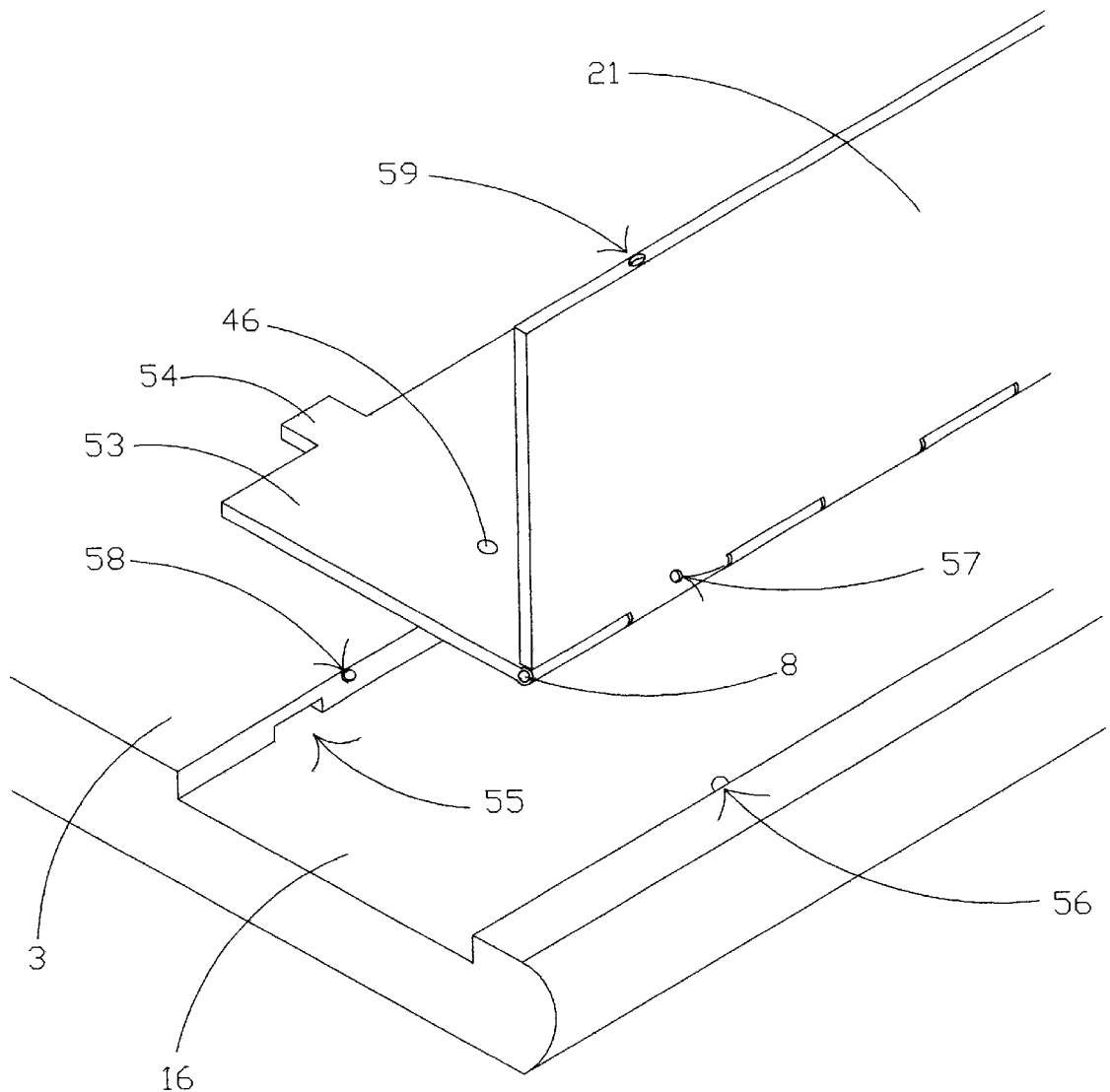

FIG. 48 shows an exploded isometric rear view of a portion of a primary tailgate (3) and Retractable Stop from FIG. 47, and showing how the Retractable Stop may be affixed to the recessed area on the front side of a primary tailgate (3).

Figure 49:
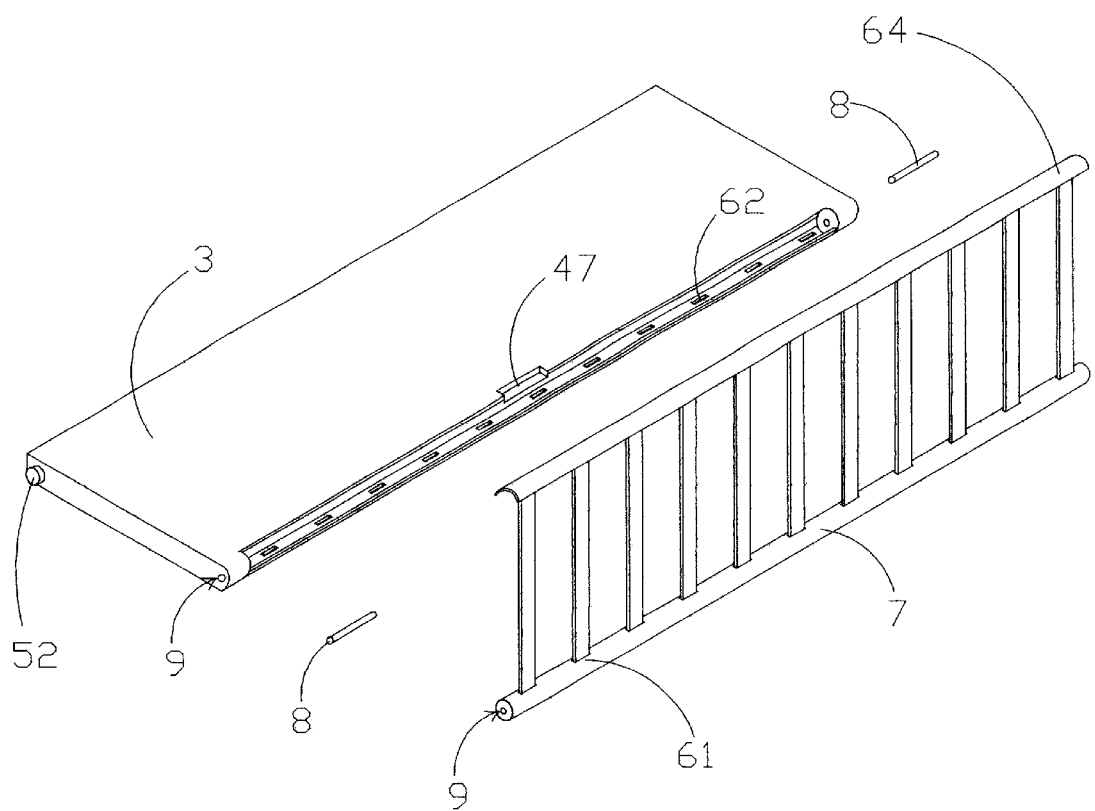

FIG. 49 shows an exploded isometric rear view of an Auxiliary Tailgate with an open frame back panel (5) that is retractable into the primary tailgate (3).

Figure 50:
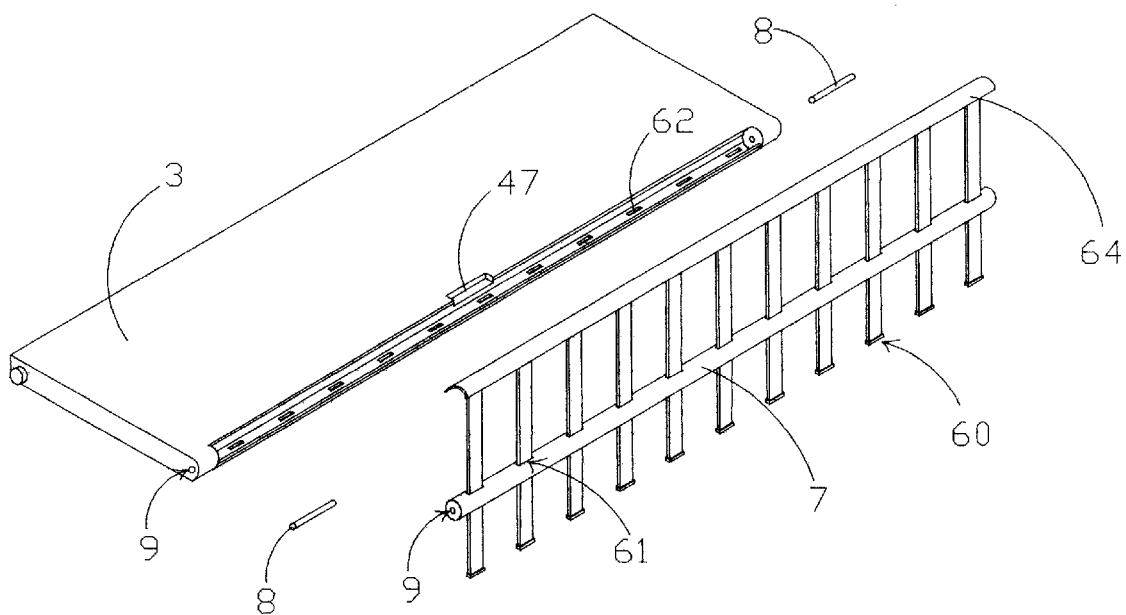

FIG. 50 shows an exploded isometric rear view of an Auxiliary Tailgate with an open frame back panel (5) that is retractable into the primary tailgate (3), and is shown partially retracted into the primary frame port (61).

Figure 51:
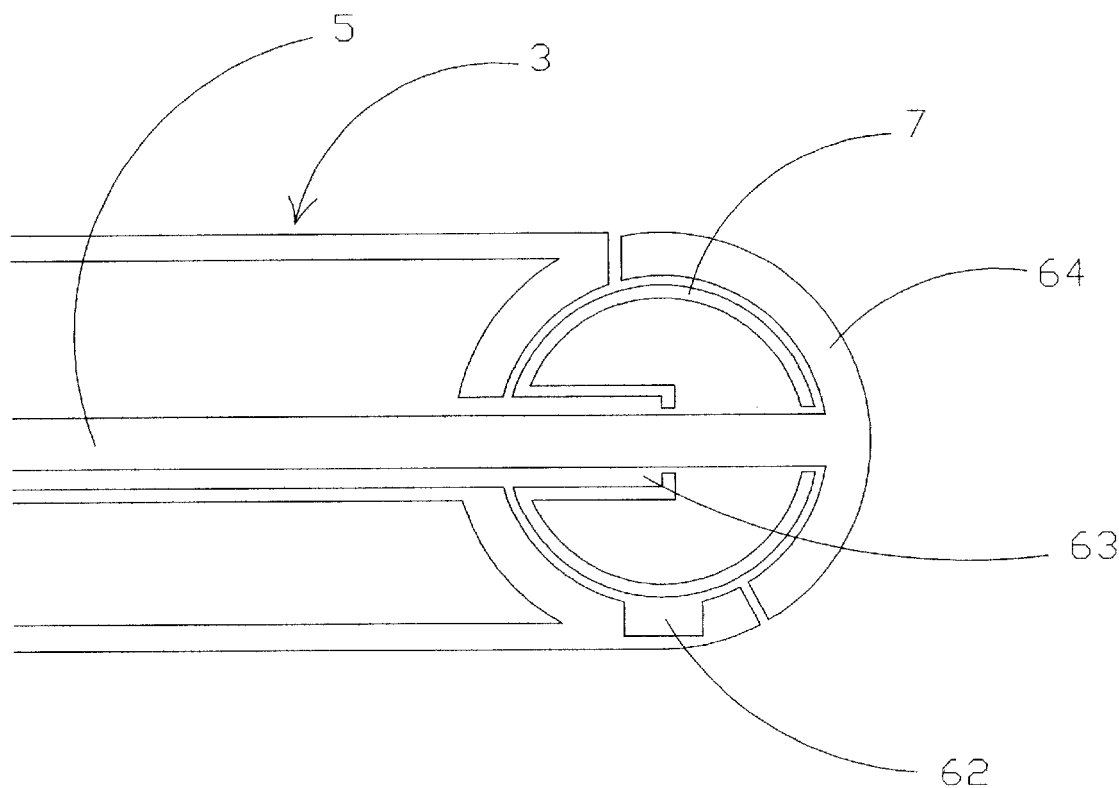
Figure 56:
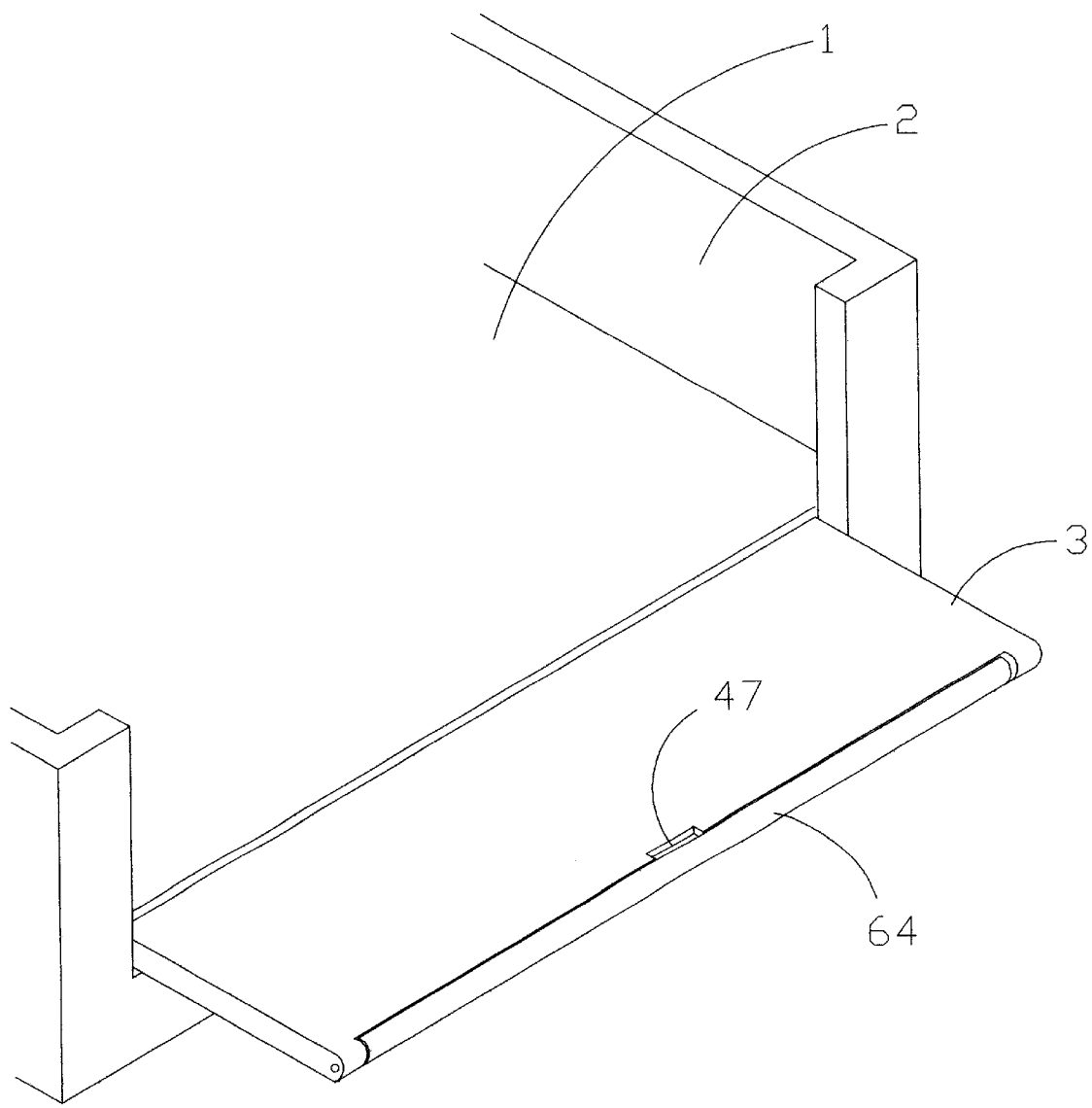

FIG. 51 shows a sectional side view of the area around the horizontal back panel hinge (7), for a Slide-Out Open Frame Auxiliary Tailgate, with a retractable open frame back panel (5) in the horizontal closed position, as shown in FIG. 56.

Figure 52:
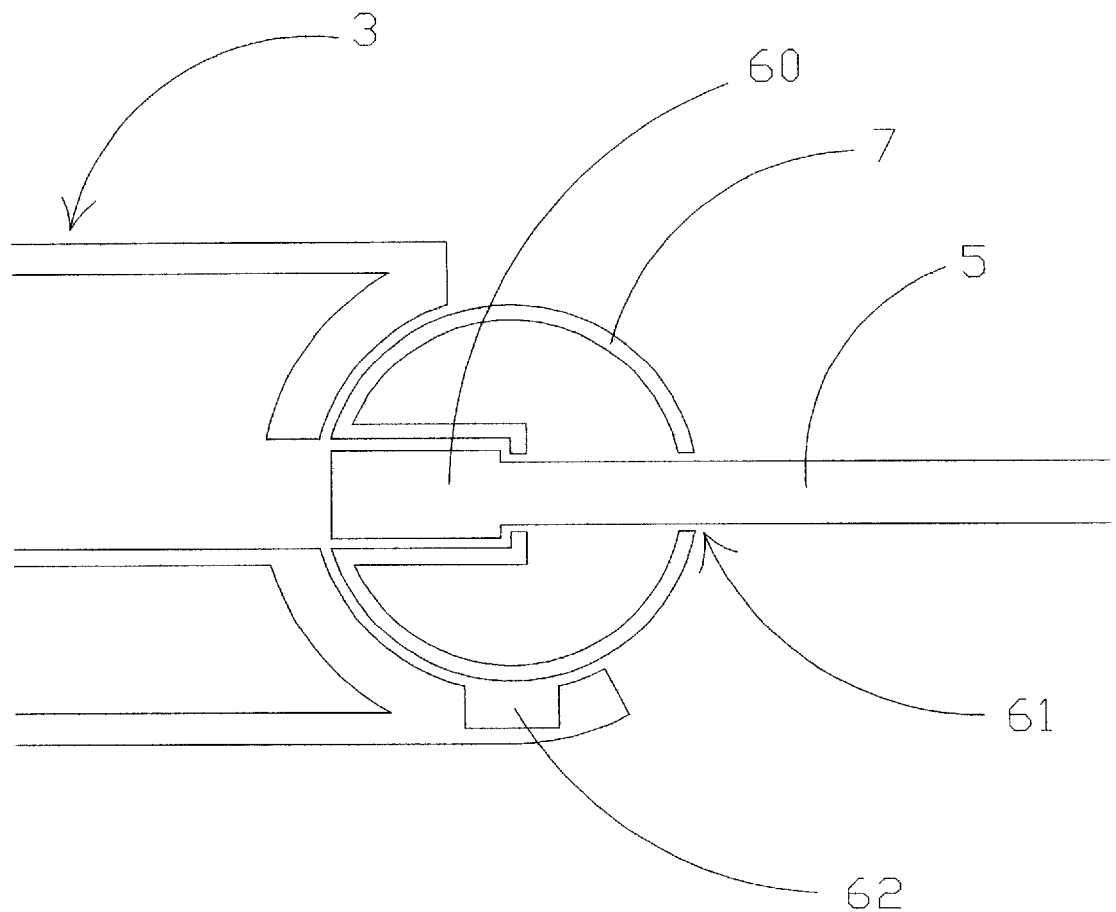
Figure 55:
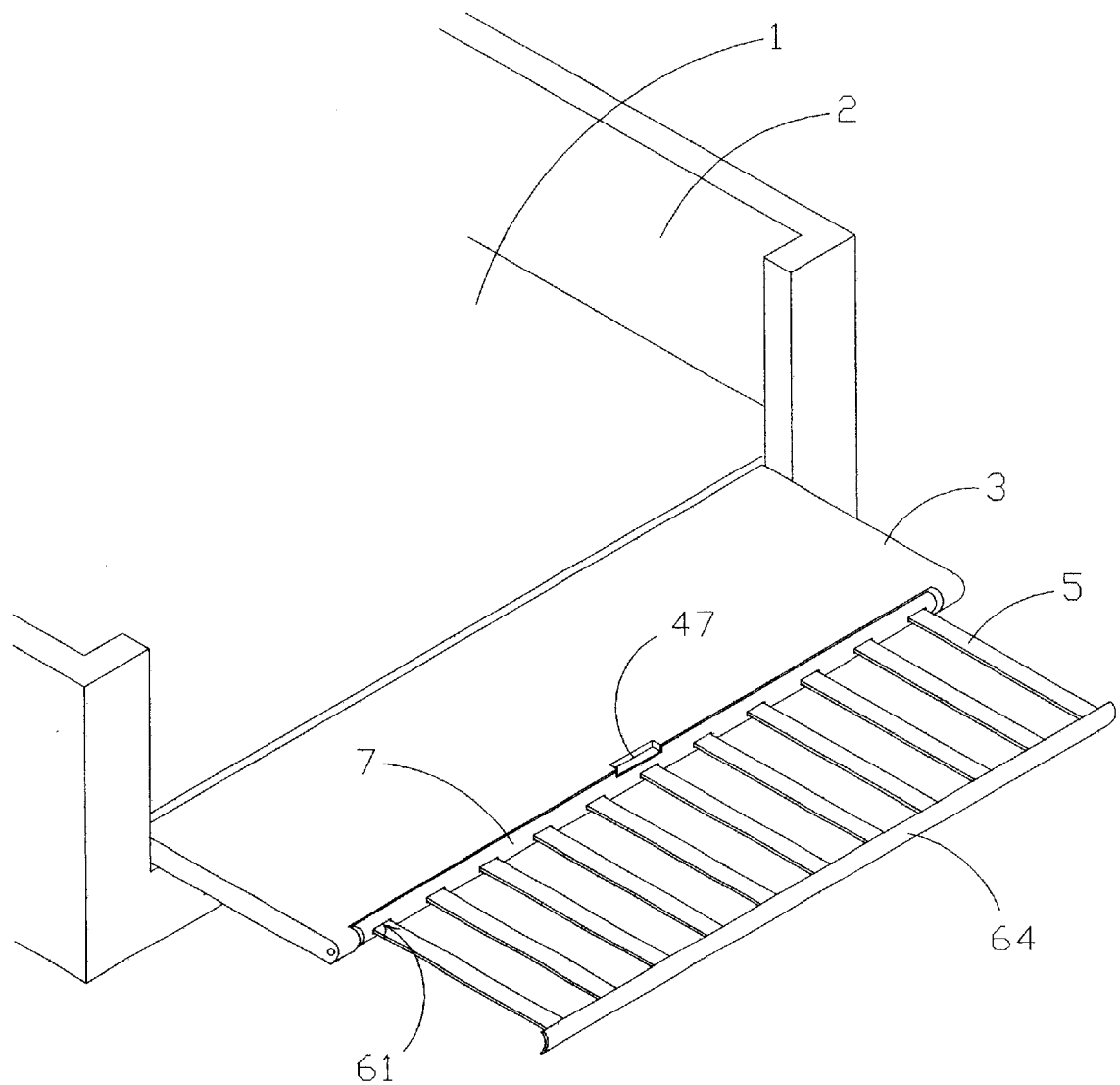

FIG. 52 shows a sectional side view of the area around the horizontal back panel hinge (7), for a Slide-Out Auxiliary Tailgate with a retractable open frame back panel (5) in the horizontal open position, as shown in FIG. 55.

Figure 53:
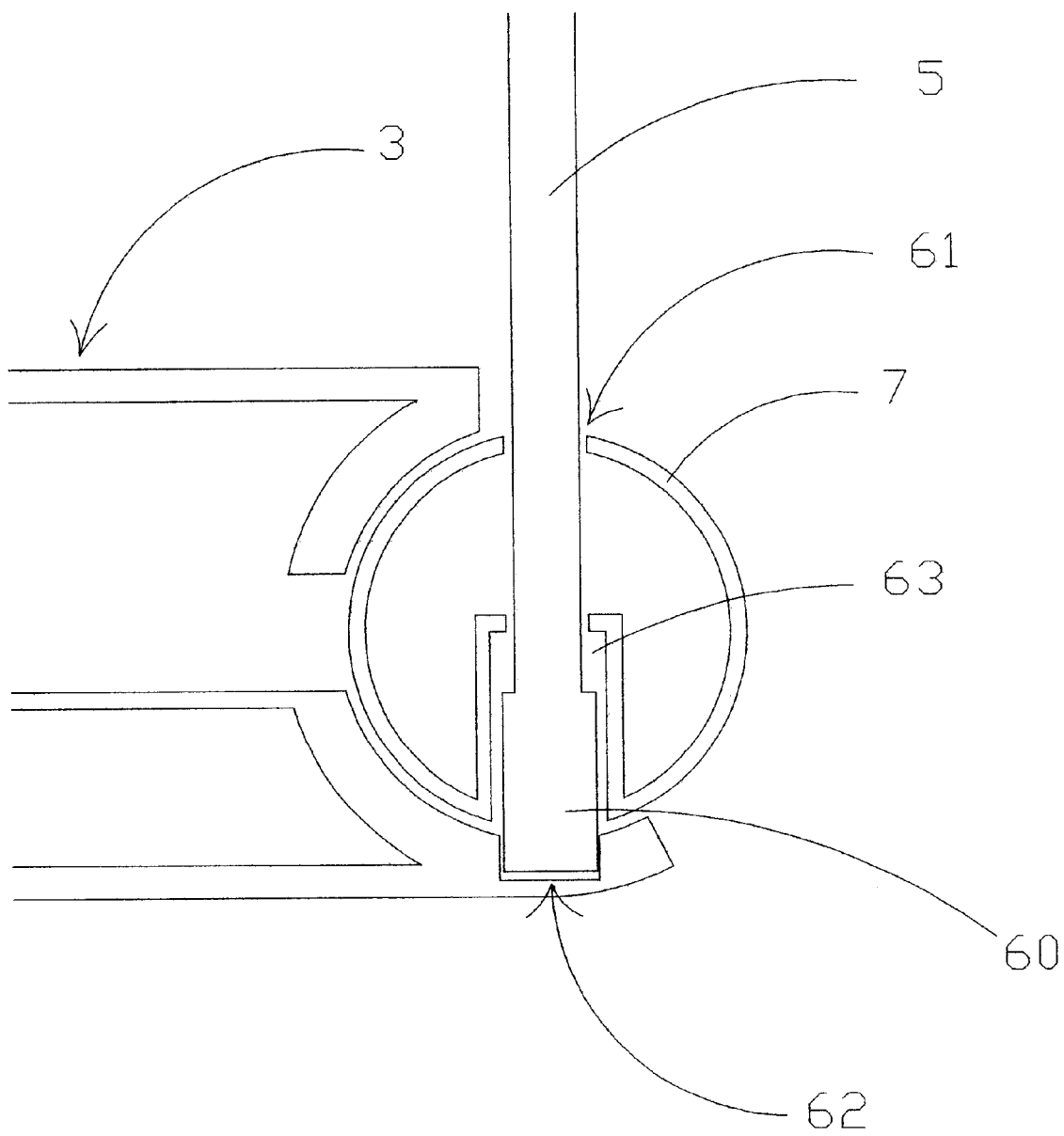
Figure 54:
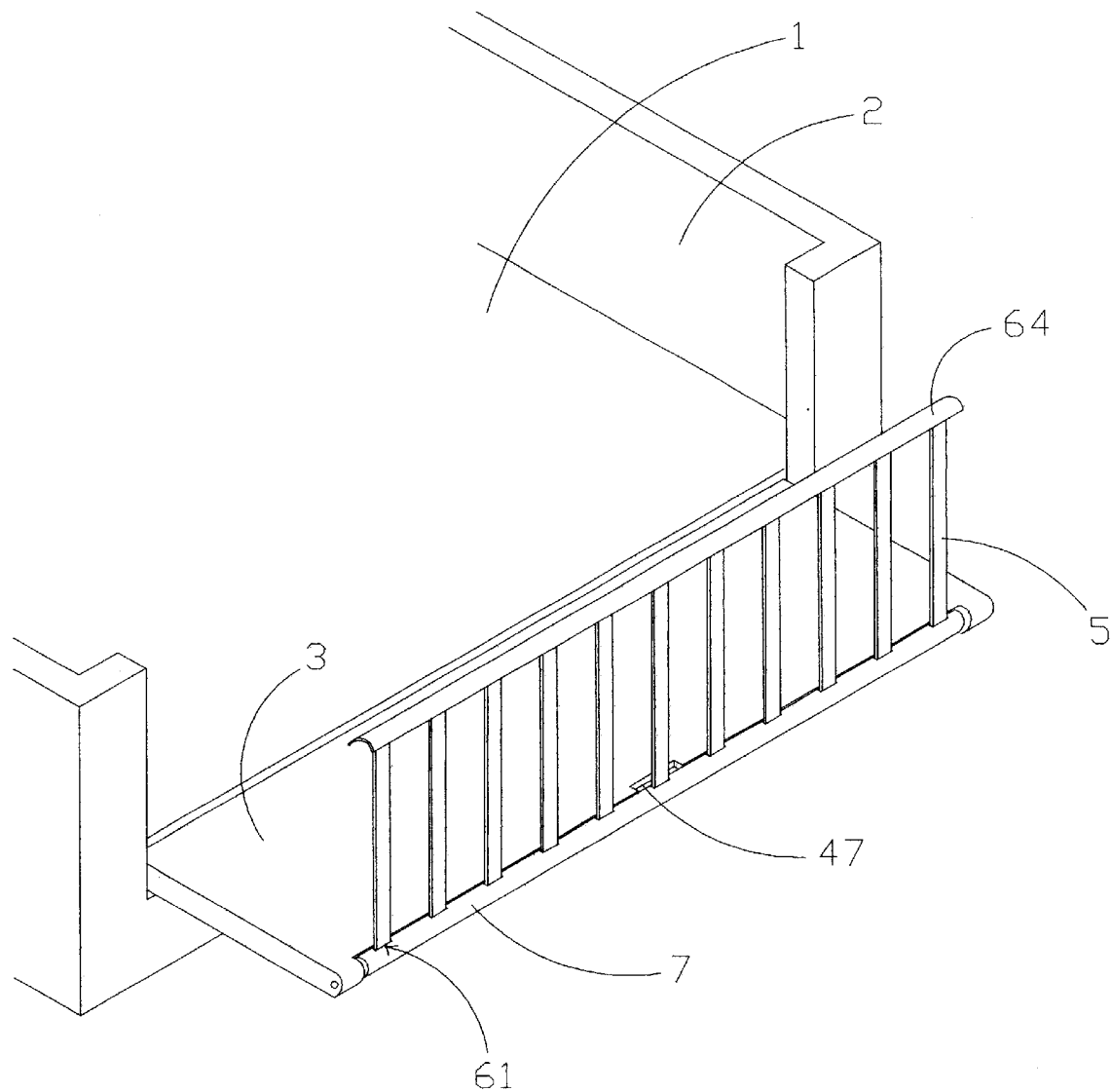

FIG. 53 shows a sectional side view of the area around the horizontal back panel hinge (7), for a Slide-Out Auxiliary Tailgate with a retractable open frame back panel (5) in the vertical open position, as shown in FIG. 54.

FIG. 54 shows an isometric rear view of an Auxiliary Tailgate with a retractable open frame back panel (5) in the vertical open position.

FIG. 55 shows an isometric rear view of an Auxiliary Tailgate with a retractable open frame back panel (5) in the horizontal open position.

FIG. 56 shows an isometric rear view of an Auxiliary Tailgate with a retractable open frame back panel (5) in the horizontal closed position.

Figure 57:
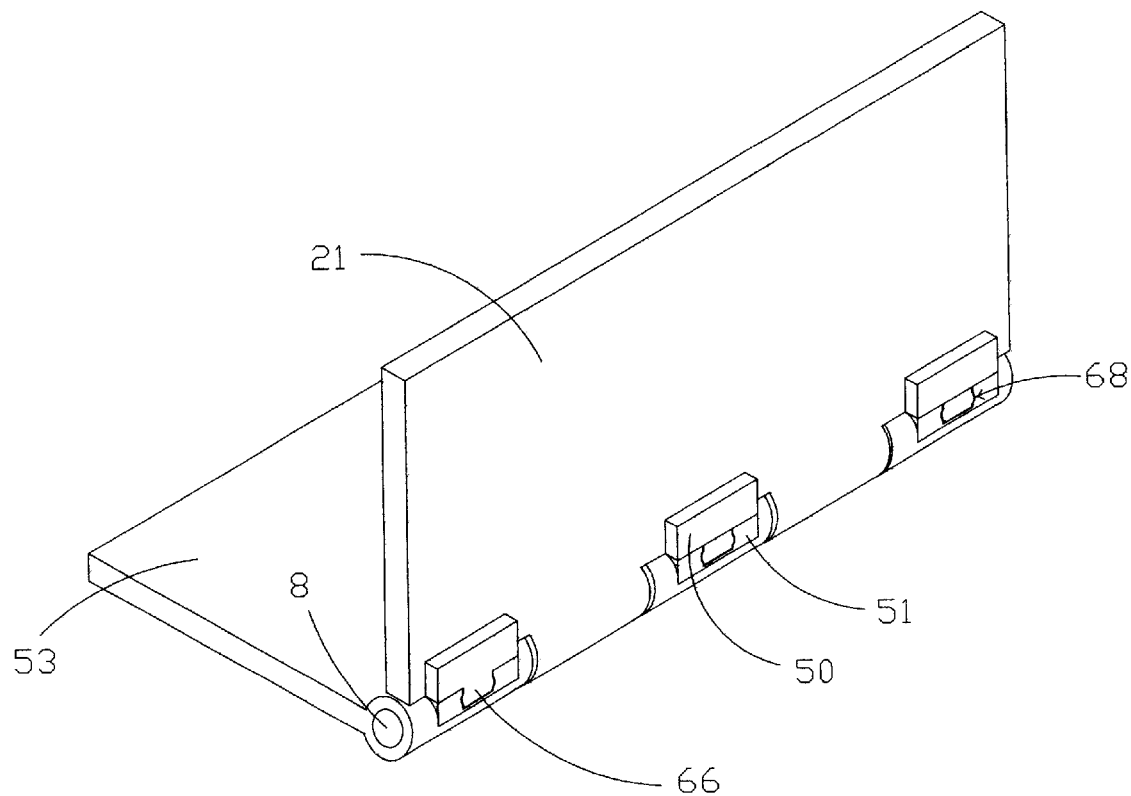

FIG. 57 shows an isometric rear view of a hinge (7, 20, 40) in the open position, that is adaptable for use with the Retractable Stop and the Auxiliary Tailgate, and showing the means for locking the hinge (7, 20, 40) in the open position.

Figure 58:
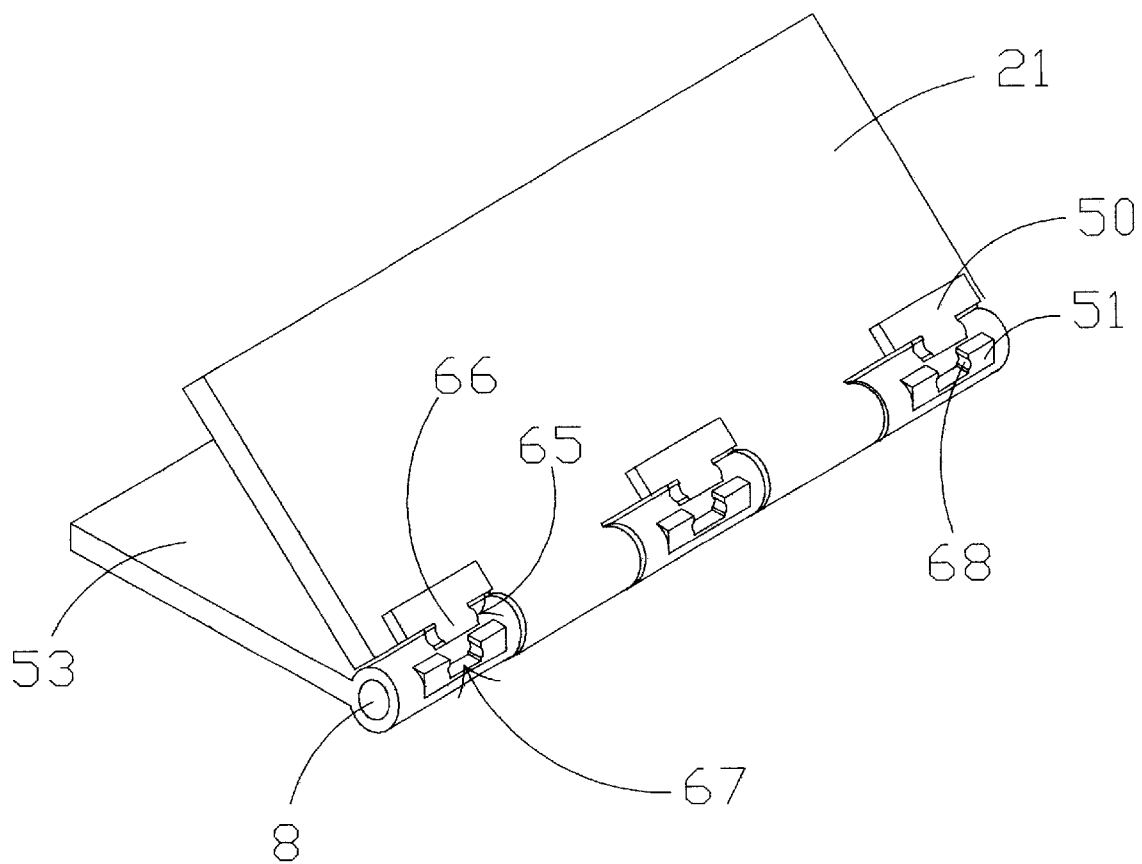

FIG. 58 shows an isometric rear view of a hinge (7, 20, 40) in the partially open position, that is adaptable for use with the Retractable Stop and the Auxiliary Tailgate, and showing the means for locking the hinge (7, 20, 40) in the open position.

DETAILED DESCRIPTION OF THE REFERENCE NUMERALS

Referring now to the drawing figures, like reference numerals are used to refer to like specific parts of the various Drawing Figures and components cited in the specification. The description of the reference numerals used to describe the various parts of the Drawing Figures and the specification and its appended claims follows.

The truck bed (1) is the bed, payload area, cargo area, or the like, that is located in the rear portion of a truck or the like, and may be an open or closed truck bed (1). The truck bed (1) generally extends from the back of the cab of a truck to the primary tailgate (3) of a truck, as shown in, e.g., FIGS. 1–4, 8–14, 16–18.

The truck bed wall (2) is the wall or the like that is generally perpendicular to and extends in a vertical direction from the attached horizontal truck bed (1). The truck bed wall (2) generally extends about three sides of the truck bed (1) perimeter, and generally excludes the primary tailgate (3) area. There is typically a left, a right and a front truck bed wall (2) in most trucks or the like, and particularly pickup trucks.

The primary tailgate (3) is the tailgate that may be factory issue and is located at the terminal end of the truck bed (1), and may be used to enclose the terminal end of the truck bed (1) with a component, i.e., the tailgate, that effectively acts as fourth truck bed wall (2), as shown, e.g., in FIGS. 1–4, 8–14, and 16–18.

Figure 1:
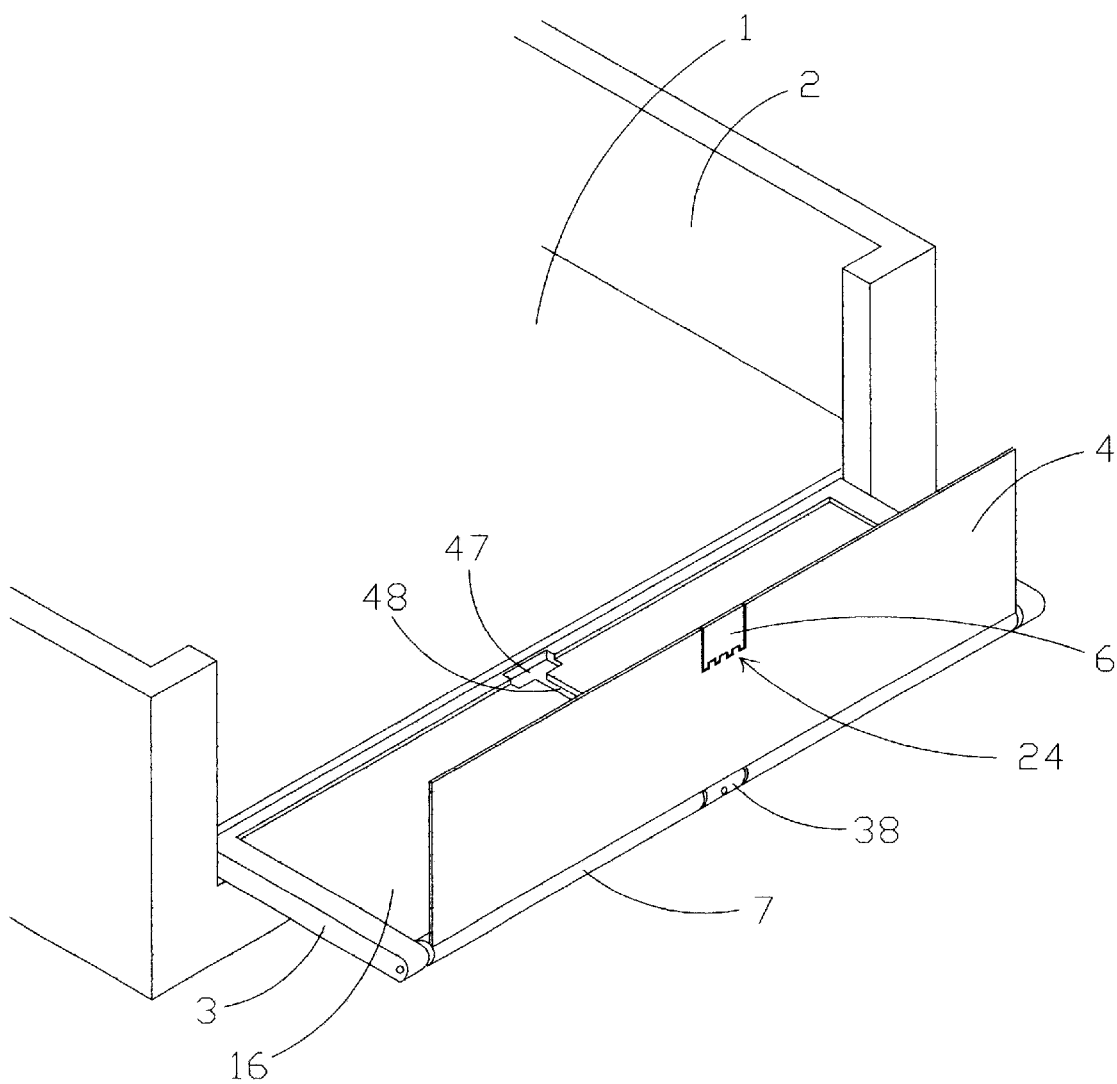
FIG. 1 shows an isometric rear view of a truck with an Auxiliary Tailgate attached thereto, and showing the primary tailgate (3) in the horizontal open position, and the solid body back panel (4) of the Auxiliary Tailgate in the vertical up position.

The back panel (4) is the major component of the Auxiliary Tailgate, which acts as a secondary tailgate or fourth truck bed wall (2), when the primary tailgate (3) is in the horizontal open position, and the back panel (4) is raised to the vertical up position, as shown in FIG. 1.

Figure 13:
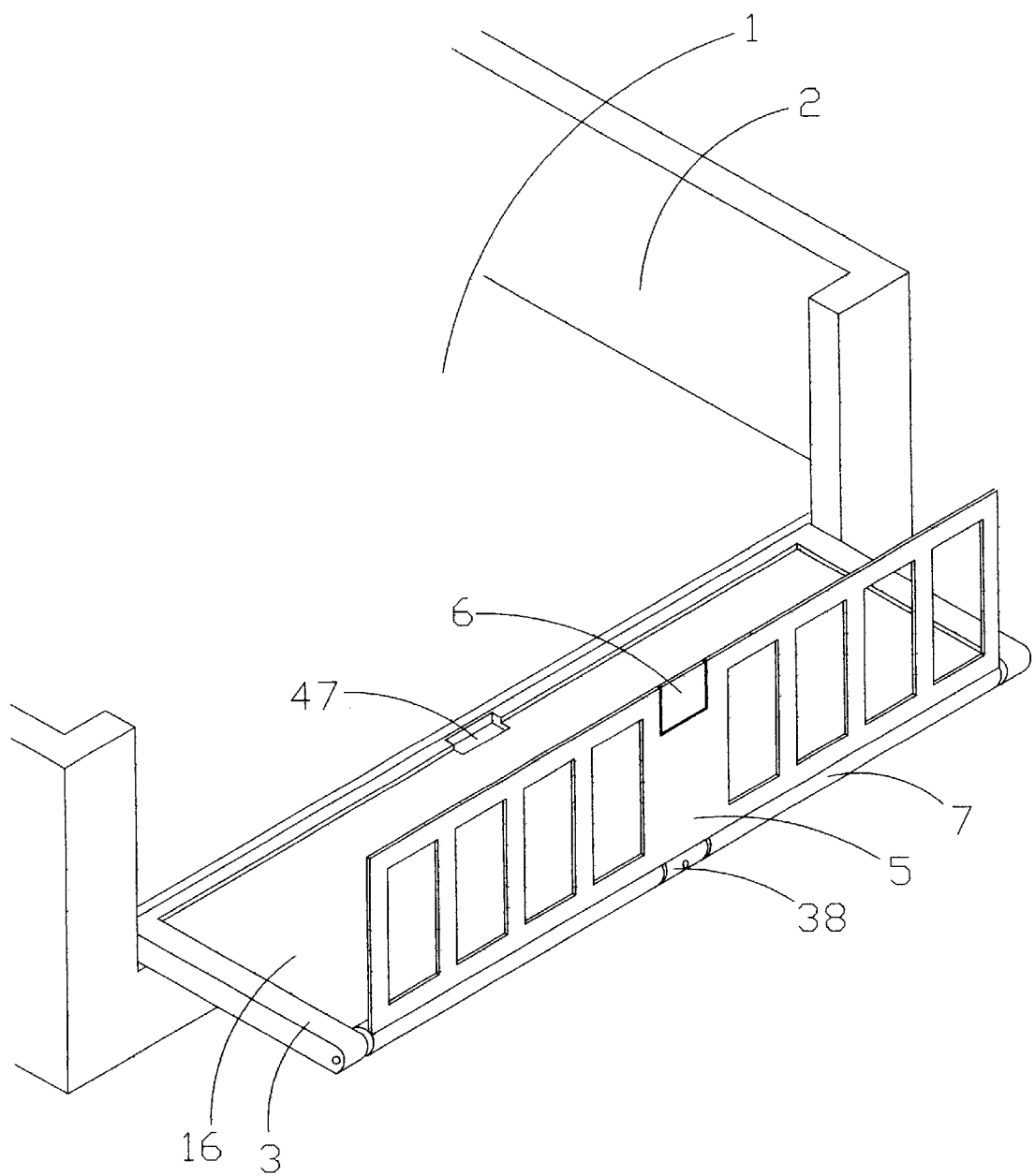
FIG. 13 shows an isometric view of a truck with an Auxiliary Tailgate attached thereto, and showing the primary tailgate (3) in the horizontal open position, and the attached open frame back panel (5) of the Auxiliary Tailgate in the vertical up position.

The open frame back panel (5) is the embodiment of the back panel (4) where the back panel (5) is partially open or has a grid-like or a frame-like appearance, as shown in FIG. 13. The open frame back panel (5) is preferred in some applications of the Auxiliary Tailgate because of the aerodynamic advantages of a more streamlined flow than is found in a solid body back panel (4), and because with the open-frame back panel (5), one may enclose the truck bed (1), and have over-sized objects such as lumber or piping extending through said open-frame back panel (5) a safe distance, and in a manner that said over-sized objects will be transported in a more stable position, and will not roll around in the truck bed (1). Throughout this specification and its appended claims, the team back panel (4) may also be interpreted to also refer to the open-frame back panel embodiment. The term solid body back panel is used to distinguish the open-frame back panel (5) from embodiments of the back panel (4) that may not be synonymous with the open-frame back panel.

The back panel handle (6), as shown in, e.g., 1–2, 4, 8–9, 13, 15, 19, 37, and 41, is the handle grip, finger catch, finger hole or holes, or the like, that is be used to raise or lower the back panel (4 or 5), and in some embodiments of the Auxiliary Tailgate, to control the hinge pin (8), thereby controlling the fixed position of the back panel (4), as shown, e.g., i FIGS. 5–7, 15, and 19. The clam shell embodiments of the Auxiliary Tailgate may utilize a plurality of finger holes or the like, centrally located near the top edge of the rear side of the back panel (4 or 5), to allow the user to control the axis of rotation of the back panel (4 or 5) and its two attached side panels (10 and 11).

The horizontal back panel hinge (7) is the hinge, pivot point, pivot line, or the like, which is located at the interface between the back panel (4 or 5) and the primary tailgate (3). The horizontal back panel hinge (7) is the means and mechanism that allows the back panel (4) to rotate from a closed position to the open positions, and back to the closed position, as shown, e.g., in FIGS. 1–4, 10–11, 13, 15–16, and 19. The horizontal back panel hinge (7) may, in some embodiments, contain the set of hinge pin ports (9) that set the positions for securing the back panel (4 or 5) into position, as shown, e.g., in FIGS. 15 and 19. The horizontal back panel hinge (7) may in some embodiments utilize the new and useful 90-degree hinge (20) designs shown in FIGS. 38, 39, 57, and 58, where the back panel (4) may be rotated to the horizontal closed position for loading and unloading payload from the truck bed (1), and then rotated back to a 90-degree horizontal open position for transport. These 90-degree hinge (7, 20) designs may vary in its open angular position by 15-degrees, e.g., thereby being between 75-degrees and 105-degrees, depending upon the hinge (7, 20) design. A preferred embodiment would be a 95-degree angle hinge (7, 20), to allow for a slight gravitational effect to keep the hinge (7, 20) in position. Throughout this specification and its appended claims, reference to a horizontal back panel hinge (7) would also include the hinge pin (8) for said hinge (7), unless otherwise noted.

Figure 15:
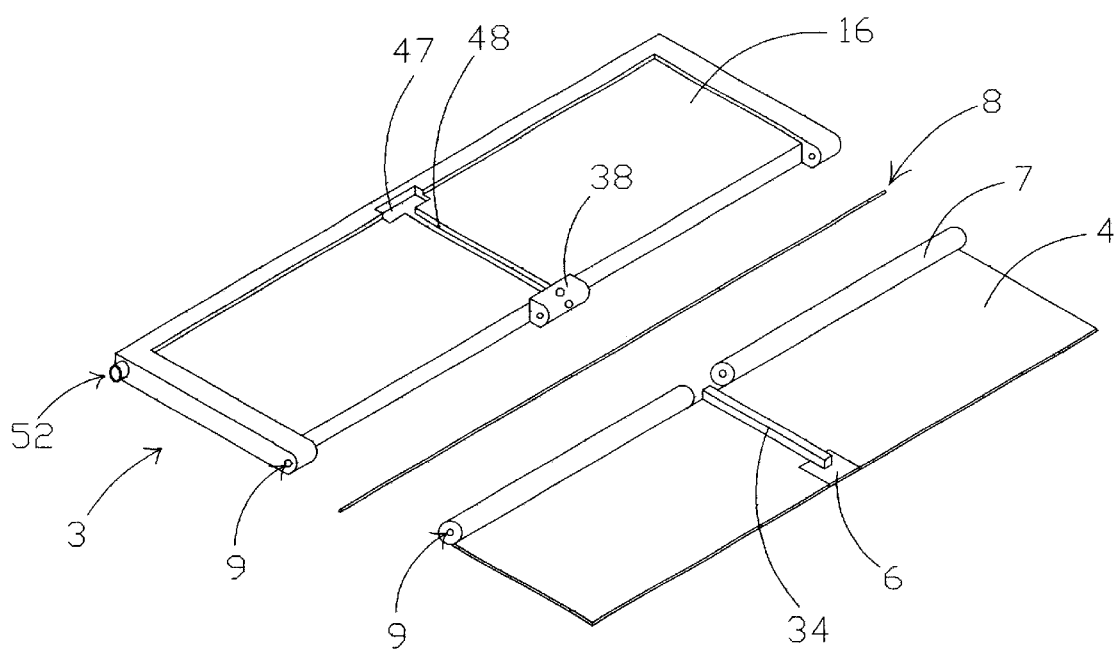
FIG. 15 shows an exploded isometric rear view of a primary tailgate (3) in the horizontal open position, and the solid body back panel (5) for a preferred embodiment of the Solid Body Auxiliary Tailgate, in the horizontal open position.

The hinge pin (8), as shown in FIGS. 15 and 19, is the cable controlled pin, tongue, rod, axle, or the like, that matedly may fit into a hinge pin port (9), and through a hole or channel in a hinge (7, 12), thereby allowing the hinge (7, 12) to rotate about the axis of the hinge pin (8). The hinge pin (8) is the means that effectively attaches the Retractable Stop to the back panel (4 or 5), and is the means that effectively attaches the back panel (4 or 5) to the primary tailgate (3).

The hinge pin port (9) is the port, receptacle, hole, channel, or the like, that matedly receives the hinge pin (8), and may thereby lock the back panel (4 or 5) into a pre-set position onto the primary tailgate (3), as shown in FIGS. 15 and 19, and may also thereby lock the retractable stop hinge (20) into a pre-set position onto the primary tailgate (3) or the back panel (4 or 5).

The left side panel (10) is the panel, flap, wall, or the like, located on the left side of the clam shell embodiments of the Auxiliary Tailgate. The left side panel (10) is attached or affixed to the back panel (4) with a vertical panel hinge (12), thereby allowing the left side panel (10) to rotate about the axis of the vertical panel hinge (12), as shown, e.g., in FIGS. 23–25.

The right side panel (11) is the panel, flap, wall, or the like, located on the right side of the clam shell embodiments of the Auxiliary Tailgate. The right side panel (11) is attached or affixed to the back panel (4) with a vertical panel hinge (12), thereby allowing the right side panel (11) to rotate about the axis of the vertical panel hinge (12), as shown, e.g., in FIGS. 23–25.

The vertical panel hinge (12) is the vertical hinge, pivot point, pivot line, or the like, that is utilized in the clam shell embodiments of the Auxiliary Tailgate, and such that there are generally two such vertical panel hinges (12), with one vertical panel hinge (12) located at the interface between the back panel (4) and the left side panel (10), and with a second vertical panel hinge (12) located at the interface between the back panel (4) and the right side panel (11). Throughout this specification and its appended claims, reference to a vertical panel hinge (12) would include the hinge pin (8) for said hinge (12), unless otherwise noted. See, e.g., FIGS. 23–25.

The side panel hasp orifice (13) is the orifice, hole, slit, or the like, that is located on the side panels (10, 11), and allows a truck bed wall hasp (17) to matedly fit through the side panel hasp orifice (13) to lock the respective side panel (10, 11) into position on the truck bed wall (2), as shown in FIG. 23.

The back panel hasp orifice (14) is the is the orifice, hole, slit, or the like, that is located on the back panel (4), to allow a back panel hasp (15) to matedly fit through the back panel hasp orifice (14) to lock the back panel (4) onto the primary tailgate (3), as shown in FIG. 24.

The back panel hasp (15) is the hasp, turnbuckle, catch, or the like, that is mounted with a screw, bolt, rivet, solder, weld, or the like, into a position on the primary tailgate or, on the back panel recessed area (16), in the preferred embodiments of the Auxiliary Tailgate, to allow the back panel hasp (15) to matedly fit through the back panel hasp orifice (14), and lock the back panel (4) into a closed position, as shown in FIGS. 23–24.

Figure 2:
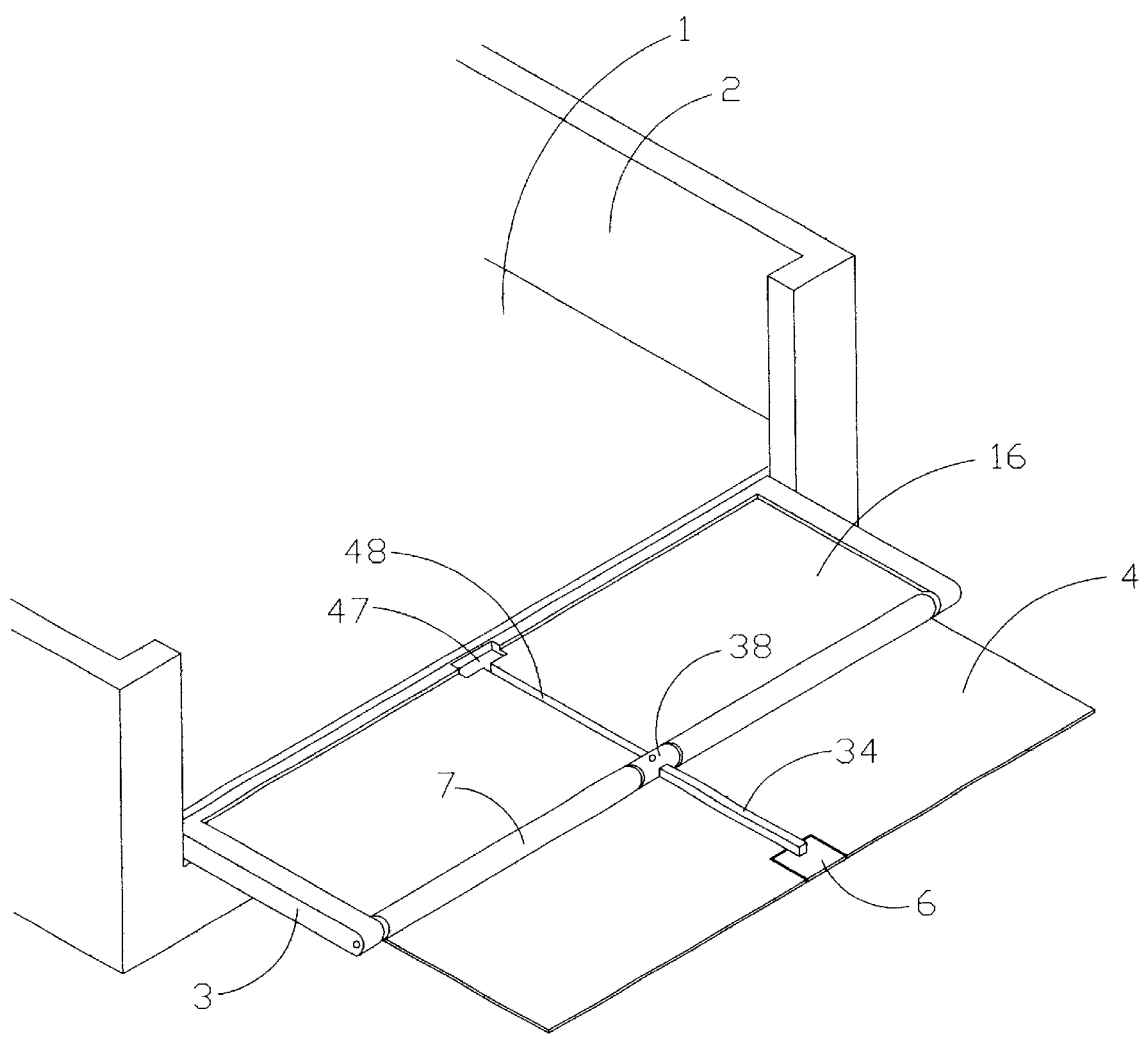
FIG. 2 shows an isometric rear view of a truck with an Auxiliary Tailgate and showing the primary tailgate (3) in the horizontal open position, and the solid body back panel (4) of the Auxiliary Tailgate in the horizontal open position.
Figure 3:
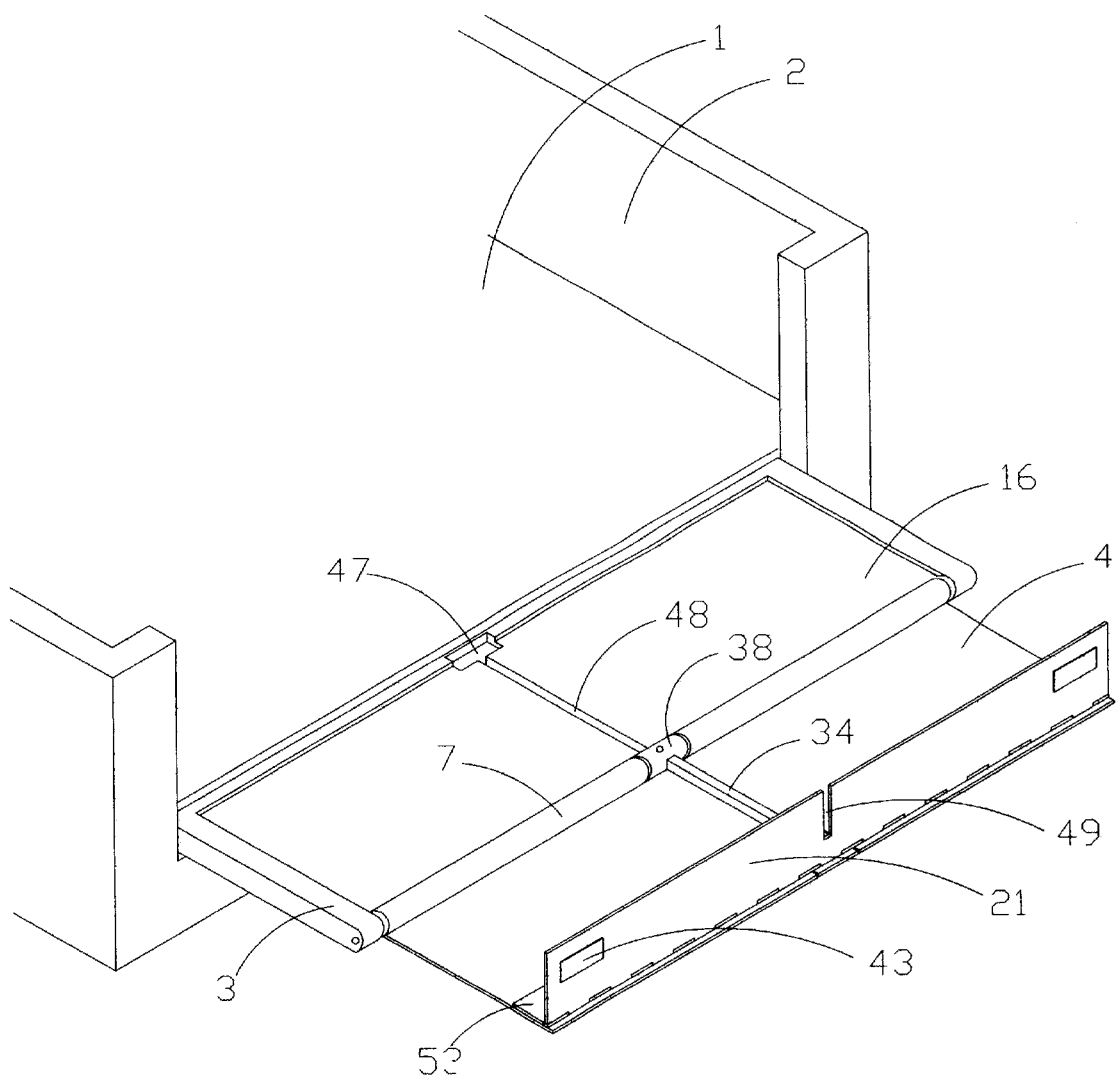
FIG. 3 shows an isometric rear view of a truck with and Auxiliary Tailgate and a Retractable Stop attached thereto, and showing the primary tailgate (3) in the horizontal open position, and the solid body back panel (4) of the Auxiliary Tailgate in the horizontal open position, and with a Retractable Stop in the up position.

The back panel recessed area (16), as shown in FIGS. 1–3, 9, 11, 13, 15–16, and 19, is the recessed area that is located on the rear side of the primary tailgate (3), and is molded or formed to matedly receive the back panel (4 or 5), that is attached at the horizontal back panel hinge (7). When the back panel (4 or 5) is rotated about the axis of the horizontal back panel hinge (7), and rotated into the back panel recessed area (16), the fit should be snug and a small protruding dimple, a snap or the like may optionally be used as an additional locking means, in addition to the optional locking means of the cable pin (29) and the optional back panel hasp (15). In some embodiments of the inventions disclosed therein, the back panel recessed area (16) may alternatively be used to receive of a hold a back panel (4 or 5) with a Retractable Stop affixed thereto, a mounting plate (53) for either a Retractable Stop or an Auxiliary Tailgate, or a mounting plate (53) and the extended arm (21) of a Retractable Stop, as shown in FIG. 3.

The truck bed wall hasp (17) is the hasp, turnbuckle, catch, or the like, that is mounted with a screw, bolt, rivet, solder, weld, or the like, into a position on the truck bed wall (2), to allow the truck bed wall hasp (17) to matedly fit through the side panel hasp orifice (13), and effectively lock the side panel (10, 11) into place in the open position, as shown in FIG. 23. The preferred clam shell embodiment of the Auxiliary Tailgate would have two truck bed wall hasps (17), with one truck bed wall hasp (17) located on the left side of the truck bed wall (2), and a second truck bed wall hasp (17) located on the right side of the truck bed wall (2), to allow these two truck bed wall hasps (17) to matedly fit through the left side panel hasp orifice (13) and the right side panel orifice (13), respectively, and to effectively lock the left side panel (10) and the right side panel (11) into position.

The side panel restraining means (18) is the optional set of magnets, or other attaching, affixing, or fastening means that may be used to affix the side panels (10, 11) to a metal embodiment of the back panel (4), thereby keeping the side panels (10, 11) from interfering with loading and other activities, when the primary tailgate (3) is in the down position, and the back panel (4) is in the vertical down position, as shown in FIG. 25. The side panel restraining means (18), i.e., the magnets, would be affixed to a position on the side panels (10, 11), so that the side panels (10, 11) may be folded up and attached, by magnetic means, to the adjacent back panel (4).

The top back panel edge (19) is the top edge of the tailgate (3), when the back panel (4) is in the vertical position. The top back panel edge (19) is one of the positions for attaching or affixing a hinge for one of the embodiments of the Retracted Stop, as shown in FIG. 42.

Figure 17:
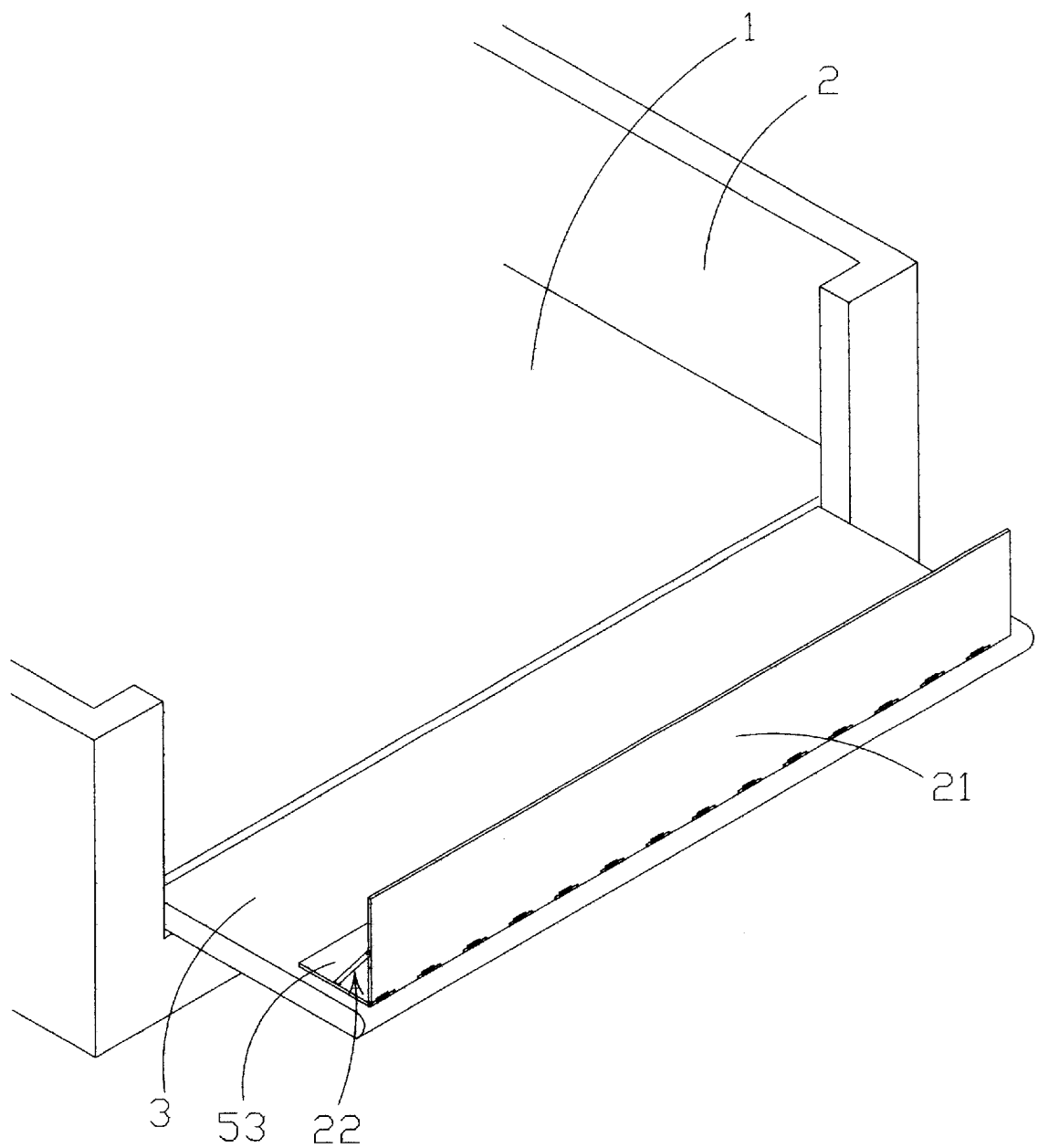
FIG. 17 shows an isometric rear view of a portion of a truck, and showing the primary tailgate (3) in the horizontal open position, and showing the modified embodiment of the Retractable Stop, and with said Retractable Stop in the up position.

The retractable stop hinge (20) is the hinge, axle, or the like, which may be located at along the top back panel edge (19), as shown in FIG. 3, or alternately along the top edge of the primary tailgate (3), as shown in FIG. 17. The retractable stop hinge (20) is preferred to be a hinge (20) that would stop or lock at approximately 90-degrees, when the Retractable Stop is in the open position, an example of new and useful 90-degree hinge (20) embodiments devised and engineered by Mark Willard Vejner, are shown in FIGS. 38, 39, 57, and 58. The use of a manually operated hinged tongue (22) and its associated hinged tongue port (23) is one means to assure that the Retractable Stop remains in the open position, when opened, and does not fall back into the closed position, during transit, when the truck may be passing over bumps and rough roads.

The extended arm (21) is the part of the Retractable Stop that spirals, arcs, or extends out from the central axis of some embodiments of the Retractable Step, and is, in effect, the wall or barrier that is the visible stopping means, as shown in FIG. 32, which shows a solid body extended arm (21). Some modified embodiments of the extended arm (21) may be open frame, and may be attached or affixed to one of the hinge pieces (41) in a two piece hinge (41), using mounting rivets (44) or the like. This modified embodiment of the extended arm (21) may be employed in kit versions or embodiments of the Retractable Stop, which would be easy to assemble, and would be comprised essentially of the planar extended arm (21), one or more two piece hinges (41), mounting rivets (44) or the like, and one or more optional reflectors (43).

The hinged tongue (22) is an optional locking means for the Retractable Stop, and is optimally a tongue, hinged tongue, hinge, or the like that may rotate about an axis, and in an arc, such that when the Retractable Stop is in the open position, the hinged tongue (22) may be rotated into a hinged tongue port (23) or the like, thereby effectively locking the Retractable Stop into place in the open position. Two embodiments of the Retractable Stop using differing types of hinged tongue (22) are shown in FIGS. 27 and 29.

The hinged tongue port (23) is the port, slot, groove, or the like, that matedly receives the hinged tongue (22), and thereby holds the Retractable Stop into position at approximately 90-degrees. The hinged tongue port (23) may be located on the extended arm (21) of the Retractable Stop, as shown in FIG. 29, or may be located on the primary tailgate (3) or back panel (4), as shown in FIG. 27, or may be located on the retractable stop hinge (20), as shown in FIG. 30. When the hinged tongue (22) is matedly inserted into the hinged tongue port (23), the Retractable Stop is effectively locked into place in the open position.

The handle hinge (24) is the hinge, pivot point, pivot line, or the like, that allows the back panel handle (6), as shown in FIGS. 1, 37 and 41, to rotate about the axis of the handle hinge (24), thereby activating the attached cable (25), and its tethered cable pin (29), as shown in FIGS. 21 and 22.

The cable (25) is the cable, line, wire, tether, or the like, that is attached at one end to the handle hinge (24) in a first cable port (26), and is attached at the opposite end to a second cable port (27), that is typically protruding from the cable spring housing (32). The cable (25) may be composed of a metal, alloy, polymeric, or composite material, as the strength requirements may demand. A preferred embodiment would utilize a stainless steel cable (25), as shown in FIGS. 20–22.

The first cable port (26) is the port, slot, receptacle, or the like, that is attached, affixed or located on the hidden side of the back panel handle (6), as shown in FIG. 37, and securely receives and holds one of the two ends of the cable (25).

The second cable port (27) is the port, slot, receptacle, or the like, that is typically protruding from the cable spring housing (32), and securely receives and holds the terminal end of the cable (25), as shown in FIGS. 20–22.

The cable port rivet (28) is the one or more rivets, screws, bolts and nuts, solder, welds, clasp-pressed means, or other fastening means, used to affix the first cable port (26) to the hidden side of the back panel handle (6), as shown in FIG. 41. The clasp-pressed means is a preferred fastening means.

The cable pin (29) is the pin, tongue, rod, or the like, that is attached, affixed, or extending from behind the cable spring stop (31), and when activated, will matedly fit, by cable spring (30) action, into one of a plurality of cable pin ports (37), thereby affixing the position of the back panel (4). The cable pin (29) may be removed from a cable pin port (37) by manual action on the hinged back panel handle (6), thereby compressing the cable spring (30), and allowing manual rotation of the back panel (4) to another desired position where there is a cable pin port (37) to receive the cable pin (29), including the closed position, as shown in FIGS. 20–22.

The cable spring (30) is the compression spring or the like, that is located between the cable spring housing back (33) and the cable spring stop (31), and when released, forces the cable pin (29) into a cable pin port (37). Manual pressure on the back panel handle (6) compresses the cable spring (30), thereby releasing the cable pin (29) from the cable pin port (37), and allowing the manual rotation of the back panel (4) to the desired position where there is a cable pin port (37) to receive the cable pin (29).

The cable spring stop (31) is the barrier, stop, or the like, that restrains the terminal end of the cable spring (30), in the cable spring housing (32).

The cable spring housing (32) is the housing, case, or the like, that houses the cable spring (30), and the cable spring stop (31), and is shown in FIGS. 20–22.

The cable spring housing back (33) is the barrier, stop, or the like, that restrains the end of the cable spring (30) that is opposite its terminal end. A preferred embodiment of the cable spring housing back (33) has a centrally located hole or cable orifice (42), through which the second cable port (27) and the cable (25) protrude, as shown in FIG. 22.

The back panel cable housing (34) is the tube, pipe, channel, enclosure, or the like, which houses or encases the cable from the vicinity of the back panel handle (6) to the vicinity of the cable spring housing (32), and provides protection for the cable (25).

The cable housing mount (35) is the component comprised essentially of a cable spring housing (32), the cable pin (29), and the mount flange (36).

The mount flange (36) is the flange, plate, rim, or the like, that is generally perpendicular to the external surface of the cable spring housing (32), such that said mount flange (36) allows the cable housing mount (35) to fit securely into the mount flange port (45), located at the bottom portion of the back panel cable housing (34). To fit the cable housing mount (35) into the back panel cable housing (34), the cable spring (30) should be compressed, to withdraw the cable pin (29) into the cable spring housing (32), as shown in FIGS. 21 and 22.

The cable pin port (37) is the port, hole, orifice, slot, or the like, that receives the spring-loaded cable pin (29), thereby affixing the position of the back panel (4).

The pin port housing (38) is the set of the cable pin ports (37), arranged in a linear manner along an arced housing (38), and said arced housing may be effectively parallel to the horizontal back panel hinge (7), as shown in FIG. 15.

The truck bumper (39), as shown in FIGS. 31–32, 44, and 47, is the bumper or the like that is typically a heavy metal or polymeric strip or the like, horizontally located across the front and the rear ends of a vehicle, such as a truck.

The two-piece hinge (40) is the two-piece hinge or the like, that matedly fits together with a hinge pin (8) or the like passing through both pieces of the two-piece hinge (40), thereby matedly affixing the two pieces together, and affecting a hinge (40). This hinging means allows the affixing together of the two-hinges pieces (40), as well as the components that are attached to each piece (40), as shown in FIG. 32.

Figure 18:
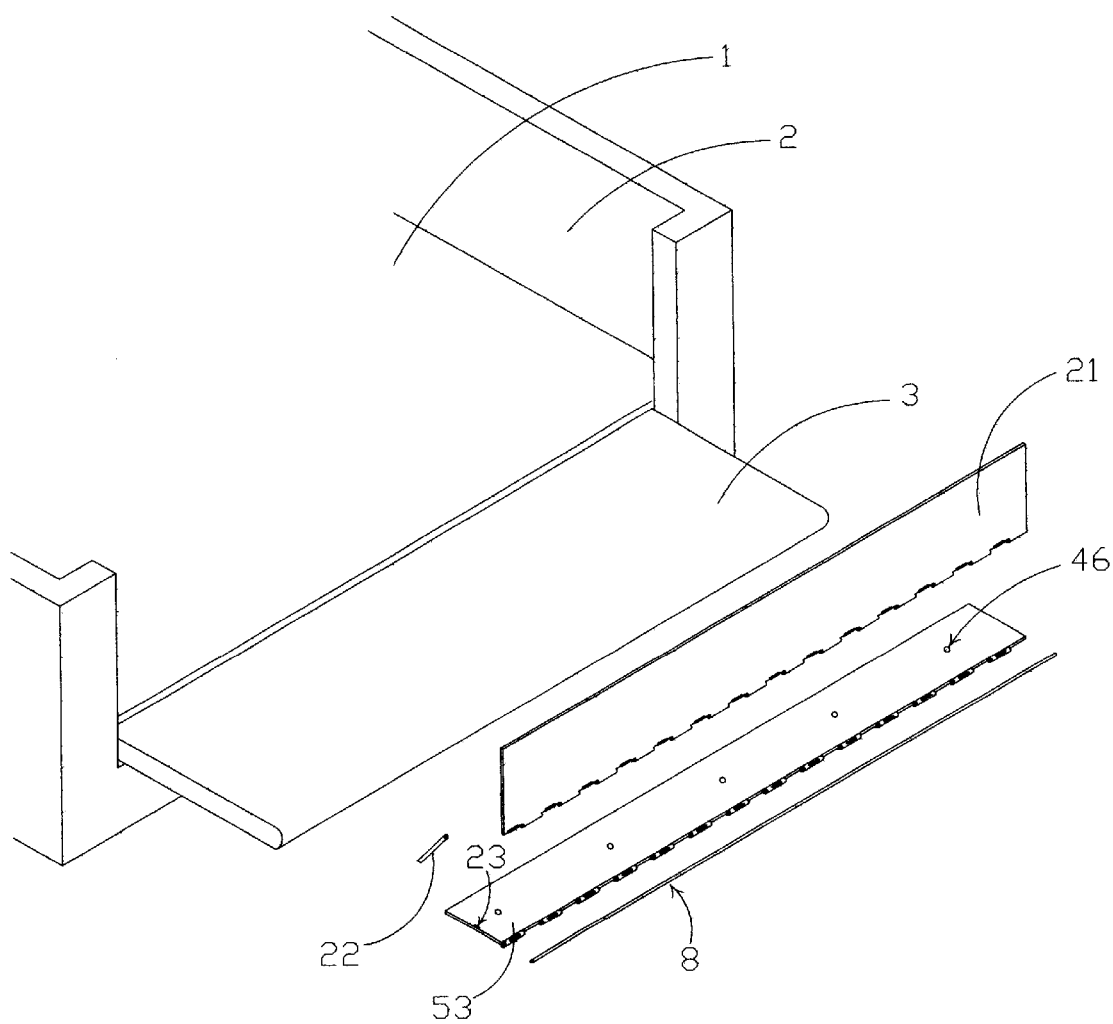
FIG. 18 shows an exploded isometric rear view of a portion of a primary tailgate (3) in the horizontal open position, and showing how a Retractable Stop may be assembled and affixed onto a primary tailgate (3). The mounting screws (41) are not shown in this drawing figure.

The mounting screw (41) is the screw, bolt, rivet, or the like, that may be used to fit through a mounting screw port (46) to attach the second piece of a hinge (20) or a two-piece hinge (40), or mounting plate (53) to a primary tailgate (3), as shown in FIGS. 18 and 32, or to a back panel (4 or 5).

The cable orifice (42) is the orifice, hole, port, or the like, that is located on the top surface of the cable spring housing (32), and through which the second cable port (27) extends through, as shown in FIG. 22, and would receive the cable (25).

The reflector (43) is the one or more reflectors or reflector strips the may be attached or affixed to the Retractable Stop or the back panel (4), and are a safely feature located on the rear side, and would be visible from behind the truck, when the Retractable Stop or the back panel (4) is in the vertical up position, as shown in FIG. 3.

The mounting rivet (44) is the rivet, screw, bolt and nut, or other fastening means used to attach or affix a simple planar embodiment of the extended arm (21) to one of the hinges (41) in the two piece hinge (41) used for attaching some embodiments of the Retractable Stop to the primary tailgate (3) or the like, as shown in FIG. 32.

The mount flange port (45) is the port, receptacle, slot, or the like, that receives the mount flange (36), which is near the base of the cable housing mount (35), as shown in FIGS. 20–22.

The mounting screw port (46) is the port, hole, orifice, or the like, located on a hinge (12, 20, 40) or mounting plate (53), that receives a mounting screw (41), thereby affixing the hinge to a back panel (4) or a primary tailgate (3).

The handle recessed area (47) is the optional recessed area or sink located on the primary tailgate (3), which allows the user to insert their fingers to get an optimal hold of the back panel handle (6), as shown in the various embodiments illustrated in the drawing figures.

The channel recessed area (48) is the optional recessed area or sink located on the primary tailgate (3), which receives the back panel cable housing (34) protruding from the front surface of the back panel (4), and allows for a better fit when the back panel (4) is in the closed position against the primary tailgate (3), and as shown in FIG. 3. In some embodiments of the Auxiliary Tailgate, the back panel cable housing (34) is flattened, thereby eliminating the need for the channel recessed area (48).

The channel slot area (49) is the slot, orifice, opening, or the like, located on the Retractable Stop, which allows for a better fit when the Retractable Stop is in the closed position against the primary tailgate (3) or the back panel (4), as shown in FIG. 3.

The hinge rib (50), as shown in FIGS. 38–40 and 57–58, is the one or more ribs, bumps, or the like, that are located on the first piece of a specialized hinge (20) or two-piece hinge (40). The hinge rib (50) is located on the first hinge piece so that the hinge rib (50) will matedly meet the hinge rib restraint (51) when the specialized two-piece hinge is engaged into the open position, and generally between 90-degrees and 120-degrees, in the embodiments disclosed herein. The hinge rib (50) may be manufactured as part of the specialized hinge (20) or two-piece hinge (40), or alternatively, the hinge rib (50) may be added at a later time by welding or gluing, or other means, as shown in FIGS. 38–40 and 57–58. This hinge embodiment is a new and useful component devised and engineered by Mark Willard Vejnar.

The hinge rib restraint (51) is the one or more ribs, bumps, or the like, that are located on the second piece of a two-piece hinge. The hinge rib restraint (51) is located on the second hinge piece so that the hinge rib restraint (51) will matedly meet the hinge rib (50) when the specialized two-piece hinge is engaged into the open position, and generally between 90-degrees and 120-degrees, in the embodiments disclosed herein. The hinge rib restraint (51) may be manufactured as part of the specialized hinge (20) or two-piece hinge (40), or alternatively, the hinge rib restraint (51) may be added at a later time by welding or gluing, or other means, as shown in FIGS. 38–40 and 57–58. This hinge embodiment is a new and useful component devised and engineered by Mark Willard Vejnar.

The tailgate hinge (52) is the hinge, or the like, that affixes the primary tailgate (3) to the truck bed wall (2) or the truck bed (1), depending upon the tailgate design.

The mounting plate (53) is plate, panel, or the like that has a hinge (20) or the like along one of its longest edges, and said hinge (20) is matedly attached to the extended arm (19) with a hinge pin (8). The mounting plate (53) is generally perforated with a plurality of holes, orifices, or ports, or the like to accommodate mounting screws (41), used to affix said plate to the desired surface.

The alignment tongue (54) is the tongue, arm, or the like, that extends beyond the mounting plate (53), and may be matedly fit into an alignment tongue port (55), to align and lock the mounting plate (53) of Retractable Stop or an Auxiliary Tailgate into place on a primary tailgate (3), as shown in FIGS. 44, 45, 47, and 48.

The alignment tongue port (55) is the port, hole, or the like, which matedly receives an alignment tongue (54), to align and lock the mounting plate (53) of a Retractable Stop or an Auxiliary Tailgate into position on a primary tailgate (3), as shown in FIGS. 44, 45, 47, and 48.

The primary dimple (56) is the dimple, protrusion, or raised area, typically located along the lower portion of the rear surface of the extended arm (21), to matedly fit into a primary dimple port (57), and thereby lock the extended arm (21) into place, as shown in FIGS. 43 and 45. The above-described positions of the primary dimples (56) and its related primary dimple ports (57) may alternatively be reversed, as shown in FIGS. 47 and 48.

The primary dimple port (57) is the port, hole, pit, or the like, typically located along the rear edge of the recessed area, as shown in FIG. 44, to matedly receive a primary dimple (56), and thereby lock the extended arm (21) into place, as shown in FIG. 43. The above-described positions of the primary dimple ports (57) and its related primary dimples (56) may alternatively be reversed, as shown in FIGS. 47 and 48.

The secondary dimple (58) is the dimple, protrusion, or raised area, typically located along the top edge of the back panel (4) to each matedly fit into a secondary dimple port (59), located along the front edge of the recessed area, as shown in FIGS. 44 and 45. The above-described positions of the secondary dimples (58) and its related secondary dimple ports (59) may alternatively be reversed, as shown in FIG. 48.

The secondary dimple port (59) is the port, hole, pit, or the like, typically located along the front edge of the recessed area to matedly receive a secondary dimple (58), located along the top edge of the back panel (4), as shown in FIG. 45. The above-described positions of the secondary dimple ports (59) and its related secondary dimples (58) may alternatively be reversed, as shown in FIGS. 47 and 48.

The frame lock (60) is the enlarged terminal end area of each vertical frame in the open frame back panel (5) embodiment, shown in FIGS. 50, 52, and 53, that is sized so that this enlarged terminal end area, the frame lock (60), is too large to fit through the frame lock port (63), the primary frame port (61), or the secondary frame port (62), thereby effectively locking the open frame back panel (5) onto the horizontal back panel hinge (7), as shown in FIGS. 50 and 52–53. The frame lock (60) fits into the frame lock port, as shown in FIGS. 52 and 53, but is retained by the frame lock port (61), when the open frame back panel (5) is fully extended, as shown in FIGS. 52–53, and then may slide down to the secondary frame port, as shown in FIG. 53, to hold the back panel (5) in the vertical open position, as shown in FIG. 54.

The primary frame port (61) is the port, hole, or orifice, located on the horizontal back panel hinge (7), and which is sized to allow a vertical frame on the open frame back panel (5) to pass through said port (61), thereby allowing the open frame back panel (5) to be retracted into the primary tailgate (3), as shown in FIGS. 49–55.

The secondary frame port (62) is the port, hole, or orifice, that is sized and located near the top edge of the primary tailgate (3) and in-line with the primary frame port (61), so that a vertical frame on the open frame back panel (5) may set into said secondary frame port (62), thereby allowing the open frame back panel (5) to be locked into the vertical open position, as shown in FIGS. 53–54.

The frame lock port (63) is the is the port, or the like, that is located in the horizontal back panel hinge (7) area, as shown in FIGS 51–53, and matedly receives the frame lock (60), when the open frame back panel is extended to the open position, as shown in FIGS. 52 and 53.

The top rail (64) is the rail, bar, frame, or the like, that is located at the terminal end of the open frame back panel (5), as shown in FIGS. 49–51 and 54–56. The top rail (64) may also be used as a handle for the open frame back panel (5), and thereby used to push or pull the open frame back panel (5) in or out of the primary frame ports (61) and the secondary frame ports (62) on the primary tailgate (3), as shown in FIG. 50, and also to rotate the open frame back panel (5) about the horizontal back panel hinge's (7) axis, and into the vertical or the horizontal position.

The hinge dimple (65) is the dimple, protrusion, or raised area, located on the hinge rib extension (66), as shown in FIGS. 57 and 58. A hinge rib extension (66) would optimally have one hinge dimple (65) located on each of the two opposing sides that are hidden from view when the hinge (7, 20, 40) is in the open position and the hinge rib (50) is matedly adjacent to the hinge rib restraint (51).

The hinge rib extension (66) is the extension, arm, or protrusion, extending from the hinge rib (50), and matedly fitting into a rib extension port (67), as shown in FIGS. 57 and 58. The hinge rib extension (66) would matedly fit into the rib extension port (67), when the hinge rib (50) is matedly adjacent to the hinge rib restraint (51).

The rib extension port (67) is the port, hole, or cavity located on the hinge rib restraint (51), that matedly receives the hinge rib extension (66), and has one or more hinge dimple ports (68) located on each of two opposing sides that are hidden from view when the hinge (7, 20, 40) is in the open position and the hinge rib (50) is matedly adjacent to the hinge rib restraint (51).

The hinge dimple port (68) is the port, hole, cavity, located on each of two opposing sides of the rib extension port, and each hinge dimple port (68) would matedly receive a hinge dimple (65), when the hinge is in the open position, and the hinge rib (50) is matedly adjacent to the hinge rib restraint (51), as shown in FIG. 58.

DETAILED DESCRIPTION OF THE INVENTION

The present set of embodiments for this invention concept may logically be classified as the set of Auxiliary Tailgates embodiments and the set of related Retractable Stop embodiments. The embodiments of the Retractable Stop are closely related to the embodiments of the Auxiliary Tailgate. The set of Auxiliary Tailgate embodiments disclosed herein are more numerous and may be subdivided into the subsets of solid body Auxiliary Tailgate embodiments and the subset of open frame body Auxiliary Tailgate embodiments. These subsets of the Auxiliary Tailgate embodiments may each be further subdivided into subsets where the simple and modified simple embodiments of the Auxiliary Tailgate have one horizontal back panel hinge (7) or the like along a horizontal axis, and at the interface between the primary tailgate (3) and the back panel (4), and the preferred embodiments of the Auxiliary Tailgate, that are opened somewhat like a clamshell, and said horizontal back panel hinge (7) or the like, is located along a horizontal axis, and at the interface between the primary tailgate (3) and the back panel (4), and with this embodiment having two vertical panel hinges (12), as shown in FIG. 25, or the like along the vertical axis, and at each interface between the vertical edges of the back panel (4) and the vertical edges of both the left side panel (10) and the right side panel (11) that are adjacent to said back panel (4), as shown in FIG. 25. The Retractable Stop embodiments are most similar to the modified simple embodiments of the Auxiliary Tailgate, but are significantly smaller in size, and are comprised of fewer and simpler components.

THE RETRACTABLE STOP EMBODIMENTS

Figure 12:
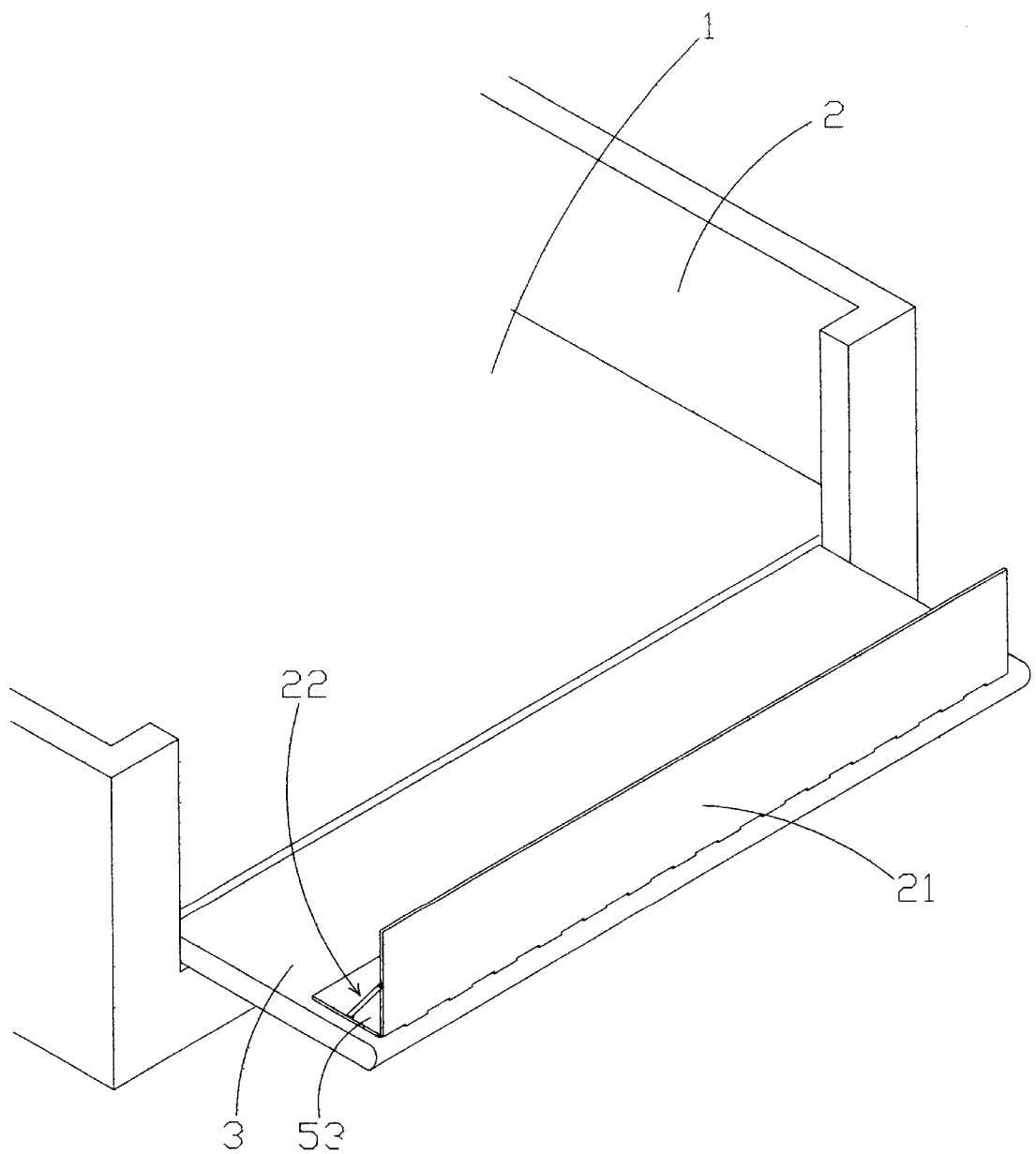
FIG. 12 shows an isometric rear view of a truck with a Retractable Stop attached thereto, and showing the primary tailgate (3) in the horizontal open position, and an attached Retractable Stop in the vertical up position, and utilizing a hinged tongue (22) as the locking means for the Retractable Stop.
Figure 14:
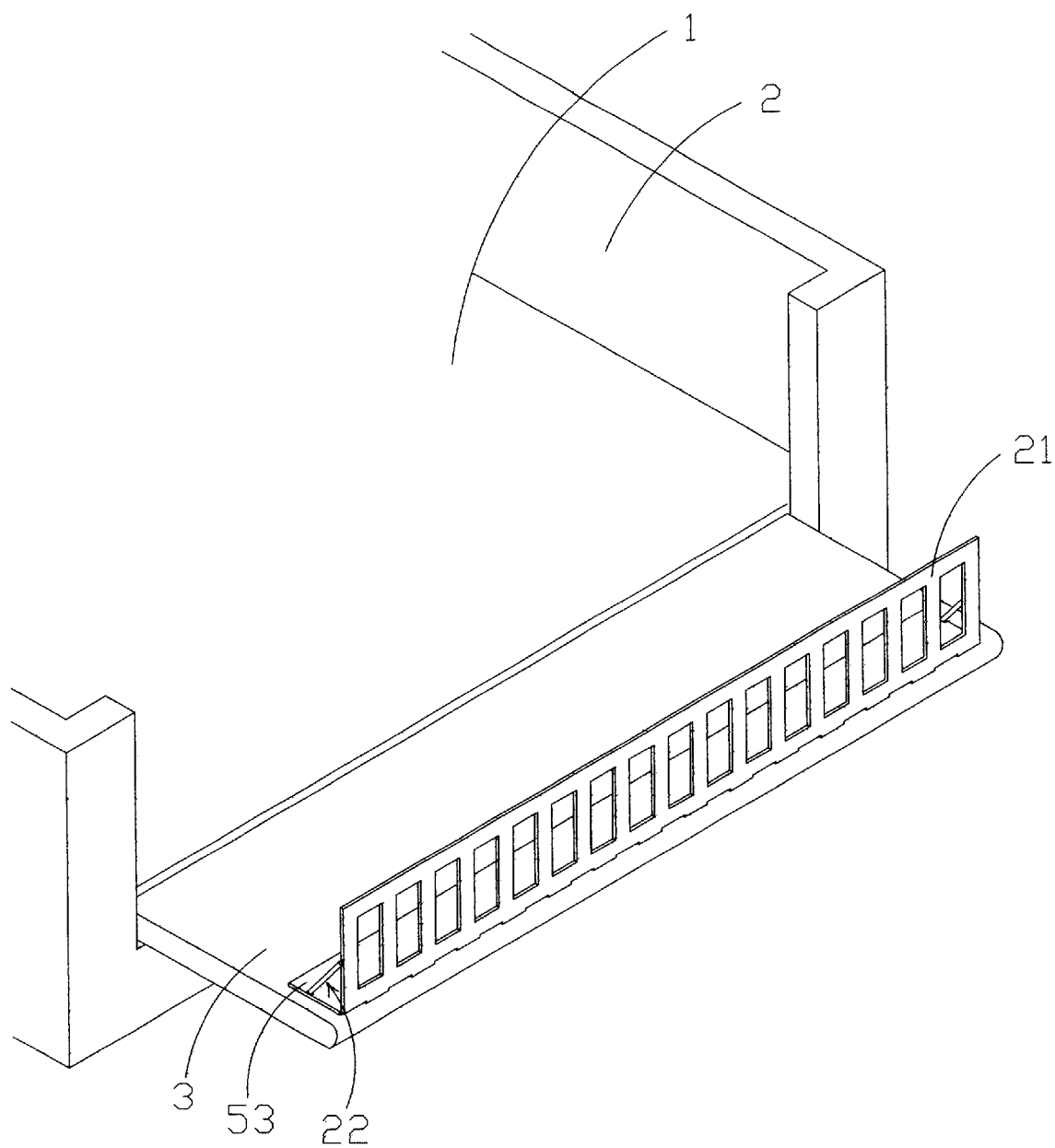
FIG. 14 shows an isometric rear view of a truck with an Auxiliary Tailgate attached thereto, and showing the primary tailgate (3) in the horizontal open position, and an attached open Retractable Stop in the vertical up position, and utilizing a hinged tongue (22) as the locking means for the Retractable Stop.

The Retractable Stop is a panel, arm, obstacle, stop, or stopping means that may be engaged or disengaged by a retracting means about the axis of its retractable stop hinge (20 or 40), and extends along most of the width of the primary tailgate (3) or alternatively, at or near the top back panel edge (19) of the Auxiliary Tailgate. The retracting means is preferred to be manual, and with a retractable stop hinge (20), a plurality of two-pieces hinges (40), or the like located along the axial length of the Retractable Stop. Once engaged, a simple embodiment of the Retractable Stop would remain in place due to gravitational action on its geometric design, as shown in FIG. 3, or would remain in place through the use of a new and useful retractable stop hinge (20) that would stop or lock at approximately 90-degrees or another desired angle, through the use of a hinge rib (50) and a hinge rib restraint (51), when the Retractable Stop is the open position, as shown in FIGS. 38–40. This new and useful restraining hinge (20) was devised and engineered by Mark Willard Vejner. The Retractable Stop may also be held into position with a hinged tongue (22) and a hinged tongue port (23), as shown in FIGS. 26–30. The retractable stop hinge (20) may run along the length of the Retractable Stop, and would allow the Retractable Stop to rotate about one axis. The geometric design of the Retractable Stop with the hinge rib (50) and hinge rib restraint (51) would give said Stop stability and strength to resist the force of a load, when in the open or engaged position, and when in the closed position, because of its essentially cylindrical shape around the hinged axis of rotation, and its hinged rib restraint (51) that matedly lines-up to the hinge rib (50) and are held together by gravitation or through the use of anther means such as a snap or magnetic means where a North pole of a magnet on one hinge part (e.g., 50 or 51) would be adjacent to the South pole of a magnet of the part's mate (50 or 51). A modified embodiment of the extended arm (21) may be designed so that the base of the extended arm (21) effectively rests on a surface of the back panel (4) or the primary tailgate (3), with gravitational action keeping the Retractable Stop in the open position, once the Retracted Stop is placed in the open position, as shown in FIG. 3. The geometric shape of the extended arm (21) may vary according to the design needs of the application, and may be, for example, between a couple of inches to a foot or more high, when in the open position. The location of the Retractable Stop may be affixed near the top edge of the primary tailgate (3) or alternatively, near the top back panel edge (19) or on said edge (19), as shown in FIGS. 12, 3, and 42, respectively. Some other embodiments of the Retractable Stop may have the Retractable Stop affixed near the top portion of the front side of the primary tailgate (3), as shown in FIGS. 12 and 14, and in possible kit embodiments of the Retractable Stop, as may be derived from FIGS. 18, 31, and 32.

There is another embodiment of the Retractable Stop that utilizes a locking means to keep the Retractable Stop in the 90-degree position, once it is opened to that position. This embodiment, shown in FIGS. 57 and 58, utilizes a new and useful locking hinge (20), devised and engineered by Mark Willard Vejnar. This locking hinge (20) utilizes is similar to that disclosed above, utilizing a hinge rib (50) and a hinge rib restraint (51), but would be further comprised of a hinge rib extension (66) protruding from the hinge rib (50), as shown in FIGS. 57 and 58, and a rib extension port (67) extending into the hinge rib restraint (51), such that the hinge rib extension (66) may matedly fit into the rib extension port (67). The hinge rib extension (66) may have one or more hinge dimples (65) located on one or more sides of the hinge rib extension (66), such that each hinge dimple (65) matedly fits or snaps into a hinge dimple port (68) that is located the wall of the rib extension port (67), as shown in FIGS. 57 and 58. The two locking means for these embodiments of the Retractable Stop are the hinge rib (50) resting on the rib hinge restraint (51), thereby effecting a first locking means when opening the hinge (2) to the desired angle on the hinge (20), and the second locking means being the one or more hinge dimples (65) each matedly fitting or snapping into the one or more hinge dimple ports (68), thereby effecting a second locking means which keeps the extended arm (21) of the Retractable Stop in the open position until the hinge dimple (65) is removed from the hinge dimple port (68), thereby loosening the extended arm (21) from the hinge dimple (65)/hinge dimple port (68) mating. The use of this new an useful locking hinge (20), as shown in FIGS. 57 and 58, may also be utilized in the various embodiments, and modified embodiments of the Auxiliary Tailgate, disclosed herein.

A preferred embodiment of the Retractable Stop would be comprised essentially the Retractable Stop disclosed above, and would additionally have a locking means or the like, to lock or affix the Retractable Stop in the open position and prevent if from accidentally closing during use. An example of such a locking means would be the use of one or more hinged tongues (22) that may be affixed to one or both ends of the body of the Retractable Stop, and said hinged tongues (22) would be utilized by rotating them to matedly fit into their respective hinged tongue ports (23) located on the front side of the primary tailgate (3) or alternatively, on the front side of the back panel (4), when the Retractable Stop is in the up position, as shown in FIGS. 26–27, and 30. A second preferred embodiment of the Retractable Stop using one or more hinged tongues (22) would have the hinged tongues (22) located and affixed near one or both ends of the primary tailgate (3) or alternatively, near one or both ends of the back panel (4), and said hinged tongues would be utilized by rotating them to matedly fit into their respective hinged tongue ports (23) located on the front side of the Retractable Stop, when the Retractable Stop is in the up position, as shown in FIGS. 28–29. A third set of preferred embodiments of the Retractable Stop would utilized a new and useful hinge means, devised and design engineered by Mark Willard Vejnar, where the retractable stop hinge (20) or a two-piece hinge (40) would stop or lock at approximately 90-degrees or another desired angle, through the use of a hinge rib (50) and a hinge rib restraint (51), when the Retractable Stop is in the open position, as shown in FIGS. 38–40.

There is also a set of modified embodiments of the Retractable Stop, where a new and useful image may be used. This hinge is comprised essentially of a typical hinge (20) or two-piece hinge (40), with one or more holes or orifices around the curved surface of the hinge pin port (9). A peg, dowel, or the like may be inserted into one of said holes, thereby causing the hinge (20 or 40) to stop when opened to and one side of the hinge meets said peg or dowel. One side of the hinge (20 or 40) may comprise the mounting plate (53) of the Retractable Stop, and the other side of the hinge (20 or 40) may comprise the extended arm (21) or may be attached to the extended arm (21). This modified embodiment of the Retractable Stop was devised and invented by Mark Willard Vejnar, and may be attached to the top back panel edge (19), top edge of the primary tailgate (3), or near the top of the front side of either the primary tailgate (3) or the back panel (4). An advantage of this embodiment of the Retractable Stop is that it allows the modification of a standard primary tailgate (3), with the screw-fitting attachment of the Retractable Stop, that the hinge (20 or 40) may be drilled or pierced to accommodate the peg or dowel. This modified embodiment of the Retractable Stop may be manufactured and marketed as an add-on kit, where the Retractable Stop may easily be added to a standard primary tailgate (3) with a plurality of mounting screws (41) or the like, similar to the embodiments shown in FIGS. 31, 32, and 42. An open frame Retractable Stop is shown in FIG. 14, where the extended arm (21) is comprised of an open frame body. The simple Retractable Stop embodiments, shown in FIGS. 31, 32, and 42, have one or more two-piece hinges (40), with where one of said two pieces of the hinge (40) attached or affixed to the primary tailgate (3), and the other end is attached by mounting rivets (44) to the extended arm (21), and may also be manufactured and marketed as an add-on kit.

A reflector (43) may be added to the back of any of the above embodiments of the Retractable Stop, as well as to the back of the back panel (4, 5) as a safety feature, as shown in FIG. 3.

The retractable stop hinge (20), the two piece hinge (40), the mounting screws and rivets (41, 44), the mounting plate (53), and the extended arm (21) of the Retractable Stop may be composed essentially of a metal, alloy, polymeric, or composite material, or a combination thereof. A sample kit embodiment of the Retractable Stop would utilize a polymeric mounting plate (53) and extended arm (21), and a plurality of two piece metal or alloy hinges (40) with metal or alloy mounting screws and rivets (41, 44). The metal or alloy hinges (40) and the mounting plate (53) and the extended arm (21), as shown in FIGS. 3, 12, 14, 16–18, 26–36, and 40–42, whether composed essentially of a metal, alloy, or a polymeric material, may optionally be coated or sprayed with a polyurethane based foam or the like, or may be coated or sprayed with another polymeric or composite material, which hardens to the desired strength, texture, and coloration for the components coated. An example of two commercially available polyurethane based foam-coatings includes LINE-X or RHINO. This coating may provide the user of the Retractable Stop with a layer of protection for the paint on the surface of the truck's tailgate (3).

A preferred kit embodiment of the Retractable Stop would utilize a polycarbonate mounting plate (52) and extended arm (21), a polycarbonate or a coated metal or alloy hinge (20), and metal or alloy mounting screws and rivets (41, 44), and a plurality of attachable reflectors (43).

Drawing FIGS. 3, 12, 14, 16–18, 26–36, 38–40, and 42 show various embodiments of the Retractable Stop. Hybrid and composite embodiments may be derived from the drawing figures and the specification by addition, elimination, and replacement of components, and would be combinatorial and numerous, but are also intended to be included in the present invention.

In short, a set of simple embodiments of the Retractable Stop may be comprised essentially of a mounting plate (53) extending across a portion of the width of a primary tailgate (3) or back panel (4 or 5), and affixed to said primary tailgate (3) or back panel (4 or 5), with a first half of a retractable stop hinge (20) located along one side of said mounting plate (53), as shown in FIG. 3, and a second half of said retractable stop hinge (20) located along one side of an extended arm (21), as shown in FIGS. 27, 29, and 31. Said first half of retractable stop hinge (20) has a hinge pin port (9) located along the hinge (20) and said second half of retractable stop hinge (20) has a hinge pin port (9) located along the hinge (20), and said first half of retractable stop hinge (20) and said second half of retractable stop hinge (20) are joined together such that their hinge pin ports (9) form a common hinge pin port (9). A hinge pin (8) is then passed through said common hinge pin port (9) thereby affixing the mounting plate (53) to said extended arm (21), and said mounting plate (53) affixed to the primary tailgate (3). Some embodiments of the Retractable Stop may further include a plurality of mounting screw ports (46) located on the mounting plate (53), for affixing said mounting plate (53) to the primary tailgate (3). The Retractable Stop locking means may include a hinged tongue (22) attached to the extended arm (21), a hinged tongue (22) attached to the mounting plate (53), or a hinge rib (50) and hinge rib restraint (51) locking means. The hinge rib (50) and hinge rib restraint (51) locking means has said second half of retractable stop hinge (20) has a hinge rib (50) located thereon, and said first half of retractable stop hinge (20) has a hinge rib restraint (51) located thereon. This locking means is preferred when said hinge rib (50) has a hinge rib extension (66) located thereon, and said hinge rib restraint (51) has a rib extension port (67) located thereon, to receive said hinge rib extension (66), when the retractable stop hinge (20) is extended to the open position. The Retractable Stop embodiments may have a recessed area (16), located in the front surface of the primary tailgate (3), and recessed to hold the mounting plate (53), and to receive the extended arm (21), when said extended arm (21) is rotated about the axis of said common hinge pin port (9), and into said recessed area (16). Another set of embodiments of the Retractable Stop includes kit embodiments, where the Retractable Stop is packaged in an unassembled, partially assembled, or pre-assembled form, for sale to a prospective user or installer, and final assembly is completed and the Retractable Step is then installed on the appropriate area of a truck or the like. Such a Retractable Stop kit may be comprised essentially of a mounting plate (53) with a plurality of mounting screw ports (46) located thereon, and with a first half of a retractable stop hinge (20) located along one side of said mounting plate (53), and an extended arm (21) with a second half of said retractable stop hinge (20) located along one side of said extended arm (21). There is also a hinge pin (8), for matedly attaching said first half of a retractable stop hinge (20) with said second half of said retractable stop hinge (20), a plurality of mounting screws (41), and optionally a hinged tongue (22) and hinged tongue port (23) located on the mounting plate (53). The Retractable Stop kit may alternatively use another locking means, such as a hinge rib (50) located on said second half of the retractable stop hinge (20), and a hinge rib restraint (51) located on said first half of the retractable stop hinge (20). This locking means is preferred when said hinge rib (50) has a hinge rib extension (66) located thereon, and said hinge rib restraint (51) has a rib extension port (67) located thereon, to receive said hinge rib extension (66), when the retractable stop hinge (20) is extended to the open position.

THE SOLID BODY AUXILIARY TAILGATE EMBODIMENTS

Figure 4:
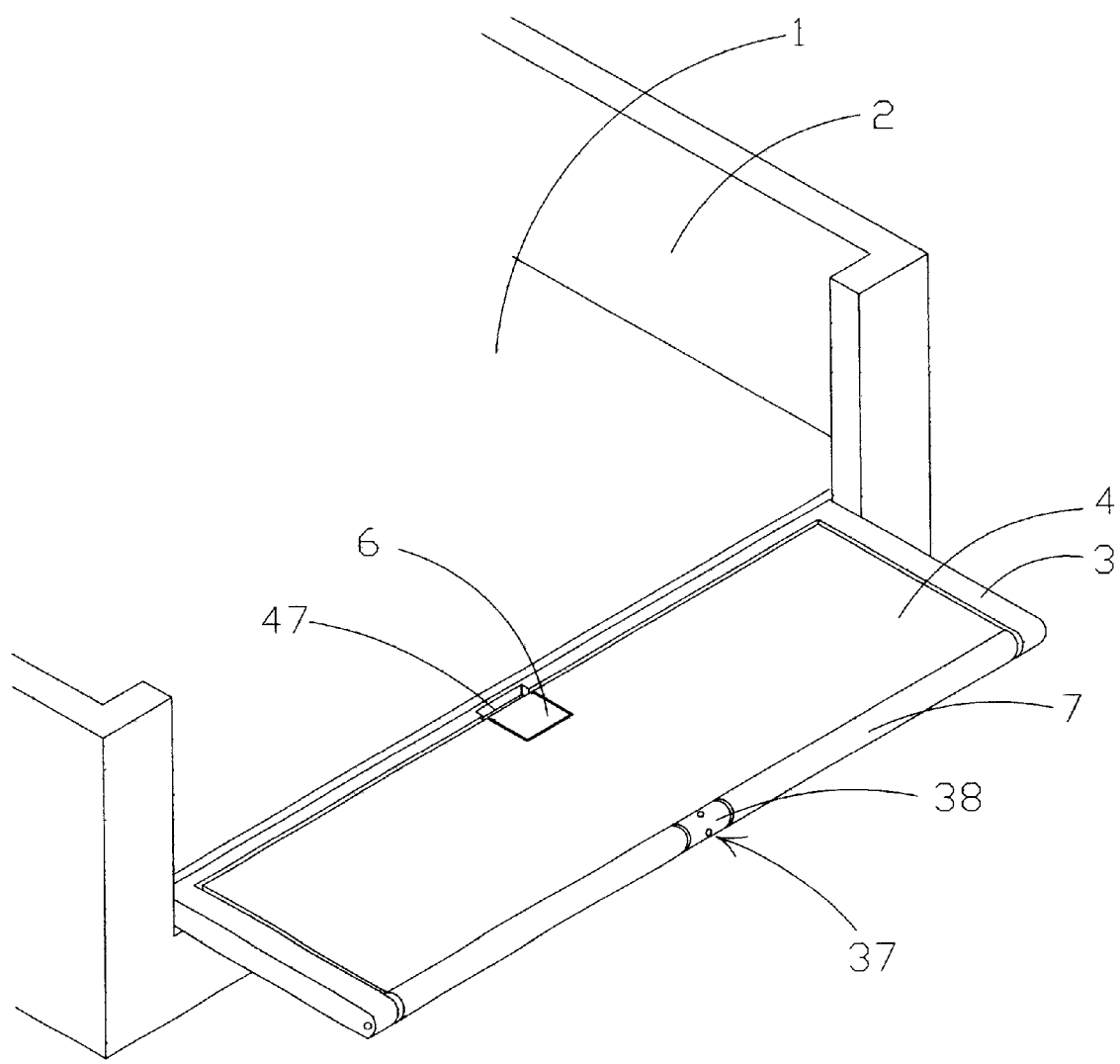
FIG. 4 shows an isometric rear view of a truck with an Auxiliary Tailgate attached thereto, and showing the primary tailgate (3) in the horizontal open position, and the solid body back panel (4) of the Auxiliary Tailgate in the closed position.
Figure 5:
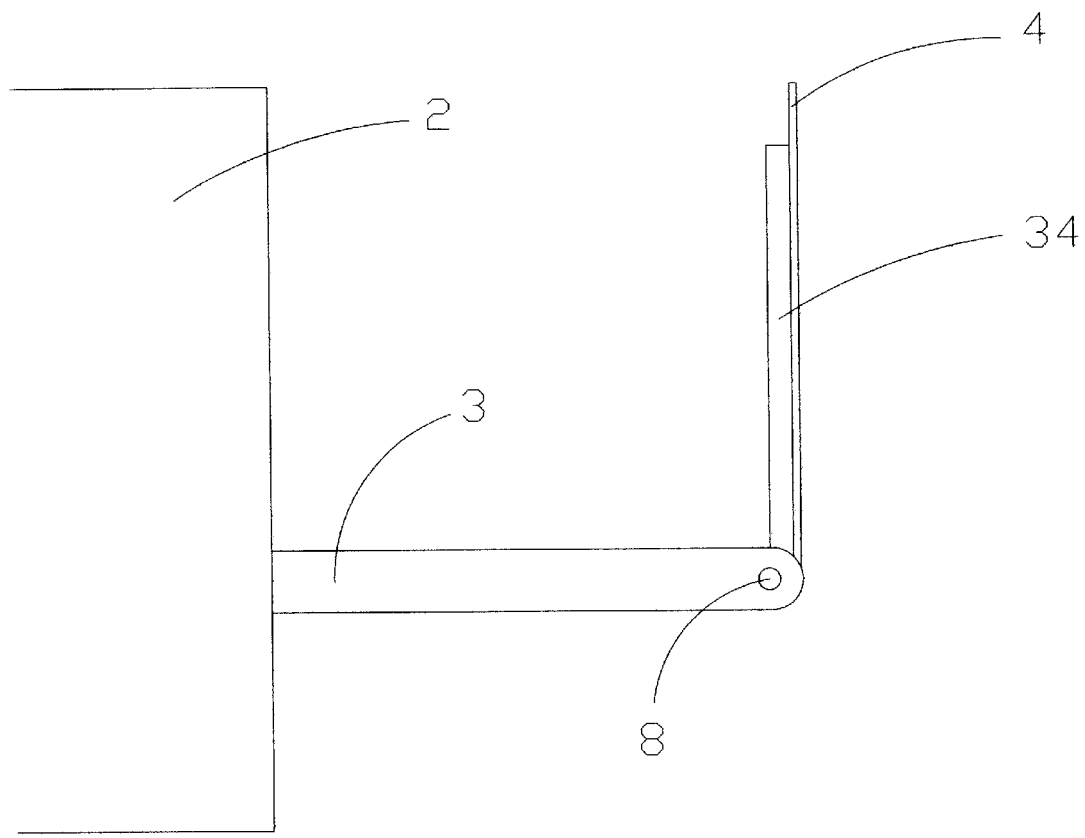
FIG. 5 shows a left side view of a truck with an Auxiliary Tailgate attached thereto, and showing the primary tailgate (3) in the horizontal open position, and the solid body back panel (4) of the Auxiliary Tailgate in the vertical up position.
Figure 6:
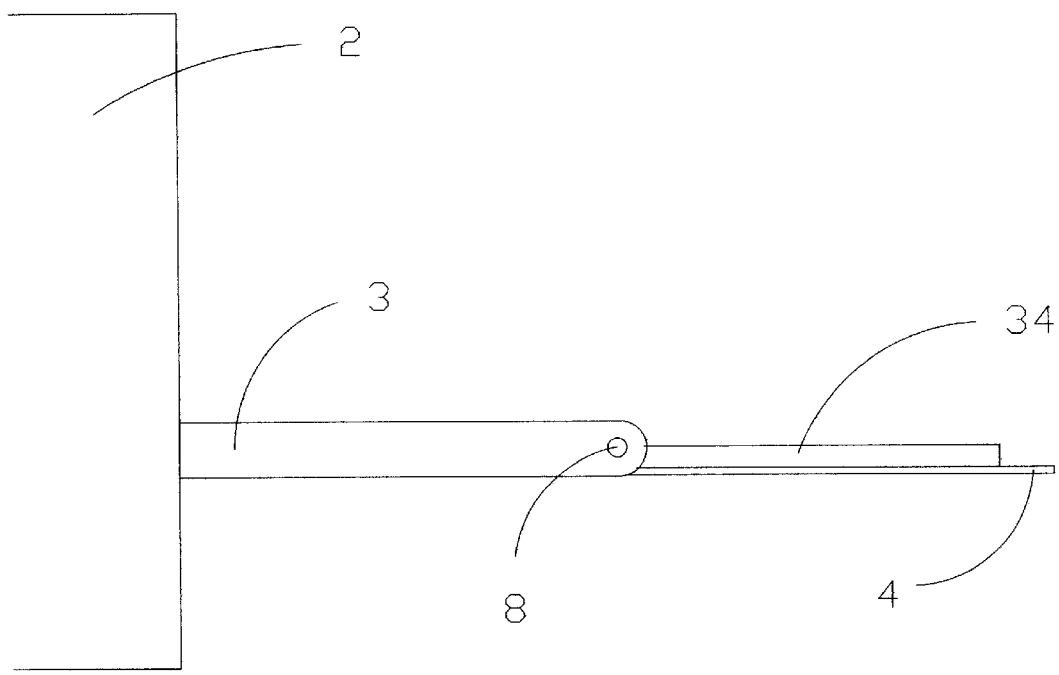
FIG. 6 shows a left side view of a truck with an Auxiliary Tailgate attached thereto, and showing the primary tailgate (3) in the horizontal open position, and the solid body back panel (4) of the Auxiliary Tailgate in the horizontal open position.
Figure 7:
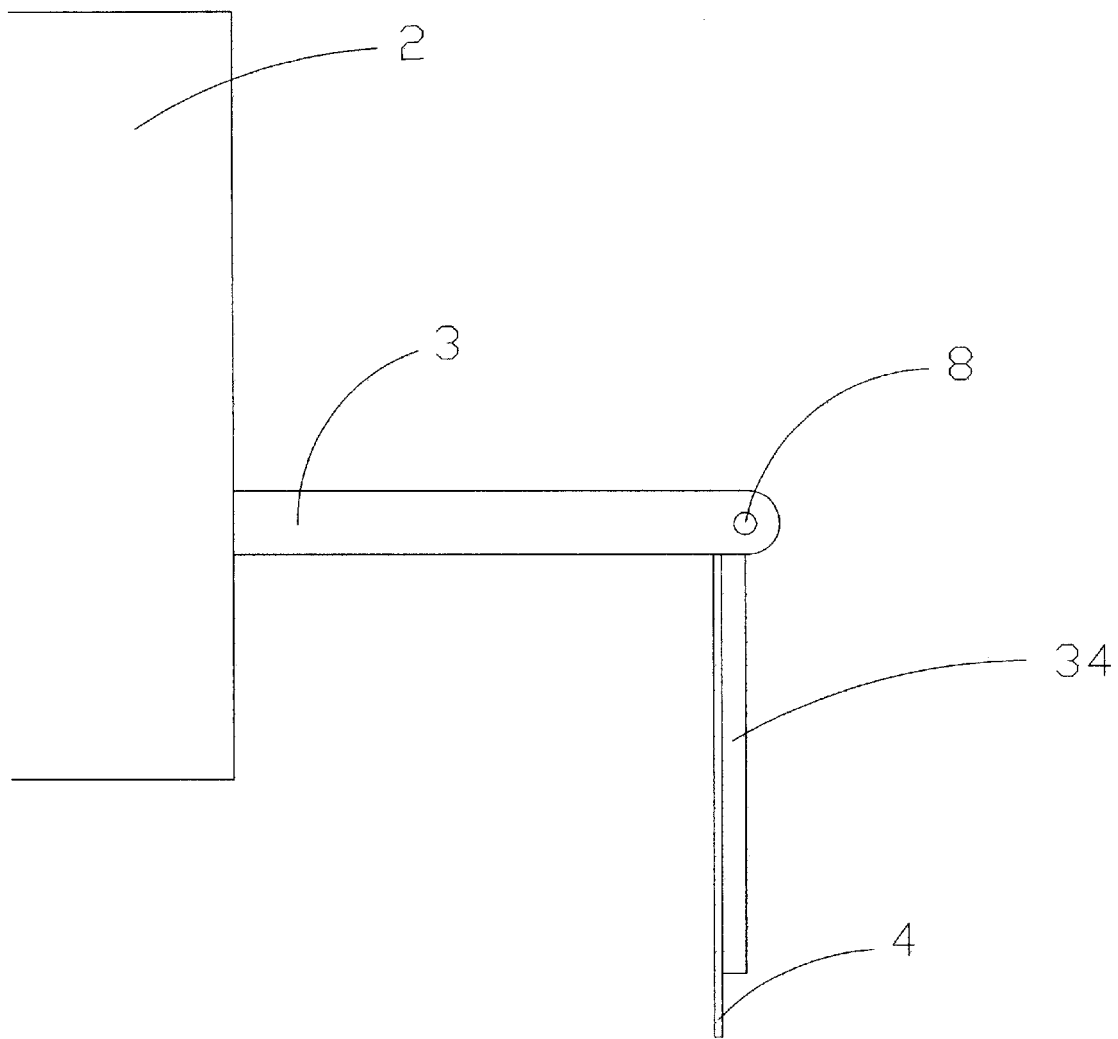
FIG. 7 shows a left side view of a truck with an Auxiliary Tailgate attached thereto, and showing the primary tailgate (3) in the horizontal down position, and the solid body back panel (4) of the Auxiliary Tailgate in the vertical down position.
Figure 8:
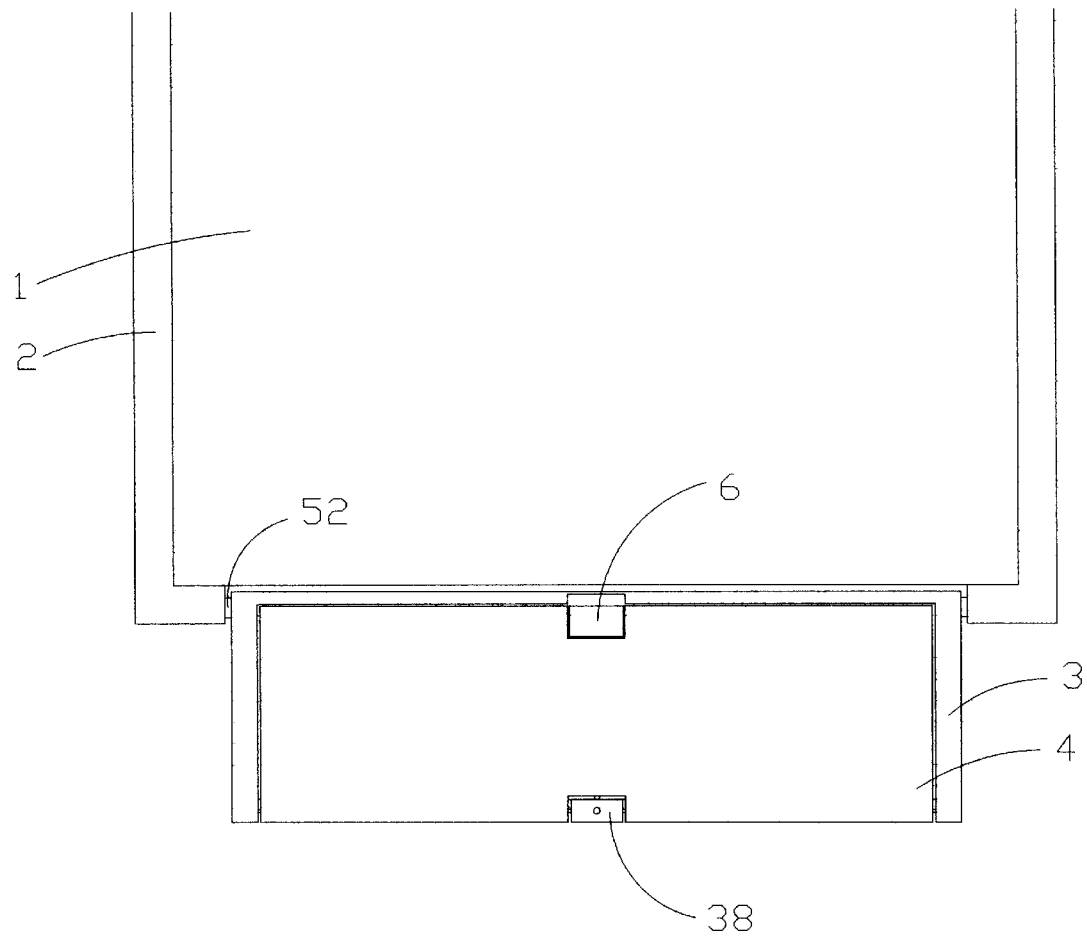
FIG. 8 shows a top view of a truck with an Auxiliary Tailgate attached thereto, with the primary tailgate (3) in the horizontal open position, and the solid body back panel (4) of the Auxiliary Tailgate in the closed position.
Figure 9:
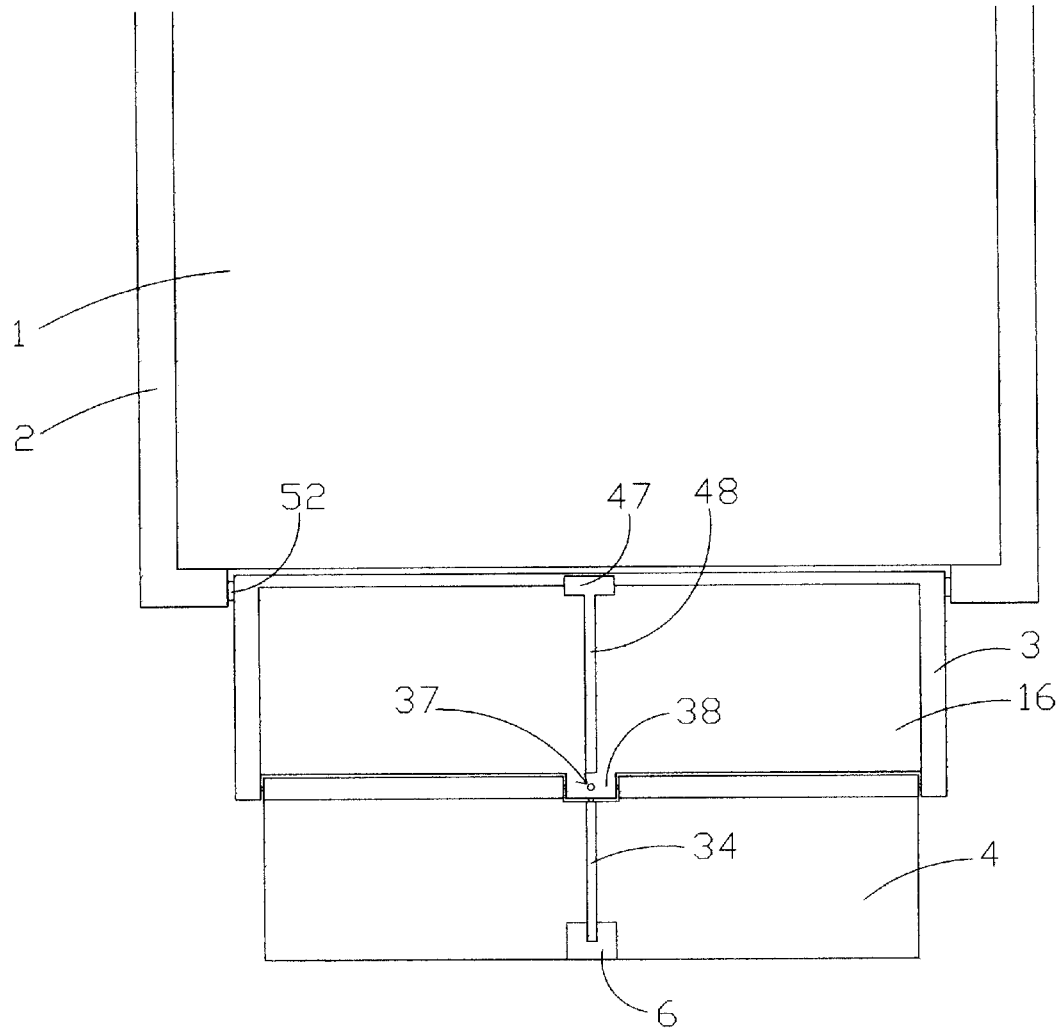
FIG. 9 shows a top view of a truck with an Auxiliary Tailgate attached thereto, with the primary tailgate (3) in the horizontal open position, and the solid body back panel (4) of the Auxiliary Tailgate in the horizontal open position.
Figure 10:
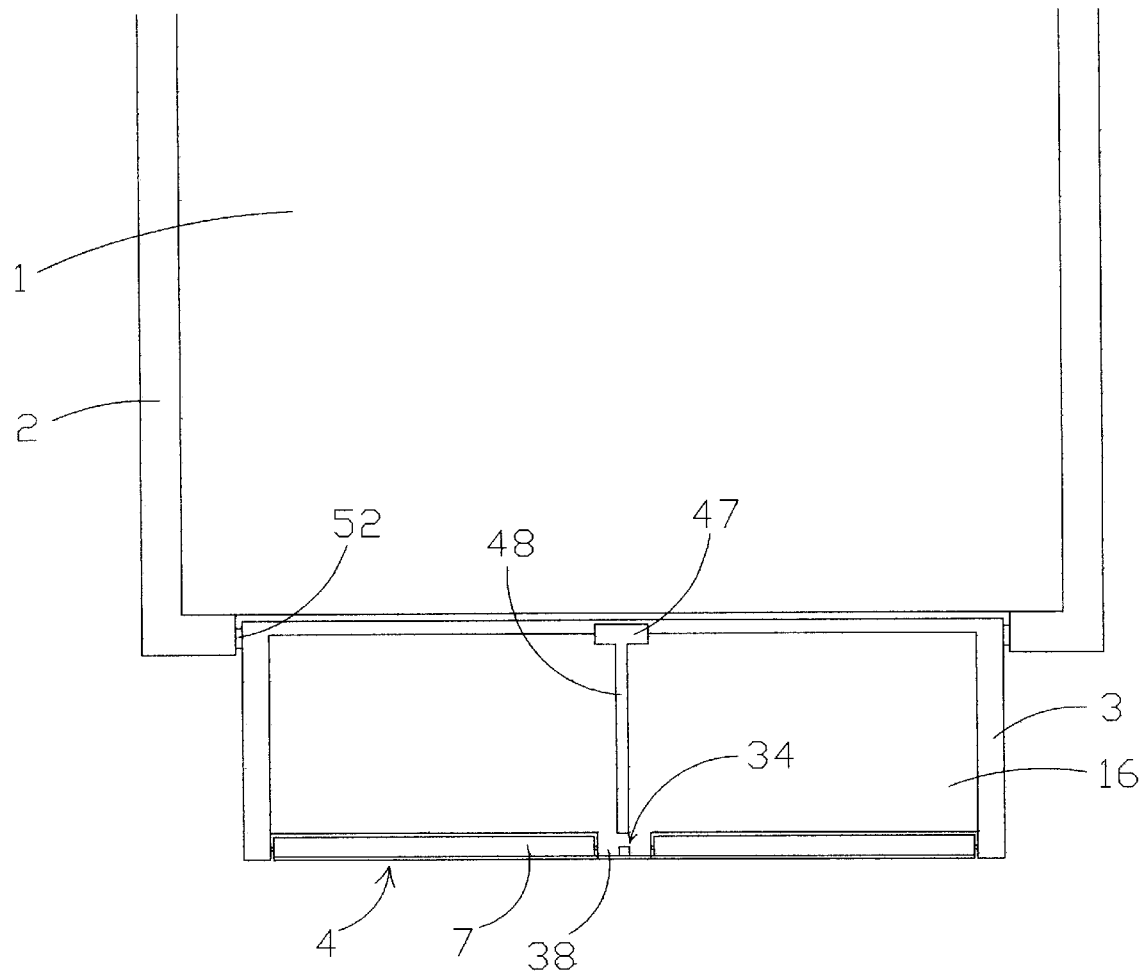
FIG. 10 shows a top view of a truck with an Auxiliary Tailgate attached thereto, with the primary tailgate (3) in the horizontal open position, and the solid body back panel (4) of the Auxiliary Tailgate in the vertical up position.
Figure 11:
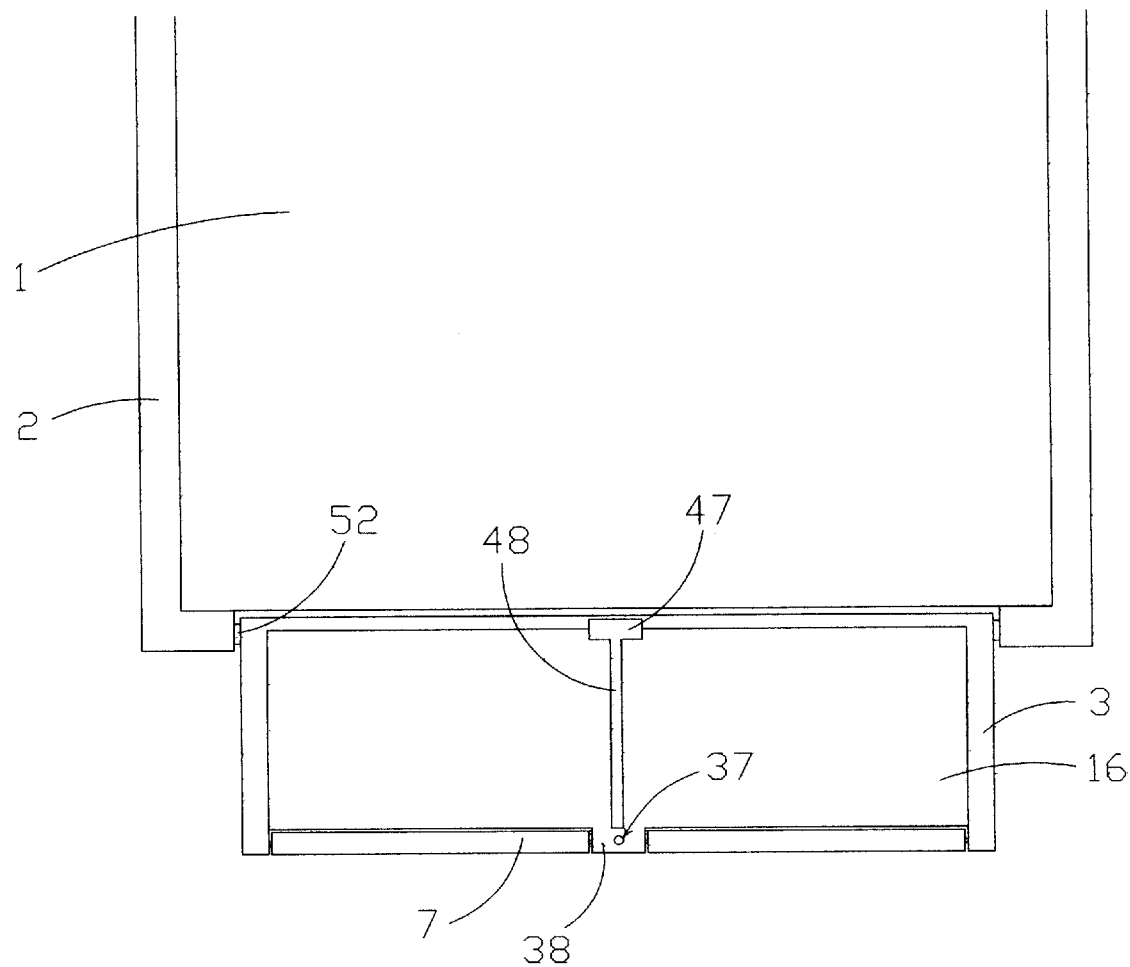
FIG. 11 shows a top view of a truck with an Auxiliary Tailgate attached thereto, with the primary tailgate (3) in the horizontal open position, and the solid body back panel (4) of the Auxiliary Tailgate in the vertical down position.
Figure 16:
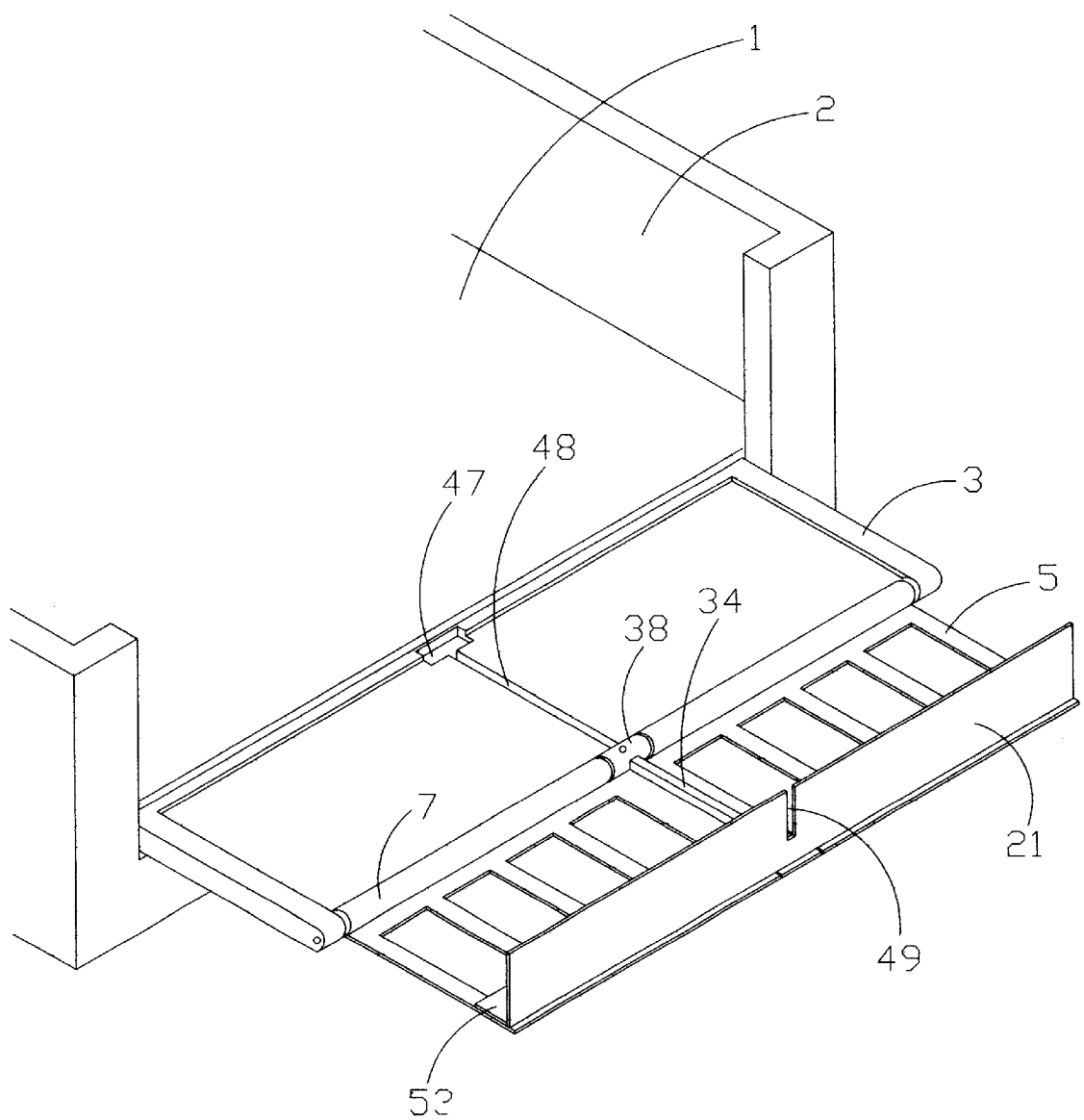
FIG. 16 shows an isometric rear view of a truck with an Auxiliary Tailgate and a Retractable Stop attached thereto, and showing the primary tailgate (3) in the horizontal open position, and the attached open frame back panel (5) in the horizontal open position, with its Retractable Stop in the up position.

The solid body auxiliary tailgate is comprised essentially of a solid back panel (4) that is composed essentially of a metal, alloy, polymeric, or composite material, or a combination thereof, that is attached to the primary tailgate (3) with a horizontal back panel hinge (7) and a centrally located hinge pin (8) or the like. The back panel (4) may be coated with a polyurethane foam, or another material for aesthetic purposes and to afford additional safety to the paint surface of truck's primary tailgate (3). The horizontal back panel hinge (7) and its associated hinge pin (8) extend along the interface of the primary tailgate (3) and the back panel (4), as shown in FIGS. 1 and 2. In a preferred embodiment of the Solid Body Auxiliary Tailgate, the hinge pin (8) protrudes from each end of the horizontal back panel hinge (7). Each protruding hinge pin (8) is matedly attached or affixed into the hinge pin port (9) located in the primary tailgate (3), as shown in FIG. 19, with the horizontal back panel hinge (7) located near the top edge of the primary tailgate (3). A simple embodiment of the back panel (4) should fit snug against the front surface of the primary tailgate (3), when the back panel (4) is in the closed position. A preferred embodiment of the back panel (4) would fit snug into a back panel recessed area (16), as shown in FIGS. 1 and 4, located in the front surface of the primary tailgate (3), when the back panel (4) is in the closed position, as shown in FIGS. 4 and 8. The preferred embodiment of the Solid Body Auxiliary Tailgate would have the front surface of the primary tailgate (3) molded, stamped, or manufactured to accept the back panel (4) snug into a back panel recessed area (16), and such that the back panel (4) would fit or snap into the back panel recessed area (16). The back panel (4) may be rotated about the axis of the horizontal back panel hinge (7) by manipulating the back panel handle (6), and manually moving the back panel (4) to the desired open position or to the closed position, and then releasing the locking mechanism in said handle (6). When the back panel (4) is in the closed position, as shown in FIGS. 4 and 8, it may fit or snap into place in the back panel recessed area (16), or may alternatively rest snugly in place, whether the primary tailgate (3) is in the vertical position or the horizontal position, and the back panel (4) would remain in essentially that stable position by normal gravitational action, and/or by the optional back panel locking mechanism disclosed herein. When the back panel (4) is in the horizontal open position, as shown in FIGS. 2, 16, and 19, it may lock into one of the plurality of desired positions, including the horizontal open position, as pre-determined by a back panel locking means or back panel catching means, such as a pin port housing (38). The back panel locking means may include one or more of the following: hinged tongues that rotate clockwise or counter-clockwise, tongues, pins, spring loaded pins, or one or more spring loaded cable pins (29) or the like tethered on one or more cables (25) and manually activated by a back panel handle (6), and which is a preferred locking means.

This preferred locking means for the back panel (4) is comprised essentially of a spring loaded cable pin (29) tethered on a cable (25). The cable (25) is attached on one end to a first cable port (26), which is attached to the back panel handle (6), by a cable port rivet (28), bolt and nut, weld, solder, or other fastening means. The back panel handle (6) pivots about the axis of rotation of the handle hinge (24), thereby pulling and activating the cable (25). The cable (25) is attached at the opposite end to a second cable port (26). There is a compression cable spring (30) fit around the second cable port (27), and said cable spring (30) is compressed between the cable spring stop (31) and the cable spring housing back (33), as shown in FIG. 20. A cable pin (29) is attached, affixed, or extending from behind the cable spring stop (31), as shown in FIG. 20 and 21. The cable spring (30) and the cable spring spot (31) are housed in the cable spring housing (32), which is optimally closed on one end with a cable orifice (43) allowing a terminal end of the cable (25) attached to the second cable port (27) to protrude through said cable orifice (42), as shown in FIGS. 21 and 22. The cable spring housing (32) is optimally flanged with a mount flange (36) on the terminal end and with the cable pin (29) protruding from this end. The mount flange (36) is affixed to the bottom side of the cable spring housing (32), and is sized so that the cable spring housing (32) may fit or slide into the bottom portion of the back panel cable housing (34), with the mount flange (36) snugly fitting a restraining area at the bottom of said back panel cable housing (34), as shown in FIGS. 21 and 22, thereby supporting and aligning the cable spring housing (32), within the back panel cable housing (34). The back panel cable housing (34) is aligned to allow the mating of the cable pin (29) with the cable pin ports (37), and is attached or affixed to the back panel (4) by fastening means such as weld, solder, rivet, bolt, pressing into a track, and the like. The preferred locking means for these embodiments of the Solid Body Auxiliary Tailgate has the spring loaded cable pin (29), which is manually activated and controlled by the back panel handle (6), fitting into a cable pin port (37) located on the pin port housing (38), and which is preferred to be centrally located on the primary tailgate (3), as shown in FIG. 20. Another option would be to have such a locking means at each end of the back panel (4), the left end and the right end. The mechanism for controlling these two locking means at each end of the back panel (4) would be controlled by the centrally located back panel handle (6), which would be hinged and would control two tethered cables (25), with each cable (25) controlling a separate locking means.

The preferred embodiment of the both the Solid Body Auxiliary Tailgate would have handle recessed area (47) located on the rear side of the primary tailgate (3) to receive the back panel handle (6), as shown in FIGS. 1 and 3, and to allow the user to easily fit their fingers into the recessed area (47) for manipulation of the back panel handle (6). The preferred embodiments of the Solid Body Auxiliary Tailgate would also have a channel recessed area (48) located on the rear side of the primary tailgate (3) to receive the back panel cable housing (34), as shown in FIG. 4. The preferred embodiments of the Solid Body Auxiliary Tailgate with a preferred embodiment of the Retractable Stop attached thereto, is shown in FIG. 3, and would also include a channel slot area (49) on the Retractable Stop, so that the Retractable Stop may efficiently fit snug against the back panel (4), when in the horizontal closed position.

Modified embodiments of the Auxiliary Tailgate could have such locking means on each end of the primary tailgate (3), and said locking means may be operated with a centrally located handle control or release. When the user wishes to disengage the cable pin (29) locking means, the user may pull on the back panel handle (6), thereby releasing the cable pin (29) from the cable pin port (37), and the user would then manually rotate the back panel (4) to the desired alignment position, and release the back panel handle (6), allowing the spring loaded cable pin (29) to drop into the aligned cable pin port (37), thereby locking the back panel (4) of the Auxiliary Tailgate into place in the desired position.

Drawing FIGS. 1–11, 15, and 20–22 show various embodiments of the Solid Body Auxiliary Tailgate. Hybrid and composite embodiments may be derived from the drawing figures and specification by addition, elimination, and replacement of components, and would be combinatorial and numerous, but are also intended to reflect the present invention.

In short, a set of simple embodiments of the Auxiliary Tailgate may be comprised essentially of a back panel (4 or 5) attached to a primary tailgate (3), with a horizontal back panel hinge (7) located at the interface between said panel (4 or 5) and said primary tailgate (3), with said horizontal back panel hinge (7) providing an axis of rotation for the back panel (4 or 5), and said axis of rotation terminates at one of two ends of an arc, with said back panel (4 or 5) in an upright position, due to a hinge locking means. The horizontal back panel hinge (7) has a hinge pin (8) that is fit through a hinge pin port (9), said hinge pin port (9) is also located along said interface between the back panel (4 and 5) and the primary tailgate (3). More developed embodiments of the Auxiliary Tailgate may further include a back panel recessed area (16) and an optional handle recessed area (47), located in the front surface of said primary tailgate (3), and recessed to receive said back panel (4 or 5), when the back panel (4 and 5) is rotated about the axis of said horizontal back panel hinge (7), and into said back panel recessed area (16). Other simple embodiments of the Auxiliary Tailgate may be comprised essentially of a mounting plate (53) extending across a portion of the width of a primary tailgate (3), and affixed to said primary tailgate (3), a first half of a horizontal back panel hinge (7) located along one side of said mounting plate (53), and a second half of said horizontal back panel hinge (7) located along one side of a back panel (4 or 5). Said first half of horizontal back panel hinge (7) has a hinge pin port (9) located along the hinge (7) and said second half of horizontal back panel hinge (7) has a hinge pin port (9) located along the hinge (7), and said first half of horizontal back panel hinge (7) and said second half of horizontal back panel hinge (7) are joined together such that their hinge pin ports (9) form a common hinge pin port (9), and a hinge pin (8) is passed through said common hinge pin port (9), thereby affixing the mounting plate (53) to said back panel (4 or 5), said mounting plate (53) affixed to the primary tailgate (3). The common hinge pin port (9) provides an axis of rotation for the back panel (4 or 5), and said axis of rotation terminates at one of two ends of an arc, with said back panel (4 or 5) in an upright position, due to a hinge locking means. More developed embodiments may also include the mounting plate (53) having a plurality of mounting screw ports (46) located thereon, for affixing said mounting plate (53) to a primary tailgate (3). The locking means for the back panel (4 or 5) may include said second half of horizontal back panel hinge (7) having a hinge rib (50) located thereon and said first half of horizontal back panel hinge (7) having a hinge rib restraint (51) located thereon. The locking means may further include said hinge rib (50) having a hinge rib extension (66) located thereon and said hinge rib restraint (51) having a rib extension port (67) located thereon, to receive said hinge rib extension (66), when the horizontal back panel hinge (7) is extended to the open position.

THE SOLID BODY CLAM-SHELL EMBODIMENTS

The Solid Body Clam-shell Auxiliary Tailgate is comprised essentially of three solid body panels (4, 10, 11) or the like, rather than one solid body back panel (4) or the like. The solid body panels (4, 10, 11) are preferred when the payload for the truck bed (1) is a load of small items, such as tools or small construction components such as door knobs, or long items that fit in the truck bed (1), such as a length of two-by-four, that may half or slide through the gap between the back panel (4) and the truck bed wall (2), or may fall or slide through the holes in an open frame back panel (4). In the Auxiliary Tailgate embodiments that are not a clam-shell embodiment, the back panel (4) is nearly equivalent to the simplest embodiment of the Auxiliary Tailgate; that is, the back panel (4) with one horizontal back panel hinge (7) located at the interface between the primary tailgate (3) and the back panel (4). The Clam-Shell Auxiliary Tailgate embodiments have a back panel (4) attached or affixed to the primary tailgate (3) with horizontal back panel hinge (7) or the like along the horizontal axis, and additionally have two vertical panel hinges (12) or the like along the vertical axis, and located along the two vertical edges of the back panel (4), thereby attaching the two side panels (10, 11), the left side panel (10) and the right side panel (11). The horizontal back panel hinge (7) utilized in the Clam-Shell Auxiliary Tailgate embodiments may differ from the type of horizontal back panel hinge (7) utilized in the solid body and the open frame embodiments of the Auxiliary Tailgate. The horizontal back panel hinge (7) utilized on the Clam-Shell Auxiliary Tailgate embodiments are attached or affixed to the primary tailgate (3) with the mounting plate (53) side of said hinge (7) attached or affixed to the primary tailgate (3) with a plurality of mounting rivets (44) or the like, each passing through a mounting screw port (46) located on the mounting plate (53), and into said primary tailgate (3). Each of the side panels (10, 11) may be affixed to the side of the truck bed wall (2) by an attaching means, such as one or more truck bed wall hasps (17) and one or more hasp orifices (13), with said hasps (17) located on said truck bed wall (2), and to be aligned to matedly penetrate a hasp orifice (13) located on a side panel (10, 11), thereby affixing said side panel (10, 11) to the truck bed wall (2), as shown in FIG. 23. The affixing of the side panels (10, 11) to the truck bed wall (2) by means of one or more hasps (17) passing through their respective hasp orifices (13) and said hasps (17) locking the side panels (10, 11) in place by rotating approximately 90-degrees in a clockwise or a counterclockwise manner, thereby closing the Auxiliary Tailgate and effectively extending the length of the truck bed (2), and safely and securely enclosing the truck bed (2). The Clam-Shell Auxiliary Tailgate embodiments may be folded along the vertical hinges (12) such that the two side panels (10, 11) fold behind the back panel (4) and are then affixed or attached to the back panel (4) with a back panel hasp (15) or alternatively, a pair of magnets between each of the sandwiched panels (4 and 10, and 4 and 11), as shown in FIG. 25. The Clam-Shell Auxiliary Tailgate embodiments are placed into the closed position by gently allowing the back panel (4) to drop onto the primary tailgate (3), where the back panel hasp (15) matedly fits into the back panel hasp orifice (14), the back panel hasp (15) is then rotated approximately 90 degrees about its axis in a clockwise or in a counterclockwise direction, thereby locking the back panel (4) onto the primary tailgate (3). A preferred embodiment would have the back panel hasp orifice (14) centrally located in the back panel handle (6). A preferred embodiment would also have a snug fitting of the back panel (4) and its folded side panels (10, 11) into the front of the primary tailgate (3), which may optionally be recessed to better accommodate said panels (4, 10, 11).

Drawing FIGS. 23–25 show the preferred embodiment of the Solid Body Clam-Shell Auxiliary Tailgate. Hybrid and composite embodiments may be derived from the drawing figures and specification, by addition, elimination, and replacement of components, and would be combinatorial and numerous, but are intended to reflect further embodiments of the present invention.

In short, a set of simple embodiments of the Clam Shell Auxiliary Tailgate may be comprised essentially of a back panel (4 or 5) attached to a primary tailgate (3) with a horizontal back panel hinge (7), and said horizontal back panel hinge (7) provides an axis of rotation for said back panel (4 or 5). These simple embodiments would also include a left side panel (10) attached to the back panel (4 or 5) with a first vertical hinge (12) located along said back panel's (4 or 5) left edge, and said first vertical hinge (12) provides an axis of rotation for said left side panel (10); and would also include a right side panel (11) attached to the back panel (4 or 5) with a second vertical hinge (12) located along said panel's (4 or 5) right edge, and said second vertical hinge (12) provides an axis of rotation for said right side panel (11). The fastening means for these simple embodiments of the Clam Shell Auxiliary Tailgate includes a left side panel fastening means, such as hasp (15) and hasp orifice (13), for affixing the left side panel (10) to a truck bed wall's (2) left side; and a right side panel fastening means, such as a hasp (15) and hasp orifice (13), for affixing the right side panel (11) to said truck bed wall's (2) right side. More developed embodiments of the Clam Shell Auxiliary Tailgate may further include a back panel recessed area (16) and an optional handle recessed area (47) located on the front side of said primary tailgate (3). Said back panel recessed area (16) and optional handle recessed area (47) are recessed to receive the back panel (4 or 5), and said left side panel (10) and said right side panel (11), when the left side panel (10) and the right side panel (11) are folded along their hinge (12) axes, to be adjacent to said back panel (4 or 5), and when the back panel (4 or 5) is then folded along its hinge (7) axis, and into the closed position. Other related simple embodiments of the Clam Shell Auxiliary Tailgate may be comprised essentially of a back panel (4 or 5) with a plurality of mounting screw ports (46) located on a mounting plate (53), which is associated with the horizontal back panel hinge (7), and said back panel (4 or 5) is attached to said primary tailgate (3) with a plurality of mounting screws (41) or the like, such that each said mounting screw (41) or the like, passes through one of said plurality of mounting screw ports (46), thereby attaching the back panel (4 or 5) to the primary tailgate (3). Another set of embodiments for the Clam Shell Auxiliary Tailgate includes kit embodiments, where the Auxiliary Tailgate is packaged in an unassembled, partially assembled, or pre-assembled from, for sale to a prospective user or installer, and said Auxiliary Tailgate's final assembly is completed and installed by the user or installer, on to the appropriate area of a truck or the like. Such a Clam Shell Auxiliary Tailgate kit, may be comprised essentially of package or the like, containing a back panel (4 or 5) with a first horizontal back panel hinge (7) element located along said back panel's (7) bottom edge, a mounting plate (53) with a second horizontal back panel hinge (7) element located along one edge of said mounting plate (53), and with a plurality of mounting screw ports (46) located on the mounting plate (53), a left side panel (10) with a first vertical left panel hinge (12) element located along one edge of said left side panel (10), and with a first hasp orifice (13) located on the left side panel (10), a right side panel (11) with a first vertical right panel hinge (12) element located along one edge of said right side panel (11), and with a second hasp orifice (13) located on the right side panel (11), a second vertical left panel hinge (12) element located along the back panel's (4 or 5) left edge, a second vertical right panel hinge (12) element located along said back panel's (4 or 5) right edge, a horizontal back panel hinge pin (8), a vertical left panel hinge pin (8), and a vertical right panel hinge pin (8), a plurality of mounting screws (41) or the like, and a plurality of hasps (17). Another Clam Shell Auxiliary Tailgate kit embodiment may be pre-assembled for installation on to the appropriate area of a truck or the like, and further comprised essentially of the back panel (4 or 5) and said mounting plate (53) attached with said first horizontal back panel hinge (7) element and said second back panel hinge (7) element joined together with said horizontal back panel hinge pin (8), thereby forming a singular horizontal back panel hinge (7), and said left side panel (10) and said back panel (4 or 5) are attached with said first vertical left panel hinge (12) element and said second vertical left panel hinge (12) element jointed together with said vertical left panel hinge pin (8), thereby forming a singular vertical left panel hinge (12), and said right side panel (11) and said panel (4 or 5) are attached with said first vertical right panel hinge ((12) element and said second vertical right panel hinge (12) element joined together with said vertical right panel hinge pin (8), thereby forming a singular vertical right panel hinge.

THE OPEN FRAME AUXILIARY TAILGATE EMBODIMENTS

The Open Frame Body Auxiliary Tailgate is comprised essentially of a open frame back panel (5) that is composed essentially of a metal, alloy, polymeric, or composite material, or a combination thereof, that is attached to the primary tailgate (3) with a horizontal back panel hinge (7) and a centrally located hinge pin (8) or the like. The horizontal back panel hinge (7) and its associated hinge pin (8) extend along the interface of the primary tailgate (3) and the open frame back panel (5), as shown in FIGS. 13 and 16, with FIG. 16 also showing a Retractable Stop affixed to the open frame back panel (5). In a preferred embodiment, the hinge pin (8) protrudes from each end of the horizontal back panel hinge (7). Each protruding hinge pin (8) is matedly attached or affixed into a hinge pin port (9) located in the primary tailgate (3), as shown in FIG. 19, with the horizontal back panel hinge (7) located near the top edge of the primary tailgate (3). A simple embodiment of the open frame back panel (5) should fit snug against the front surface of the primary tailgate (3), when the open frame back panel (5) is in the closed position. A preferred embodiment of the open frame back panel (5) would fit snug into a back panel recessed area (16), as shown in FIG. 2, located in the front surface of the primary tailgate (3), when the open frame back panel (5) is in the closed position. The preferred embodiment would have the front surface of the primary tailgate (3) molded or manufactured to accept the open frame back panel (5) snug into a back panel recessed area (16), and such that the open frame back panel (5) would fit or snap into the back panel recessed area (16). This recessed area (16) would be molded or formed so as to receive the open frame back panel (5) in such a manner as to create a flush fit or nearly a flush fit, when the open frame back panel (5) is in the closed position. The advantages of having raised areas as a part of the molded or formed recessed area (16) would be that the raised areas would be flush to the truck bed (1), thereby allowing the user to place a load into a level truck bed (1), even when the primary tailgate (3) and the open frame back panel (5) are in the horizontal open positions. The open frame back panel (5) may be rotated about the axis of the horizontal back panel hinge (7) by manipulating the back panel handle (6), and manually moving the open frame back panel (5) to the desired open position or to the closed position, and then releasing the locking mechanism in said handle (6). When the open frame back panel (5) is in the closed position, it may fit or snap into place in the back panel recessed area (16), as shown in FIGS. 13, 16, and 19, or may alternatively rest snugly in place, whether the primary tailgate (3) is in the vertical position or the horizontal position, and the open frame back panel (5) would remain in essentially that stable position by normal gravitational action, and/or by the optional back panel locking mechanism disclosed herein. When the open frame back panel (5) is in the horizontal open position, as shown in FIGS. 16 and 19, it may lock into one of the plurality of positions, including the horizontal open position, as predetermined by a back panel locking means or back panel catching means, such as a pin port housing (38). The back panel locking means may include one or more of the following: hinged tongues that rotate clockwise or counter-clockwise, tongues, pins, spring loaded pins, or one or more spring loaded cable pins (29) or the like tethered on one or more cables (25) and manually activated by a back panel handle (6), and which is a preferred locking means.

This preferred locking means for the open frame back panel (5) is comprised essentially of a spring loaded cable pin (29) tethered on a cable (25). The cable (25) is attached on one end to a first cable port (26), which is attached to the back panel handle (6), by a cable port rivet (28), bolt and nut, weld, solder, or other fastening means. The back panel handle (6) pivots about the axis of rotation of the handle hinge (24), thereby pulling and activating the cable (25). The cable (25) is attached at the opposite end to a second cable port (27). There is a compression cable spring (3) fit around the second cable port (27), and said cable spring (30) is compressed between the cable spring stop (31) and the cable spring housing back (33), as shown in FIG. 20. A cable pin (29) is attached, affixed, or extending from behind the cable spring stop (31), as shown in FIG. 20 and 21. The cable spring (30) and the cable spring stop (31) are housed in the cable spring housing (32), which is optimally closed on one end with a cable orifice (42) allowing a terminal end of the cable (25) attached to the second cable port (27) to protrude through said cable orifice (42), as shown in FIGS. 21 and 22. The cable spring housing (32) is optimally flanged with a mount flange (36) on the terminal end and with the cable pin (29) protruding from this end. The mount flange (36), is fit into the mount flange port (45), located at the bottom side of the back panel cable housing (34), and said mount flange (36) is sized so that it may fit or slide snugly into the mount flange port (45), as shown in FIGS. 21 and 22, thereby supporting and aligning the cable spring housing (32), within the back panel cable housing (34). The back panel cable housing (34) is aligned to allow the mating of the cable pin (29) with the cable pin ports (37), and is attached or affixed to the open frame back panel (5) by fastening means such as weld, solder, rivet, bolt, pressing into a track, and the like. The preferred locking means for these embodiments of the Auxiliary Tailgate has the spring loaded cable pin (29), which is manually activated and controlled by the back panel handle (6), fitting into a cable pin port (37) located on the pin port housing (38), and which is preferred to be centrally located on the primary tailgate (3), as shown in FIG. 20. Another option would be to have such a locking means at each end of the open frame back panel (5), the left end and the right end. The mechanism for controlling these two locking means at each end of the open frame back panel (5) would be controlled by the centrally located back panel handle (6), which would be hinged and would control two tethered cables (25), with each cable (25) controlling a separate locking means.

The preferred embodiment of both the Open Frame Auxiliary Tailgate would have handle recessed area (47) located on the rear side of the primary tailgate (3) to receive the back panel handle (6), as shown in FIG. 16, and to allow the user to easily fit their fingers into the recessed area (47) for manipulation of the back panel handle (6). The preferred embodiments of the Open Frame Auxiliary Tailgate would also have a channel recessed area (48) located on the rear side of the primary tailgate (3) to receive the back panel cable housing (34), as shown in FIG. 16. The preferred embodiments of the Open Frame Auxiliary Tailgate with a preferred embodiment of the Retractable Stop attached thereto, is shown in FIG. 16, and would also include a channel slot area (49) on the Retractable Stop, so that the Retractable Stop may efficiently fit snug against the back panel (4), when in the horizontal closed position.

Modified embodiments could have such locking means on each end of the primary tailgate (3). When the user wishes to disengage the cable pin (29) locking means, the user may pull on the back panel handle (6), thereby releasing the cable pin (29) from the cable pin port (37), and the user would then manually rotate the open frame back panel (5) to the desired alignment position, and release the back panel handle (6), allowing the spring loaded cable pin (29) to drop into the aligned cable pin port (37), thereby locking the open frame back panel (5) of the Auxiliary Tailgate into place in the desired position.

Drawing FIGS. 13, 16, and 19, and the general concepts and locking means used in the drawing figures illustrating the solid body embodiments, show various embodiments of the Open Frame Auxiliary Tailgate. Hybrid and composite embodiments may be derived from the drawing figures and specification, by addition, elimination, and replacement of components, and would be combinatorial and numerous, but are intended to reflect further embodiments of the present invention.

THE OPEN FRAME CLAM-SHELL EMBODIMENTS

The Open Frame Clam-Shell Auxiliary Tailgate is comprised essentially of three open frame body panels (5, 10, 11) or the like, rather than one open frame body back panel (5) or the like. The open frame body panels (5, 10, 11) allow for better aerodynamic stability when the truck is moving. In the Auxiliary Tailgate embodiments that are not a clam-shell embodiment, the open frame back panel (5) is nearly equivalent to those Auxiliary Tailgates; that is, the open frame back panel (5) with one horizontal back panel hinge (7) located at the interface between the primary tailgate (3) and the open frame back panel (5). The Clam-Shell Auxiliary Tailgate embodiments have an open frame back panel (5) attached or affixed to the primary tailgate (3) with a horizontal back panel hinge (7) or the like along the horizontal axis, and additionally have two vertical panel hinges (12) or the like along the vertical axis, and located along the two vertical edges of the open frame back panel (5), thereby attaching the two side panels (10, 11), the left side panel (10) and the right side panel (11). The horizontal back panel hinge (7) utilized in the Clam Shell Auxiliary Tailgate embodiments may differ from the type of horizontal back panel hinge (7) utilized in the solid body and the open frame embodiments of the Auxiliary Tailgate. The horizontal back panel hinge (7) utilized on the Clam Shell Auxiliary Tailgate embodiments are attached or affixed to the primary tailgate (3) with the mounting plate (53) side of said hinge (7) attached or affixed to the primary tailgate (3) with a plurality of mounting rivets (44) or the like, each passing a mounting screw port (46) located on the mounting plate (53), and into said primary tailgate (3). Each of the side panels (10, 11) may be affixed to the side of the truck bed wall (2) by an attaching means, such as one or more truck bed wall hasps (17) and one or more hasp orifices (13), with said hasps (17) located on said truck bed wall (2), and to be aligned to matedly penetrate a hasp orifice (13) located on a side panel (10, 11), thereby affixing said side panel (10, 11) to the truck bed wall (2), as shown in FIG. 23, illustrating the related preferred embodiment of the Solid Body Clam Shell Auxiliary Tailgate. The affixing of the side panels (10, 11) to the truck bed wall (2) by means of one or more hasps (17) passing through their respective hasp orifices (13) and said hasps (17) locking the side panels (10, 11) in place by rotating approximately 90-degrees in a clockwise or a counterclockwise manner, thereby closing the Auxiliary Tailgate and effectively extending the length of the truck bed (2), and safely and securely enclosing the truck bed (2).

The solid body and the open frame embodiments of the Clam-Shell Auxiliary Tailgate may be folded along the axes of the vertical hinges (12) such that the two side panels (10, 11) fold behind the back panel (4 or 5) and are then affixed or attached to the back panel (4 or 5) with a back panel hasp (15) or alternatively a pair of magnets between each of the sandwiched panels (4 or 5 and 10, and 4 or 5 and 11), as shown in FIG. 25, illustrating the related Solid Body Clam Shell Auxiliary Tailgate. The Clam-Shell Auxiliary Tailgate is placed into the closed position by gently allowing the back panel (4 or 5) to drop onto the primary tailgate (3), where the back panel hasp (15) matedly fits into the back panel hasp orifice (14), the back panel hasp (15) is then rotated approximately 90 degrees about its axis in a clockwise or a counterclockwise direction, thereby locking the back panel (4 or 5) onto the primary tailgate (3). A preferred embodiment would have the back panel hasp orifice (14) central located in the back panel handle (6). A preferred embodiment would also have a snug fitting of the back panel (4 or 5) and its folded side panels (10, 11) into the front of the primary tailgate (3), which may optionally be recessed to better accommodate said panels (4 or 5, and 10 and 11).

The Open Frame Clam Shell Auxiliary Tailgate embodiments are similar to the Solid Body Clam Shell embodiments disclosed above, but rather than a utilizing a solid body for the panels (4, 10, 11), open frame panels (5, 10, 11) are utilized, similar to those shown in FIGS. 13–16. Hybrid and composite embodiments may be derived from the drawing figures and specification, by addition, elimination, and replacement of components, and would be combinatorial and numerous, but are intended to reflect further embodiments of the present invention.

THE SLIDE-OUT OPEN FRAME EMBODIMENTS OF THE AUXILIARY TAILGATE

The Slide-out embodiments of the Auxiliary Tailgate have an open frame back panel (5) that may be retracted into or out-of the primary tailgate (3), as shown in FIGS. 49–56. These embodiments are of the open-frame variety, and are designed so that the open frame for an Auxiliary Tailgate, may manually advance from within the primary tailgate (3), or manually retract into the primary tailgate (3), as shown in FIGS. 49–56. Once the open frame back panel (5) is fully advanced from the primary tailgate (3), as shown in FIG. 55, the open frame back panel (5) may be rotated approximately 90-degrees about the axis of the hinge (7), to set the open frame back panel (5) from the horizontal open position, as shown in FIG. 55, to the vertical open position, as shown in FIG. 54. The open frame back panel (5) fits through the horizontal back panel hinge (7), as shown in FIGS. 49–53, and is effectively locked onto the horizontal back panel hinge (7) with a plurality of frame locks (60) that are too large to fit through the aligned primary frame port (61) and secondary frame port (62), as shown in FIGS. 49–53. Each vertical frame for the open frame back panel (5) fits through a frame port (61), as shown in FIGS. 49–53. The hinge pin (8) for the present embodiment of the Auxiliary Tailgate is a set of two short hinge pins (8), as shown in FIGS. 49 and 50, so that the hinge pin (8) will not obstruct the path of the vertical frames of the open frame back panel (5), passing through the horizontal back panel hinge (7). Once the open frame back panel (5) is fully advanced from the horizontal closed position, as shown in FIGS. 56 and 55, to the horizontal open position, shown in FIGS. 55 and 52, there is a locking mechanism that would lock the frame lock (60) portion of the open frame back panel (5) into the horizontal open position, with the frame lock (60) set in the frame lock port (63), as shown in FIG. 52. Once the open frame back panel (5) is in the horizontal open position, the panel (5) may be rotated about the axis of the horizontal back panel hinge (7), and into the vertical open position, as shown in FIGS. 54 and 53, and there is a locking mechanism that would lock the frame lock (60) portion of the open frame back panel (5) into the vertical open position, with the frame lock (60) set in the secondary frame port (62), as shown in FIG. 53. The preferred locking mechanism utilizes a set of three positions for housing the open frame back panel (5) and its frame lock (60), and each of these three positions has a distinct locking means for the open frame back panel (5), as shown in FIGS. 53–55, showing the closed position, the horizontal open position, and the vertical open position, respectively.

A modification of this slide-out embodiment for the Auxiliary Tailgate, may have a smaller open frame back panel (5), thereby acting effectively as a slide-out embodiment of an open frame Retractable Stop.

SOME MODIFIED EMBODIMENTS OF THE AUXILIARY TAILGATE AND THE RETRACTABLE STOP

There are other modified embodiments of the Auxiliary Tailgate and Retractable Stop, which may be comprised essentially of the Auxiliary Tailgate, the Retractable Stop, or a combination thereof, being fit or press-fit onto the primary tailgate (3), as shown in FIGS. 43–48, or onto the back panel (4).

The Retractable Stop may be affixed to the primary tailgate (3) by snapping or press-fitting the mounting plate (53), as shown in FIGS. 43–48, or alternatively, the mounting side or piece of a two-piece hinge (40) from a Retractable Stop, into a pre-formed recessed area (16) on the front side of the primary tailgate (3), thereby affixing the Retractable Stop to the primary tailgate (3). This recessed area (16) may include a handle recessed area (47) to allow the user to easily access the extended arm (21), and utilize it like a handle to move the Retractable Stop to the open or the closed positions. The Retractable Stop may, for example, use an alignment tongue (54) and an alignment tongue port (55), to better secure the Retractable Stop into the body of the primary tailgate (3), and may utilize a plurality mounting screws (41) each passing through their respective mounting screw port (46), to affix the mounting plate (53) onto the primary tailgate (3), as shown in FIGS. 44 and 45. The recessed area (16) on the front side of the primary tailgate (3) for housing the Retractable Stop may also function as a restraint or barrier when the extended arm (21) portion of the Retractable Stop is in the vertical open position, restraining or stopping the extended arm (21) at the desired angle, such as approximately 90-degrees, when opened to said vertical open position. Said desired angle may be slightly greater than 90-degrees to further utilize the effects of gravity to keep the extended arm (21) in the vertical open position. There may also be one or more primary dimples (56) located along the lower portion of the rear surface of the extended arm (21) to each matedly fit into a primary dimple port (57), located along the rear edge of the recessed area (16), as shown in FIGS. 44–46. When a primary dimple (56) fits or snaps into a primary dimple port (57), the extended arm (21) is effectively locked into the open position, as shown in FIG. 43, until one manually rotates the extended arm (21) along its retractable stop hinge (20) axis, to another desired position, such as the closed position, as shown in FIG. 46. There may also be one or more secondary dimples (58) located along top edge of the extended arm (21) to each matedly fit into a secondary dimple port (59), located along the front edge of the recessed area (16), as shown in FIGS. 44 and 45. When a secondary dimple (58) fits or snaps into a secondary dimple port (59), the extended arm (21) is effectively locked into the closed position, as shown in FIG. 46, until one manually rotates the extended arm (21) along its retractable stop hinge (20) axis, to another desired position, such as the open, 90-degree position, similar to that shown in FIG. 43. The aforementioned dimples (56 and 58) may optionally be spring-loaded or composed essentially of an elastomeric or flexible material.

A modification of the aforementioned embodiment, shown in FIGS. 44 and 45, would have location of the dimples (56 and 58) reversed with the location of the dimple ports (57 and 59), as shown in FIGS. 47 and 48. In FIGS. 47 and 48, it should be noted that the primary dimple ports (57) are located along the lower portion of the rear surface of the extended arm (21) to each matedly receive a primary dimple (56), located along the rear edge of the recessed area. When a primary dimple port (57) fits or snaps over a primary dimple (56), the extended arm (21) is effectively locked into the open position, similar to that shown in FIG. 43, until one manually rotates the extended arm (21) along its retractable stop hinge (20) axis, to another desired position, such as the closed position, similar to that shown in FIG. 46. There may also be one or more secondary dimple ports (59) located along the top edge of the extended arm (21) to each matedly receive a secondary dimple (58), located along the front edge of the recessed area, as shown in FIG. 47. When a secondary dimple port (59) fits or snaps onto a secondary dimple (58), the extended arm (21) is effectively locked into the closed position, similar to that shown in FIG. 46, until one manually rotates the extended arm (21) along its horizontal back panel hinge (7) axis, to another desired position, such as the 90-degree open position.

Modified embodiments of the Auxiliary Tailgate may be comprised essentially of the embodiments similar to those disclosed in the previous two paragraphs, which disclosed modified Retractable Stop embodiments. In these modified embodiments of the Auxiliary Tailgate, the portion of the horizontal back panel hinge (7) typically attached to a primary tailgate (3) or the portion of a hinge (7) with an extended mounting plate region that would typically be attached to a primary tailgate (3), may be snapped or press-fitted into a pre-formed recessed area (16) on the front side of the primary tailgate (3), thereby affixing the Auxiliary Tailgate to the primary tailgate (3). This recessed area (16) may include a handle recessed area (47) to allow the user to easily access the back panel (4), and utilize it like a handle to move the Auxiliary Tailgate to the open or the closed positions. This modified embodiment of the Auxiliary Tailgate may, for example, use an alignment tongue (54) and an alignment tongue port (55), to better secure the back panel (4) into the body of the primary tailgate (3), and may use a plurality of mounting screws (41) each passing through their respective mounting screw port (46), to affix the mounting plate, hinge (7) or the like, onto the primary tailgate, similar to that shown in FIGS. 44 and 45. The recessed area (16) on the front side of the primary tailgate (3) may also function as a restraint for the back panel (4) portion of the Auxiliary Tailgate, stopping the back panel (4) at the desired angle, such as approximately 90-degrees, when opened to the vertical open position. Said angle may be slightly greater than 90-degrees to further utilize the effects of gravity to keep the back panel (4) in the vertical open position. There may also be one or more primary dimples (56) located along the lower portion of the rear surface of the back panel (4) to each matedly fit into a primary dimple port (57), located along the rear edge of the recessed area. When a primary dimple (56) fits or snaps into a primary dimple port (57), the back panel (4) is effectively locked into the open position, similar to that shown in FIG. 43, until one manually rotates the back panel (4) along its horizontal back panel hinge (7) axis, to another desired position, such as the horizontal closed position. There may also be one or more secondary dimples (58) located along the top edge of the back panel (4) to each matedly fit into a secondary dimple port (59), located along the front edge of the recessed area, similar to that shown in FIG. 45. When a secondary dimple (58) fits or snaps into a secondary dimple port (59), the back panel (4) is effectively locked into the closed position, similar to that shown in FIG. 46, until one manually rotates the back panel (4) along its horizontal back panel hinge (7) axis, to another desired position, such as the open 90-degree position. The aforementioned dimples (56 and 58) may optionally be spring-loaded or composed of an elastomeric or flexible material. A modification of the aforementioned embodiment of the Auxiliary Tailgate would have location of the dimples (56 and 58) reversed with the location of the dimple ports (57 and 59), similar to that shown in FIGS. 47 and 48. In FIGS. 47 and 48, it should be noted that the primary dimple ports (57) are located along the lower portion of the rear surface of the back panel (4) to each matedly receive a primary dimple (56), located along the rear edge of the recessed area. When a primary dimple port (57) fits or snaps over a primary dimple (56), the back panel (4) is effectively locked into the open position, similar to that shown in FIG. 43, until one manually rotates the back panel (4) along its horizontal back panel hinge (7) axis, to another desired position, such as the closed position, similar to that shown in FIG. 46. There may also be one or more secondary dimple ports (59) located along the top edge of the back panel (4) to each matedly receive a secondary dimple (58), located along the front edge of the recessed area, similar to that shown in FIG. 47. When a secondary dimple port (59) fits or snaps onto a secondary dimple (58), the back panel (4) is effectively locked into the closed position, similar to that shown in FIG. 46, until one manually rotates the back panel (4) along its horizontal back panel hinge (7) axis, to another desired position, such as the vertical open position.

A hybrid embodiment of the aforementioned modified embodiments of the Retractable Stop and the Auxiliary Tailgate may additionally have a left side panel (10) and a right side panel (11) similar to the side panels (10 and 11) used on the clam shell embodiments of the Auxiliary Tailgate, and each panel (10 and 11) is attached to the back panel (4 or 5) or the extended arm (21) of said modified embodiment, with a vertical panel hinge (12) or the like attached to each panel (10 and 11). These side panels (10 and 11) may be folded against the back panel (4 or 5) or the extended arm (21), and the back panel (4 or 5) or the extended arm (21) may then be fit into the recessed area on the primary tailgate (3), similar to that shown in FIG. 24. To open this hybrid embodiment, the user would open the back panel (4 or 5) or the extended arm (21), and then open each of the two side panels, the left side panel (10) and the right side panel (11). Each of the side panels (10 and 11) would have a side panel hasp orifice (13), which would each matedly over a truck bed wall has (17). The two truck bed wall hasps (17), which are each matedly fitting through a side panel hasp orifice (13), may be rotated about its central axis, to lock the side panels (10 and 11) into place, thereby forming a variant of the clam shell embodiments of the Auxiliary Tailgate, disclosed above. The two truck bed wall hasps (17) may be unlocked to free the side panels (10 and 11) for alignment against the back panel (4 or 5) or extended arm (21), and the back panel (4 or 5) or extended arm (21), may then be fit into the recessed area of the primary tailgate (3), until removed and utilized again. A variation of this embodiment would be comprised of a primary tailgate (3) that did not have a recessed area, in which case, the Auxiliary Tailgate or the Retractable Stop would be slightly raised when in the closed position.

Other embodiments of the Auxiliary Tailgate and the Retractable Stop, disclosed above, may be constructed by applying side panels (10 and 11) or the like to a back panel (4 or 5) or to an extended arm (21) or the like, through the use of two vertical panel hinges (12). In some hybrid embodiments, the metal or plastics side panels (10 and 11) may be replaced with side panels (10 and 11) that are comprised essentially of a flexible, fabric, or netting material, thereby simplifying the manufacture and reducing the manufacturing costs, and still getting a favorable design. In such hybrid embodiments, the fabric or netting material may be attached, hooked, or affixed to the truck bed wall (2) with a hasp/hasp orifice means, similar to that disclosed above, or by a hook or tying means.

Other embodiments of the Retractable Stop and the Auxiliary Tailgate may also include kits, including partially-assembled kit embodiments, which are comprised essentially of the components utilized in the various above-described embodiments of the Retractable Stop, the Auxiliary Tailgate, and the Auxiliary Tailgate with a Retractable Stop, but are packaged and marketed as a kit or the like, to be added onto an existing truck.

While I have shown and described in this disclosure and its appended drawing figures, and which are a part of and incorporated in said disclose, only selected embodiments in accordance with the present invention, it is understood that the same is not limited thereto, but is susceptible to numerous changes and modifications as known to one having ordinary skill in the art, and I therefore do not wish to be limited to the details shown and described herein, but intend to cover all such modifications, changes, eliminations, combinations and hybrids, as are encompassed by the scope of the appended claims.

I claim:

1. An Auxiliary Tailgate with Retractable Stop, comprised of:
   a. a back panel attached to a primary tailgate, with a horizontal back panel hinge located at the interface between said back panel and said primary tailgate;
   b. said horizontal back panel hinge provides an axis of rotation for the back panel, and said axis of rotation is located at the center of the arc radius, and having locking positions due to a hinge locking means;
   c. the horizontal back panel hinge has a hinge pin that is fit through a hinge pin port, said hinge pin port is also located along said interface between said back panel and the primary tailgate;
   d. a mounting plate extending across a portion of the width of the back panel, and affixed to said back panel;
   e. a first half of a retractable stop hinge located along one side of said mounting plate;
   f. a second half of said retractable stop hinge located along one side of an extended arm;
   g. said first half of retractable stop hinge has a first pin port is located along the hinge and said second half of retractable stop hinge has a hinge pin port located along the hinge;
   h. the first half of retractable stop hinge and the second half of retractable stop hinge are joined together such that their hinge pin ports form a common hinge pin port, and a hinge pin is passed through said common hinge pin port, thereby affixing the mounting plate to said extended arm, and said mounting plate is affixed to the back panel.

2. An Auxiliary Tailgate with Retractable Stop, comprised of:
   a. a back panel attached to a primary tailgate, with a horizontal back panel hinge located at the interface between said back panel and said primary tailgate;
   b. said horizontal back panel hinge provides an axis of rotation for the back panel, and said axis of rotation is at least 270 degrees, and the axis of rotation is located at the center of the arc radius;
   c. a retractable stop attached to the back panel, with a second horizontal back panel hinge located at the interface between said back panel and said retractable stop.

3. A truck having an Auxiliary Tailgate with Retractable Stop, comprised of:
   a. a back panel attached to a primary tailgate, with a horizontal back panel hinge located at the interface between said back panel and said primary tailgate of said truck;
   b. said horizontal back panel hinge provides an axis of rotation for the back panel, and said axis of rotation is at least 270 degrees, and the axis of rotation is located at the center of the arc radius;
   c. a retractable stop attached to the back panel, with a second horizontal back panel hinge located at the interface between said back panel and said retractable stop.

* * * * *